US008996979B2

(12) United States Patent
Pickles et al.

(10) Patent No.: US 8,996,979 B2
(45) Date of Patent: Mar. 31, 2015

(54) DOCUMENT AUTOMATION SYSTEMS

(75) Inventors: David Kendal Pickles, London (GB);
Ali Shahid Ahmed, London (GB);
Robert James Dow, Wokingham (GB)

(73) Assignee: West Services, Inc., Eagan, MN (US)

( * ) Notice: Subject to any disclaimer, the term of this patent is extended or adjusted under 35 U.S.C. 154(b) by 1468 days.

(21) Appl. No.: 11/449,396

(22) Filed: Jun. 8, 2006

(65) Prior Publication Data
US 2008/0022107 A1    Jan. 24, 2008

(51) Int. Cl.
G06F 17/00    (2006.01)
G06F 17/22    (2006.01)
G06F 17/21    (2006.01)
G06F 17/24    (2006.01)

(52) U.S. Cl.
CPC .......... *G06F 17/2229* (2013.01); *G06F 17/218* (2013.01); *G06F 17/2247* (2013.01); *G06F 17/243* (2013.01)
USPC ........... 715/221; 715/200; 715/234; 715/235; 715/255; 715/272

(58) Field of Classification Search
CPC .............. G06F 17/243; G06F 17/2247; G06F 17/2229; G06F 17/218
USPC .................. 715/200, 234, 235, 255, 272, 221
See application file for complete search history.

(56) References Cited

U.S. PATENT DOCUMENTS

| 5,671,427 | A  | * | 9/1997  | Nishimura ................ 715/205 |
| 6,272,505 | B1 | * | 8/2001  | De La Huerga ........... 715/235 |
| 6,823,495 | B1 | * | 11/2004 | Vedula et al. ............ 715/805 |
| 6,856,988 | B1 |   | 2/2005  | Humphrey et al. |
| 7,035,837 | B2 |   | 4/2006  | Reulein et al. |
| 7,168,035 | B1 | * | 1/2007  | Bell et al. ............... 715/234 |
| 7,657,831 | B2 | * | 2/2010  | Donahue .................. 715/234 |
| 2002/0019672 | A1 | * | 2/2002  | Paunonen ................. 345/772 |
| 2003/0074634 | A1 | * | 4/2003  | Emmelmann .............. 715/513 |
| 2003/0120671 | A1 | * | 6/2003  | Kim et al. ................ 707/100 |
| 2004/0107175 | A1 | * | 6/2004  | Hung et al. ................. 707/1 |
| 2005/0050078 | A1 |   | 3/2005  | Vasey |

(Continued)

FOREIGN PATENT DOCUMENTS

| CA | 2 344 074 | 10/2002 |
| GB | 2 405 729 | 3/2005 |

(Continued)

OTHER PUBLICATIONS

Examination Report issued by the Canadian Patent Office in Canadian App. No. 2,654,647, dated Feb. 27, 2014.

*Primary Examiner* — Chau Nguyen

(74) *Attorney, Agent, or Firm* — Greer Burns & Crain, Ltd.

(57) ABSTRACT

The present invention relates to document automation/assembly systems, and more particularly to document automation systems distributed over a network such as the Internet, and/or other communication networks. In addition, the present invention relates to methods, especially computer-implemented methods, to computer programs, and to recording media storing such programs for use in such systems.

27 Claims, 20 Drawing Sheets

(56) References Cited

U.S. PATENT DOCUMENTS

| | | |
|---|---|---|
| 2005/0050444 A1 | 3/2005 | Vasey |
| 2005/0050445 A1 | 3/2005 | Vasey |
| 2005/0050464 A1 | 3/2005 | Vasey |
| 2005/0055332 A1 | 3/2005 | Vasey |
| 2005/0144169 A1 | 6/2005 | Humphrey et al. |
| 2005/0149523 A1 | 7/2005 | Humphrey et al. |
| 2005/0149524 A1 | 7/2005 | Humphrey et al. |
| 2005/0198062 A1* | 9/2005 | Shapiro ............ 707/102 |
| 2005/0246283 A1* | 11/2005 | Gwiazda et al. ....... 705/52 |
| 2006/0036612 A1* | 2/2006 | Harrop et al. ........ 707/100 |
| 2006/0190816 A1 | 8/2006 | Vasey |

FOREIGN PATENT DOCUMENTS

| | | |
|---|---|---|
| GB | 2 423 612 | 8/2006 |
| WO | WO 03/075191 | 9/2003 |
| WO | WO 2004/084009 | 9/2004 |
| WO | WO 2004/086249 | 10/2004 |
| WO | WO 2005/040972 | 5/2005 |
| WO | WO 2005/052727 | 6/2005 |
| WO | WO 2005/088445 | 9/2005 |
| WO | WO 2005/124579 | 12/2005 |

* cited by examiner

Fig. 11

DOCUMENT AUTOMATION SYSTEMS

FIELD OF THE INVENTION

The present invention relates to document automation/assembly systems, and more particularly to document automation systems distributed over a network such as the Internet, and/or other communication networks. In addition, the present invention relates to methods, especially computer-implemented methods, to computer programs, and to recording media storing such programs for use in such systems.

It will be appreciated that, although the embodiments and examples described herein are applied to a network, the present invention may be equally embodied on a single computer terminal or other processing device.

BACKGROUND OF THE INVENTION

Many organisations are involved in the generation of documents. A law firm is an example of one such organisation. One of the main activities of a law firm is the drafting of legal documents such as agreements and contracts on behalf of its clients. Such a client may be engaged in a transaction of some kind, which may be very complex. A lawyer or team of lawyers at the firm can be tasked with the drafting of documents to support that transaction. Such documents are notoriously lengthy and complex, and moreover a high degree of importance is typically attached to the accuracy of the content of such documents. It is accordingly desirable to generate such documents in an efficient and accurate manner.

A number of document automation systems exist. Such systems typically elicit data from a system user for use in the generation of a document. Using the above example, data about a particular transaction may be elicited from lawyers engaged in the transaction project, and may be employed by such existing document automation systems to generate drafts of the requisite documents. Existing document automation systems typically allow users to modify the input data or to add new data, thereby modifying the generated documents.

Existing document automation systems use rules to generate documents based on the input data. In general, data may interact with such rules to form the content of a generated document. There are several ways in which a piece of data may affect the content of a generated document. For example, a piece of data may itself be expressed in the generated document. Alternatively, a section of the generated document may be inserted therein on condition that a piece of data has a certain value.

For illustrative purposes, consider the following two simple examples of transaction data: (a) the name of the party who is acting as the buyer; and (b) the information as to whether that party is a natural person or a legal person (e.g. a company).

With regard to example (a), there may be several places in a generated document where the name of the buyer will be expressed. For example (supposing that 'Trustthorpe Ltd' is the name of the buyer), the generated document may contain the clause "17.2 Trustthorpe Ltd shall pay all present and future stamp, documentary and other like duties and taxes (if any) to which this agreement may be subject or may give rise . . . ". That is, the rules responsible for generating the document may ensure that whatever value the piece of data holding the buyer's name possesses, that value will appear in the locations that the rules specify.

With regard to example (b), whether a party is a real person or a company can affect which clauses are included in a generated document. For instance, the generated document may be an agreement that has an execution clause at which the party concerned should sign the agreement. The form of such an execution clause will normally be different in the case where the party is a company (legal person) from the case where the party is a real person (natural person). In order to provide the right kind of clause in the appropriate circumstances, the rules responsible for generating the document may have an "if . . . then . . . " form, such that the rules will effectively provide that "if" the buyer is a company, "then" a particular clause should be used, however "if" the buyer is a real person, "then" a different clause should be used.

There are other ways in which existing document automation systems use data in combination with rules to control the content of generated documents. The most important and common of these is where a data structure is a collection of similar pieces of data and, when the rules are written, it is not known how many items the collection contains.

In such cases, the rules followed by the document generation system may instruct the generation process to insert something once for each member of the collection, however many members that may be. The process of doing something once for each member of a collection is known as iteration.

For example, suppose that the collection is of the names of the different parties to an agreement; the rules may instruct the generation process to express each member of the collection, thus creating a list of parties.

In more complex cases, what's iterated might involve 'if . . . then . . . ' rules. The 'if . . . then . . . ' example above concerns the creation of different forms of execution clause, and clearly one use of a more complex iteration would be to create, for each party to an agreement, an appropriate style of execution clause for that party. Here the iteration rule would specify that the 'if . . . then . . . ' execution clause rule is to be executed for each party.

U.S. 2006/0036612 discloses a document automation system that includes an assembler for generating an instance document on the basis of a source document and one or more logic-source documents referenced by the source document. The source document and logic-source documents are XML documents including at least one XML processing instruction. The source document and logic-source documents are valid with respect to XML schema. The system generates an instance document in HTML, PDF or RTF format by resolving variables in the source document and/or logic sources using one or more data sources.

GB 2405729 discloses a document generation system that generates a customised document using content elements selected by rules operating on input information including transaction values. The system associates further rules with the transaction values and evaluates the further rules to produce an indication of the relevance of the presence or absence of the transaction values in a fully or partially customised generated document. The effect of the transaction values is represented by means of a mark-up.

SUMMARY OF THE INVENTION

The present invention relates to systems, methods and computer programs for use in generating electronic documents. The present invention also relates to code carried by a signal or held on a carrier medium which when executed on a computing device provides a display element and/or a web page for a user of the system.

According to an embodiment of an aspect of the present invention, there is provided an electronic-document generation system comprising: generation means operable to employ a content source comprising document content and a logic source comprising logic to generate a target document by evaluating said logic in dependence upon data; a user interface operable to cause the target document or another electronic document generated therefrom to be displayed to a user, said user interface being further operable to permit the user to make an amendment to the displayed document; and source-amending means operable, when such an amendment other than a change to said data is made to the displayed document, to effect an equivalent amendment to a corresponding portion of the content source and/or the logic source.

It is advantageous for a user of such a system to be able to amend a displayed document, other than by amending the data based upon which the document was generated, such that it will be regenerated in the amended form by the system in the future. Preferably, considering such a displayed document as amended by the user to be a current displayed document, the equivalent amendment is such that a future such displayed document produced from the amended content and/or logic source would be substantially identical to said current displayed document.

The logic used to generate the document could be a rule or set of rules, or a condition, or any other material that may express such a condition. The target document may be expressed (written/defined) in a markup language, for example in XML. The displayed document may be a structured document, for example a legal document.

The displayed document may be a formatted textual document. The logic and/or content sources may be expressed (written/defined) in a markup language, for example in XML. The logic and/or content sources may be included in a script, for example an XML script. The data may be simple data, or data having a complex structure or hierarchy. For example, the data may comprise one or more composite data items, each being an instance of a respective composite data type. Such composite data items and data types are described in greater detail below, however an understanding of such composite data items can be found at http://en.wikipedia.org/wiki/Composite_datatype.

Such a system is preferably arranged such that: the content source and/or the logic source comprise at least one portion identified by a portion identifier, the or each said portion being responsible for the generation of a corresponding portion of said target document; the generation means is operable, for the or each said portion of the target document, to include the corresponding portion identifier or a portion identifier derived therefrom in said target document; the user interface is operable to: permit the user to make an amendment other than a change to said data to a portion of the displayed document corresponding to the or one of the portions of the target document; and communicate to said source-amending means the portion identifier included in the target document that corresponds to the amended portion of the displayed document, or a portion identifier derived therefrom, and information about the amendment made; and the source-amending means is operable to employ the communicated portion identifier and the communicated information to effect an equivalent amendment to the portion of the content source and/or the logic source corresponding to the communicated portion identifier.

The or each portion identifier is preferably unique amongst any other such identifiers within said sources. In the case that the sources are expressed in a markup language, for example in XML, the or each portion identifier may be an element identifier identifying an element of the source concerned.

Such a system is preferably arranged such that: the sources are associated with a source identifier distinguishing them from other such sources employable by the generation means; the generation means is operable to include the source identifier, or an identifier derived therefrom, in said target document; the user interface is operable, following such an amendment, to communicate to said source-amending unit the source identifier included in the target document; and the source-amending unit is operable to employ the communicated source identifier to effect an equivalent amendment to the content source and/or the logic source corresponding to the communicated source identifier.

Preferably, the logic source and the content source are included within a drafting script, which may be written in a markup language such as XML. Such a system may apply rules related to document structure, in order to identify the required corresponding amendments in such a source drafting script. Certain modifications may require no more than the insertion or deletion of text at a particular point in such a drafting script. Other changes might require structural modification as well, dependent on the position and disposition of the triggering modification made by the user in the displayed "draft" document.

For example, consider a modification by a user in a draft document which involves the insertion of text into a new paragraph immediately following an existing paragraph. An equivalent corresponding change in a source drafting script instance may require the insertion of the new text in addition to the application of paragraphing tags to the new text, in order to achieve an amendment that is substantially identical (or equivalent) to the user's amendment in the draft document.

Rules relating to how to handle user amendments and make equivalent corresponding amendments in source drafting scripts may be based on a specified XML structure (in the case that the drafting scripts are defined in XML) known by the system and used to produce target documents, such that they conform to a DTD (Document Type Definition) defined for target documents. This aspect of the target documents may make it possible for such rules to be specified as an integral part of the source-amending (or drafting-script-amending) unit, for possible variations in structure of document content that may be made by a user to a target document, or a displayed document generated therefrom.

According to an embodiment of an aspect of the present invention, there is provided customising means for use by a user interface to customise that interface for use with an electronic-document generation system, the user interface being operable to display to a user a document comprising at least one portion identifier corresponding to a portion of that document and being further operable to permit the user to make an amendment to the displayed document, the customising means comprising obtaining means operable, following such an amendment to said portion of the displayed document, to obtain the portion identifier and information about said amendment from the user interface for use by the electronic-document generation system.

The user interface may, for example, be a computer terminal running a user application capable of displaying a document and capable of permitting a user to amend the document. For example, the displayed document may be a document formatted for compatibility with Microsoft Word™, and the user application may be Microsoft Word™. The customising means may be implemented in hardware or software. The customising means may be a software module for use with such a user application.

Such customising means preferably comprises communicating means operable to communicate the obtained portion identifier and the information to the electronic-document generation system.

According to an embodiment of an aspect of the present invention, there is provided a user interface for use with an electronic-document generation system, the user interface comprising: display means operable to display to a user a document comprising at least one portion identifier corresponding to a portion of that document; amending means operable to permit the user to make an amendment to the displayed document; and obtaining means operable, following such an amendment to said portion of the displayed document, to obtain the portion identifier and information about said amendment for use by the electronic-document generation system.

Such a user interface preferably further comprises communicating means operable to communicate the obtained portion identifier and said information to the electronic-document generation system.

According to an embodiment of an aspect of the present invention, there is provided source-amending means for use with an electronic-document generation system, the system being operable to employ a content source comprising document content and a logic source comprising logic to generate a target document by evaluating said logic in dependence upon data, and being further operable to cause the target document or another electronic document generated therefrom to be displayed to a user, and being further operable to permit the user to make an amendment to the displayed document, the source-amending means comprising amending means operable, when such an amendment other than a change to said data is made to the displayed document, to effect an equivalent amendment to a corresponding portion of the content source and/or the logic source.

According to an embodiment of an aspect of the present invention, there is provided an electronic document expressed in a markup language comprising a plurality of elements, each element of the plurality of elements comprising an element identifier distinct from all element identifiers of that document. The markup language may be XML. Such a document may be stored on a storage medium, or may be embodied in printed form, for example on paper.

According to an embodiment of an aspect of the present invention, there is provided an electronic-document generation system comprising: generation means operable to employ a drafting script to generate a target document by evaluating logic expressed within said drafting script in dependence upon data stored in a data source; a user interface operable to cause the target document or another electronic document generated therefrom to be displayed to a user, said user interface being further operable to permit the user to make an amendment to the displayed document; and drafting-script amending means operable, when such an amendment other than a change to said data is made to the displayed document, to effect an equivalent amendment to a corresponding portion of the drafting script.

According to an embodiment of an aspect of the present invention, there is provided a computer-implemented method for use in an electronic-document generation system, the method comprising: employing a content source comprising document content and a logic source comprising logic to generate a target document by evaluating said logic in dependence upon data; displaying the target document, or another electronic document generated therefrom, to a user; permitting the user to make an amendment to the displayed document; and when such an amendment other than a change to said data is made to the displayed document, effecting an equivalent amendment to a corresponding portion of the content source and/or the logic source.

According to an embodiment of an aspect of the present invention, there is provided a computer-implemented method for generating a target document, the method comprising: accessing a drafting script comprising document content and logic for generation of said target document, said drafting script comprising at least one portion identified by a portion identifier, the or each said portion being responsible for the generation of a corresponding portion of said target document; employing said drafting script to generate said target document by evaluating said logic in dependence upon data; and including in each said portion of the target document the portion identifier of the corresponding portion of the drafting script, or a portion identifier generated therefrom.

According to an embodiment of an aspect of the present invention, there is provided a target document generated by a computer-implemented method of: accessing a drafting script comprising document content and logic for generation of said target document, said drafting script comprising at least one portion identified by a portion identifier, the or each said portion being responsible for the generation of a corresponding portion of said target document; employing said drafting script to generate said target document by evaluating said logic in dependence upon data; and including in each said portion of the target document the portion identifier of the corresponding portion of the drafting script, or a portion identifier generated therefrom.

According to an embodiment of an aspect of the present invention, there is provided a computer-implemented method for customising a user interface of an electronic-document generation system, the user interface being operable to display to a user a document comprising at least one portion identifier corresponding to a portion of that document and being further operable to permit the user to make an amendment to the displayed document, the method comprising: following such an amendment to said portion of the displayed document, obtaining the portion identifier and information about said amendment for use by the electronic-document generation system.

According to an embodiment of an aspect of the present invention, there is provided a computer-implemented user interface method for use with an electronic-document generation system, the method comprising: displaying to a user a document comprising at least one portion identifier corresponding to a portion of that document; permitting the user to make an amendment to the displayed document; and following such an amendment to said portion of the displayed document, obtaining the portion identifier and information about said amendment for use by the electronic-document generation system.

According to an embodiment of an aspect of the present invention, there is provided a computer-implemented method for use by an electronic-document generation system, the system being operable to employ a content source comprising document content and a logic source comprising logic to generate a target document by evaluating said logic in dependence upon data, and being further operable to cause the target document or another electronic document generated therefrom to be displayed to a user, and being further operable to permit the user to make an amendment to the displayed document, the method comprising: when such an amendment other than a change to said data is made to the displayed document, effecting an equivalent amendment to a corresponding portion of the content source and/or the logic source.

According to an embodiment of an aspect of the present invention, there is provided a computer-implemented method for use in an electronic-document generation system, the method comprising: employing a drafting script to generate a target document by evaluating logic expressed within said drafting script in dependence upon data stored in a data source; displaying to a user the target document or another electronic document generated therefrom; permitting the user to make an amendment to the displayed document; and when such an amendment other than a change to said data is made to the displayed document, effecting an equivalent amendment to a corresponding portion of the drafting script.

According to an embodiment of an aspect of the present invention, there is provided a computer-readable storage medium storing a computer program which, when executed on a computer of an electronic-document generation system, causes the system to: employ a content source comprising document content and a logic source comprising logic to generate a target document by evaluating said logic in dependence upon data; display the target document, or another electronic document generated therefrom, to a user; permit the user to make an amendment to the displayed document; and when such an amendment other than a change to said data is made to the displayed document, effect an equivalent amendment to a corresponding portion of the content source and/or the logic source.

According to an embodiment of an aspect of the present invention, there is provided a computer-readable storage medium storing a computer program for generating a target document which, when executed on a computer of an electronic-document generation system, causes the system to: access a drafting script comprising document content and logic for generation of said target document, said drafting script comprising at least one portion identified by a portion identifier, the or each said portion being responsible for the generation of a corresponding portion of said target document; employ said drafting script to generate said target document by evaluating said logic in dependence upon data; and include in each said portion of the target document the portion identifier of the corresponding portion of the drafting script, or a portion identifier generated therefrom.

According to an embodiment of an aspect of the present invention, there is provided a computer-readable storage medium storing a computer program for customising a user interface of an electronic-document generation system, the user interface being operable to display to a user a document comprising at least one portion identifier corresponding to a portion of that document and being further operable to permit the user to make an amendment to the displayed document, the computer program, when executed on a computer of the user interface, causing the user interface to: following such an amendment to said portion of the displayed document, obtain the portion identifier and information about said amendment for use by the electronic-document generation system.

According to an embodiment of an aspect of the present invention, there is provided a computer-readable storage medium storing a computer program which, when executed on a computer of a user interface, causes the user interface to: display to a user a document comprising at least one portion identifier corresponding to a portion of that document; permit the user to make an amendment to the displayed document; and following such an amendment to said portion of the displayed document, obtain the portion identifier and information about said amendment for use by the electronic-document generation system.

According to an embodiment of an aspect of the present invention, there is provided a computer-readable storage medium storing a computer program for use by an electronic-document generation system, the system being operable to employ a content source comprising document content and a logic source comprising logic to generate a target document by evaluating said logic in dependence upon data, and being further operable to cause the target document or another electronic document generated therefrom to be displayed to a user, and being further operable to permit the user to make an amendment to the displayed document, the computer program, when executed on a computer of the system, causing the system to: when such an amendment other than a change to said data is made to the displayed document, effect an equivalent amendment to a corresponding portion of the content source and/or the logic source.

According to an embodiment of an aspect of the present invention, there is provided a computer-readable storage medium storing a computer program which, when executed on a computer of an electronic-document generation system, causes the system to: employ a drafting script to generate a target document by evaluating logic expressed within said drafting script in dependence upon data stored in a data source; display to a user the target document or another electronic document generated therefrom; permit the user to make an amendment to the displayed document; and when such an amendment other than a change to said data is made to the displayed document, effect an equivalent amendment to a corresponding portion of the drafting script.

According to an embodiment of an aspect of the present invention, there is provided an electronic-document generation system for generating a target document, the system comprising: an interpreter operable, during generation of said target document, to interpret at least one instruction of a predetermined type, the or each said instruction referring to data and identifying a content item for use in generating said target document; a first includer operable, for the or each said instruction, to include the identified content item or content derived therefrom in a portion of said target document; an assigner operable to assign a first status or a second status different from said first status to the or each said portion of the target document in dependence upon said data; and a second includer operable, for each said portion of the target document, to include additional information in said target document indicative of whether the portion concerned has been assigned said first status or said second status.

The or each said instruction is preferably expressed (written/defined) in a markup language, for example in XML. The additional information may optionally comprise a colour or another symbol. For example, the portion concerned (or content within the portion concerned) may be coloured with one colour to indicate the first status, and another colour to indicate the second status. Alternatively, or additionally, the portion concerned may include or be associated with one symbol to indicate the first status, and another symbol to indicate the second status.

Such a system preferably further comprises: a user interface operable to display the target document, or a document generated therefrom, in a first mode in which any such portion having said second status is included in the displayed document, or in a second mode in which any such portion having said second status is excluded from the displayed document. Preferably, the user interface is operable, in said first mode, to include any such additional information in the displayed document and, in said second mode, to exclude any such additional information from the displayed document. Preferably, the user interface is operable to include any such portion having said first status in the displayed document in both said first mode and said second mode.

Accordingly, it will be appreciated that the system may be employed to display a "draft" document (in the first mode), in which portions that will not be included in a "final" document (in the second mode) because of the current data, but which are optional portions and could be selected to be included in the final document by changing the data, are indicated to the user. Similarly, it will be appreciated that the system may be employed to display a "draft" document (in the first mode), in which portions that will be included in a "final" document (in the second mode) because of the current data, but which are optional portions and could be selected as not to be included in the final document by changing the data, are indicated to the user. The user may then chose to change the data, by following a link or another such device in the displayed document, so as to change the status of a portion of the document, if desired.

Such a system preferably further comprises a tester operable, for the or each said instruction, to test the data concerned against a condition defined by logic, wherein said assigner is operable, for the or each said instruction, to assign said first status to the corresponding portion if the data concerned satisfies the condition concerned, and to assign said second status to the corresponding portion if the data concerned does not satisfy the condition concerned. Preferably, the logic for the or each instruction is expressed (written/defined) in its respective instruction.

The interpreter is preferably operable, during generation of said target document, to interpret a group of at least two said instructions. In that case, the system may comprise a tester operable, for each said instruction of the group in turn, to test the data concerned against a condition defined by logic, wherein said assigner is operable to assign said first status to the portion corresponding to the instruction whose data first satisfies its condition, and to assign said second status to the or each other said portion. It will be appreciated that the group of instructions may relate to a group of portions of which only one should be given the first status, i.e. because only one should be included in the "final" document. Preferably, the logic for each instruction of the group is expressed (written/defined/presented/included) in its respective instruction.

The system preferably comprises a further includer operable to include a link in said target document, said link being operable to access a data-changing device for use in changing the data to other data, for example from current working data to alternative data.

The data employed by the system may comprise a composite data item being an instance of a composite data type. Further, the system may comprise a data-accessing unit operable to employ a predetermined definition of said composite data type to access said composite data item for use by at least one of said interpreter and said includers.

According to an embodiment of an aspect of the present invention, there is provided an electronic-document generation system for generating a target document, the system comprising: an interpreter operable, during generation of said target document, to interpret at least one instruction of a first type and at least one instruction of a second type, each said instruction referring to data and identifying a content item for use in generating said target document; a first includer operable, for the or each said instruction of the first type, to include the identified content item or content derived therefrom in a corresponding portion of said target document, and, for the or each said instruction of the second type, to include the identified content item or content derived therefrom in a corresponding portion of said target document or to not include any such content in the target document in dependence upon the data concerned; an assigner operable, for the or each said portion corresponding to one of said instructions of the first type, to assign a first status or a second status different from said first status to that portion in dependence upon said data, and, for any portion corresponding to one of said instructions of the second type, to assign said first status to that portion; and a second includer operable, for the or each said portion corresponding to one of said instructions of the first type, to include additional information in said target document identifying that portion as having said first status or said second status, but, for any portion corresponding to one of said instructions of the second type, to not include such additional information in said target document.

It will be appreciated that instructions of the first type and the second type can be used selectively to control which possible optional portions of a target document will be included in that target document with such additional information irrespective of the data, and which will only be included in the target document if the data satisfies one or more conditions. This is advantageous, because complex target documents may have a large number of possible optional portions, and including them all with the additional information would create an overly complex target document. That is, an author designing a script, e.g. a drafting script, for use by such a system can select whether to employ an instruction of the first type or of the second type, and can therefore control the complexity of the target document generated therefrom.

Each said instruction is preferably expressed (written/defined) in a markup language, for example in XML.

The additional information may comprise a colour or another symbol. For example, the portion concerned (or content within the portion concerned) may be coloured with one colour to indicate the first status, and another colour to indicate the second status. Alternatively, or additionally, the portion concerned may include or be associated with one symbol to indicate the first status, and another symbol to indicate the second status.

Such a system preferably further comprises a user interface operable to display the target document, or a document generated therefrom, in a first mode in which any such portion having said second status is included in the displayed document, or in a second mode in which any such portion having said second status is excluded from the displayed document. Further, such a user interface is preferably operable, in said first mode, to include any such additional information in the displayed document and, in said second mode, to exclude any such additional information from the displayed document. Preferably, the user interface is operable to include any such portion having said first status in the displayed document in both said first mode and said second mode.

Accordingly, it will be appreciated that the system may be employed to display a "draft" document (in the first mode), in which portions that will not be included in a "final" document (in the second mode) because of the current data, but which are optional portions and could be selected to be included in the final document by changing the data, are indicated to the user. Similarly, it will be appreciated that the system may be employed to display a "draft" document (in the first mode), in which portions that will be included in a "final" document (in the second mode) because of the current data, but which are optional portions and could be selected as not to be included in the final document by changing the data, are indicated to the user. The user may then chose to change the data, by following a link or another such device in the displayed document, so as to change the status of a portion of the document, if desired.

Such a system preferably further comprises a tester operable, for the or each said instruction of the first type, to test the data concerned against a condition defined by logic, wherein said assigner is operable, for the or each said instruction of the first type, to assign said first status to the corresponding portion if the data concerned satisfies the condition concerned, and to assign said second status to the corresponding portion if the data concerned does not satisfy the condition concerned. Preferably, the logic for the or each instruction of the first type is expressed (written/defined) in its respective instruction.

Preferably, such a system comprises a further includer operable to include a link in said target document, said link being operable to access a data-changing device for use in changing said data to other data, for example from working data to alternative working data.

The data employed by such a system may comprise a composite data item being an instance of a composite data type. Further, such a system may further comprise a data-accessing unit operable to employ a predetermined definition of said composite data type to access said composite data item for use by at least one of said interpreter and said includers.

According to an embodiment of an aspect of the present invention, there is provided an electronic-document generation system for generating a target document, the system comprising: an interpreter operable to interpret an instruction of a predetermined type, said instruction referring to working data and identifying a content item for use in generating said target document; a first includer operable, in dependence upon said data, to either include or not include said content item or content derived therefrom in said target document; and a second includer operable to include additional information in said target document, said additional information being indicative of how a change of said working data to alternative working data would affect the content and/or structure of the target document.

The instruction is preferably defined (written/expressed/presented) in a markup language, for example in XML. The first includer is preferably operable to only include said content item or said content derived therefrom if said working data satisfies a condition defined by logic. The logic is preferably defined (written/expressed/presented) in said instruction. Such a system preferably comprises a further includer operable to include a link in such a target document, the link being operable to access a data-changing device for use in changing said working data to said alternative working data.

The data employed by such a system may comprise a composite data item being an instance of a composite data type. Further, such a system may further comprise a data-accessing unit operable to employ a predetermined definition of said composite data type to access said composite data item for use by at least one of said interpreter and said includers.

According to an embodiment of an aspect of the present invention, there is provided a computer-implemented method for generating a target document, the method comprising: interpreting at least one instruction of a predetermined type, the or each said instruction referring to data and identifying a content item for use in generating said target document; for the or each said instruction, including the identified content item or content derived therefrom in a portion of said target document; assigning a first status or a second status different from said first status to the or each said portion of the target document in dependence upon said data; and for each said portion of the target document, including additional information in said target document indicative of whether the portion concerned has been assigned said first status or said second status.

According to an embodiment of an aspect of the present invention, there is provided a computer-implemented method for generating a target document, the method comprising: interpreting at least one instruction of a first type and at least one instruction of a second type, each said instruction referring to data and identifying a content item for use in generating said target document; for the or each said instruction of the first type, including the identified content item or content derived therefrom in a corresponding portion of said target document; for the or each said instruction of the second type, including the identified content item or content derived therefrom in a corresponding portion of said target document or not including any such content in the target document in dependence upon the data concerned; for the or each said portion corresponding to one of said instructions of the first type, assigning a first status or a second status different from said first status to that portion in dependence upon said data; for any portion corresponding to one of said instructions of the second type, assigning said first status to that portion; and for the or each said portion corresponding to one of said instructions of the first type, including additional information in said target document identifying that portion as having said first status or said second status, but, for any portion corresponding to one of said instructions of the second type, not including such additional information in said target document.

According to an embodiment of an aspect of the present invention, there is provided a computer-implemented method for generating a target document, the method comprising: interpreting an instruction of a predetermined type, said instruction referring to working data and identifying a content item for use in generating said target document; in dependence upon said data, either including or not including said content item or content derived therefrom in said target document; and including additional information in said target document, said additional information being indicative of how a change of said working data to alternative working data would affect the content and/or structure of the target document.

It will be appreciated that embodiments of aspects of the present invention also extend to electronic documents produced, or producable, by method aspects of the present invention disclosed herein. It will further be appreciated that such electronic documents may be embodied in an electronic file stored on a computer-readable storage medium, in printed form for example on paper, as a signal on a carrier, or in any other form.

According to an embodiment of an aspect of the present invention, there is provided a computer-readable storage medium storing a computer program which, when executed on a computer of an electronic-document generation system, causes the system to: interpret at least one instruction of a predetermined type, the or each said instruction referring to data and identifying a content item for use in generating a target document; for the or each said instruction, include the identified content item or content derived therefrom in a portion of said target document; assign a first status or a second status different from said first status to the or each said portion of the target document in dependence upon said data; and for each said portion of the target document, include additional information in said target document indicative of whether the portion concerned has been assigned said first status or said second status.

According to an embodiment of an aspect of the present invention, there is provided a computer-readable storage medium storing a computer program which, when executed on a computer of an electronic-document generation system, causes the system to: interpret at least one instruction of a first type and at least one instruction of a second type, each said instruction referring to data and identifying a content item for use in generating a target document; for the or each said instruction of the first type, include the identified content item or content derived therefrom in a corresponding portion of said target document; for the or each said instruction of the second type, include the identified content item or content derived therefrom in a corresponding portion of said target document or not include any such content in the target document in dependence upon the data concerned; for the or each said portion corresponding to one of said instructions of the first type, assign a first status or a second status different from said first status to that portion in dependence upon said data; for any portion corresponding to one of said instructions of the second type, assign said first status to that portion; and for the or each said portion corresponding to one of said instructions of the first type, include additional information in said target document identifying that portion as having said first status or said second status, but, for any portion corresponding to one of said instructions of the second type, not include such additional information in said target document.

According to an embodiment of an aspect of the present invention, there is provided a computer-readable storage medium storing a computer program which, when executed on a computer of an electronic-document generation system, causes the system to: interpret an instruction of a predetermined type, said instruction referring to working data and identifying a content item for use in generating a target document; in dependence upon said data, either include or not include said content item or content derived therefrom in said target document; and include additional information in said target document, said additional information being indicative of how a change of said working data to alternative working data would affect the content and/or structure of the target document.

According to an embodiment of an aspect of the present invention, there is provided an electronic-document generation system operable to generate a target document by executing a program and at least one subroutine in dependence upon data, wherein the content and/or structure of said target document is dependent upon said data.

The program and said subroutine(s) are each preferably defined (expressed/presented/written) in a markup language, for example in XML. The program and said subroutine(s) are further preferably each defined (expressed/presented/written) in a drafting script accessible by the system. The or at least one of the subroutines may actually be said program, such that the program is executed at least twice during such generation.

The system is preferably arranged such that: at least one of said program and said at least one subroutine refers to document content for inclusion in said target document during such generation; and the system is operable to include said document content in the target document in dependence upon said data during said generation.

The system is preferably arranged such that: at least one of said program and said subroutine(s) refers to a rule for evaluation based on said data during such generation, said rule specifying how the content and/or structure of at least a part of said target document should depend upon said data; and the system is operable to evaluate said rule during said generation and to generate said part of the target document in dependence upon a result of said evaluation.

The program is preferably a function declaring at least one parameter for passing said data thereto. Further, the system is preferably arranged such that: the program is a function declaring at least one parameter; and the system is operable, during such generation, to: set the or each parameter of said program to a value of at least part of the data based upon predetermined parameter-setting information; and execute the program in dependence upon the or each set parameter. The predetermined parameter-setting information may be held in a setting script accessible by the system, and that setting script may be defined (expressed/presented/written) in a markup-language, for example in XML.

Similarly, the or each said subroutine is preferably a function declaring at least one parameter for passing some or all of said data thereto. Further, the system is preferably arranged such that: the or each said subroutine is a function declaring at least one parameter; said program and said subroutine(s) are configured such that the or each said subroutine is designated by at least one calling instruction defined (expressed/presented/written) in said program or in the or one of the subroutines; each said calling instruction comprises parameter-setting information for setting the or each parameter of the designated subroutine to a value, or part of a value, referred to within the program or subroutine defining (expressing/presenting) that calling instruction; and the system is operable, during such generation and for the or each said subroutine, to: set the or each parameter of the subroutine concerned in dependence upon the parameter-setting information of the calling instruction designating that subroutine; and execute the subroutine concerned in dependence upon the or each set parameter. At least one said value referred to within the program or within one of said subroutines may be referred to by referring to a declared parameter.

The program and the subroutine(s) may be configured such that, during said generation, at least one said subroutine is executed at least twice, and such that the content and/or structure of parts of said target document generated by respective executions of that subroutine differ from one another.

The system may be arranged such that: at least one of said program and said subroutine(s) expresses a recursive call instruction designating that program or subroutine and a recursion-terminating condition; and the system is operable, during such generation, to execute that program or subroutine recursively until said recursion-terminating condition is satisfied. Further, the system may be arranged such that the generation comprises the execution of the program and at least two subroutines, and wherein at least one of the subroutines is configured to call at least another one of the subroutines.

Each subroutine may be executed while suspending execution of the preceding program or subroutine in a nested fashion. Alternatively, the system may be operable to execute one or more such subroutines simultaneously.

The data employed by such a system may comprise at least one composite data item, the or each composite data item being an instance of a respective composite data type. Further, the program (or, similarly, one or more of the subroutines) may comprise a function declaring a typed parameter for passing a value thereto, and the system may thus be operable, during such generation, to: set the typed parameter to a value of the or one of the composite data items of the same type, or to a value of a component part of the or one of said composite data items of the same type, in dependence upon parameter-setting information; and execute said program in dependence upon the set parameter.

The target document is preferably generated (written/defined) in a markup language, such as XML. Optionally, the target document is in a format suitable for displaying with a word-processing application. For example, the target document may be in any one of an RTF, an HTML, a PDF, and a Microsoft-Word format. The target document, or a document generated therefrom, may be a formatted text document, a structured document, a structured text document or any combination thereof.

According to an embodiment of an aspect of the present invention, there is provided a computer-implemented method for generating a target document, the method comprising generating the target document by executing a program and at least one subroutine in dependence upon data, wherein the content and/or structure of the target document is dependent upon said data.

According to an embodiment of an aspect of the present invention, there is provided a computer-readable storage medium storing a computer program for generating a target document which, when executed on a computer of an electronic-document generation system, causes the system to generate the target document by executing a program and at least one subroutine in dependence upon data, wherein the content and/or structure of said target document is dependent upon said data.

According to an embodiment of an aspect of the present invention, there is provided an electronic-document generation system comprising: data-accessing means operable to employ a predetermined definition of a composite data type to access a composite data item being an instance of said composite data type from a data source; and generation means operable to employ a drafting script written in a markup language to generate a target document by evaluating logic in dependence upon said accessed composite data item.

The predetermined definition may comprise an expression definition for use in expressing the data item in said target document. For example, the logic may specify that the data item should be expressed (presented) in said target document, and the generation means may, in that case, employ the expression definition during generation of said target document to express said data item in the target document.

Such a composite data item may represent, for example, a person or a company. Such an expression definition may thus define how that person or company should be represented in the document. For example, the expression definition may provide that, in the case of a company, the company's name and address and registration number should be presented, possibly in a defined format, when that company is expressed in the target document. Alternatively, the expression definition may provide that, in the case of a company, only the company's name should be presented, possibly in a defined format, when that company is expressed in the target document.

According to an embodiment of an aspect of the present invention, there is provided a computer-implemented method for generating a target document, the method comprising: employing a predetermined definition of a composite data type to access a composite data item being an instance of said composite data type from a data source; and employing a drafting script written in a markup language to generate the target document by evaluating logic in dependence upon said accessed composite data item.

According to an embodiment of an aspect of the present invention, there is provided a computer-readable storage medium storing a computer program which, when executed on a computer of an electronic-document generation system, causes the system to: employ a predetermined definition of a composite data type to access a composite data item being an instance of said composite data type from a data source; and employ a drafting script written in a markup language to generate a target document by evaluating logic in dependence upon said accessed composite data item.

According to an embodiment of an aspect of the present invention, there is provided an electronic-document generation system, comprising: a configuration unit which accesses a predetermined document-specific script for generating a target document and which, based on information contained within the predetermined document-specific script,: (i) identifies a default-data container comprising default data for said target script; (ii) generates a working-data container and populates that container with said default data; (iii) identifies a data-obtaining unit operable to obtain working data for said target document from a data source other than said default-data container, and stores the obtained working data in the working-data container; (iv) identifies a drafting script comprising document content and logic for generation of said target document, said drafting script declaring parameters for applying data to said drafting script; and (v) binds parameters of said drafting script to data items stored in said working-data container; and a generation unit which employs said drafting script to generate said target document by applying data stored in said working-data container to said drafting script based on said binding and by evaluating said logic in dependence upon said applied data.

The data employed by such a system may comprise at least one composite data item, the or each said composite data item being an instance of a respective composite data type.

Such a container may comprise any entity that may store data. Such storage may be temporary, semi-permanent or permanent. For example, such a container may be embodied by: a computer-readable storage medium, such as a disk; a computer file stored in/on such a storage medium; a computer program by itself; and/or a relational database.

According to an embodiment of an aspect of the present invention, there is provided a computer-implemented method for generating a target document, the method comprising: accessing a predetermined document-specific script for generating the target document and, based on information contained within the predetermined document-specific script,: (i) identifying a default-data container comprising default data for said target document; (ii) generating a working-data container and populating that container with said default data; (iii) identifying a data-obtaining unit operable to obtain working data for said target document from a data source other than said default-data container, and storing the obtained working data in the working-data container; (iv) identifying a drafting script comprising document content and logic for generation of said target document, said drafting script declaring parameters for applying data to said drafting script; and (v) binding parameters of said drafting script to data items stored in said working-data container; and employing said drafting script to generate said target document by applying data stored in said working-data container to said drafting script based on said binding and by evaluating said logic in dependence upon said applied data.

According to an embodiment of an aspect of the present invention, there is provided a computer-readable storage medium storing a computer program which, when executed on a computer of an electronic-document generation system, causes the system to: access a predetermined document-specific script for generating a target document and, based on information contained within the predetermined document-specific script,: (i) identify a default-data container comprising default data for said target document; (ii) generate a working-data container and populate that container with said default data; (iii) identify a data-obtaining unit operable to obtain working data for said target document from a data source other than said default-data container, and store the obtained working data in the working-data container; (iv)

identify a drafting script comprising document content and logic for generation of said target document, said drafting script declaring parameters for applying data to said drafting script; and (v) bind parameters of said drafting script to data items stored in said working-data container; and employ said drafting script to generate said target document by applying data stored in said working-data container to said drafting script based on said binding and by evaluating said logic in dependence upon said applied data.

It will be appreciated that system aspects, or features thereof, are applicable equally to method and computer program aspects (and to any other aspects of the present invention), and vice versa. It will be appreciated that although aspects of the present invention are directed to a computer-readable storage medium storing a computer program, aspects of the present invention also extend to such computer programs by themselves. It will also be appreciated that embodiments of aspects of the present invention also extend to electronic documents produced, or producable, by method aspects of the present invention disclosed herein. It will further be appreciated that such electronic documents may be embodied in an electronic file stored on a computer-readable storage medium, in printed form for example on paper, as a signal on a carrier, or in any other form.

Due to the complex nature of documents automation systems, the present invention is intended to include any combination of any of the aforementioned aspects of the present invention, and/or any of the aforementioned preferable features thereof. The present invention is also intended to include combinations of the features disclosed below in the detailed description of the invention.

DETAILED DESCRIPTION OF THE INVENTION

Reference will now be made, by way of example, to the accompanying drawings, in which:

FIGS. 5 to 12 show typical interface screens of a user interface of the FIG. 1 system.

SYSTEM OVERVIEW

Figure 1:
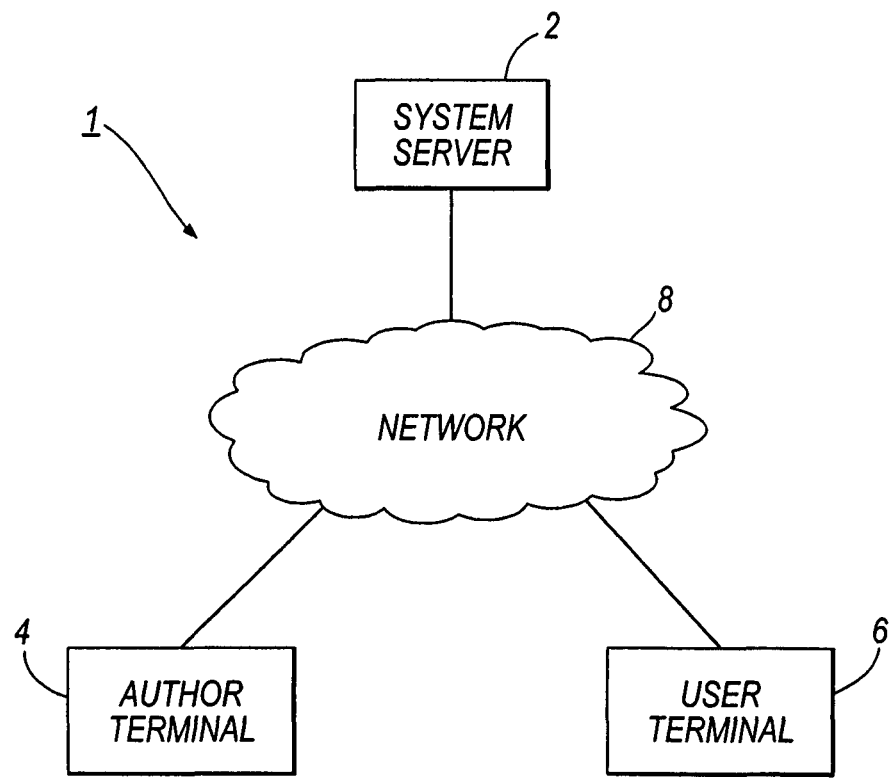
FIG. 1 is a schematic diagram of a system embodying the present invention.

FIG. 1 is a schematic diagram of a system 1 embodying the present invention. The system 1 comprises a system server 2, an author terminal 4, and a user terminal 6 connected to one another via a network 8. It will be appreciated that the network 8 could be any type of network, for example the Internet, a LAN (local area network) or a mobile cellular network, or any combination thereof. Accordingly, the system server 2, the author terminal 4 and the user terminal 6 could all be located in the same place or spread across the world. Equally, the functionality of the system server 2, the author terminal 4 and user terminal 6 could be provided on a single computing device.

As can be appreciated from FIG. 1, the system 1 is designed to interact with two different types of people, namely users and authors. The authors use the author terminal 4 to tailor the system 1 to be able to generate a certain type of document or suite of documents. The users in turn use the user terminal 6 to employ the system so tailored to generate such documents or suites of documents.

Because users of the system 1 may typically use the system to generate complex legal documents, the system 1 has been designed such that such a legal expert, for example a lawyer, can act as an author and tailor the system as mentioned above. Further, because the functionality of the system 1 is provided in software (i.e. by a computer program or suite of programs), that software has been adapted to employ scripts to produce the required documents. Authors, such as lawyers, can produce such scripts with only minimal training, as compared to training such authors in the art of software design.

It will be appreciated that in one embodiment of the present invention, the system 1 could comprise two system servers 2, a "staging" server and a "live" server. The staging server could be used to test out new scripts or software modifications in a test environment, such new scripts or software modifications being transferred to the live server following acceptance of those scripts or software modifications. Accordingly, it can be possible for users to employ the system 1 without being affected by ongoing maintenance and updates until that maintenance and those updates are proven to be satisfactory.

In particular, the system 1 employs XML (Extensible Mark-up Language) scripts. XML is hardware and software neutral, and accordingly it can be used to create data that different applications running on different devices can work with. An understanding of XML can be obtained from http://www.w3.org/XML and/or from http://www.w3schools.com/xml/xml_whatis.asp.

Figure 2:
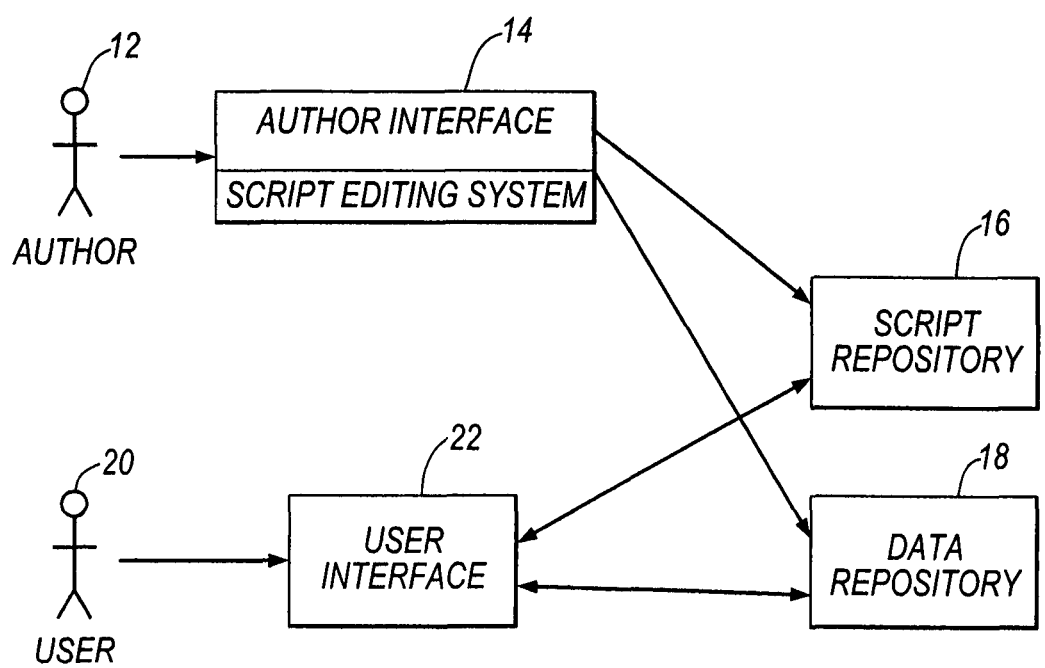
FIG. 2 is a schematic diagram for use in explaining the relationship between the role of the author, and the role of the user.

FIG. 2 is a schematic diagram for use in explaining the relationship between the role of the author, and the role of the user. FIG. 2 shows an author 12, an author interface 14, a script repository 16, a data repository 18, a user 20, and a user interface 22. The author interface 14, the script repository 16, the data repository 18, and the user interface 22 may all be implemented in the system server 2 of FIG. 1, or may be distributed across the system 1.

In general, the author 12 can use the author interface 14 to generate scripts for use in generating documents. In particular, the author interface comprises a script editing system for use in generation of such scripts. The system 1 employs different types of scripts, as will be explained later. The author interface 14 stores the generated scripts in the script repository 16. The author may also generate default data so that it is possible for documents to be generated using that default data, i.e. without requiring any working data to be supplied to the system 1. The default data is stored in the data repository 18.

The user 20 can employ the user interface 22 to access scripts in the script repository 16, and data in the data repository 18, to generate documents. As will be explained later, the user can also store working data in the data repository 18 in place of or in addition to the default data, and can also store amended scripts in the script repository 16 in place of or in addition to the scripts provided by the author.

Figure 3A:
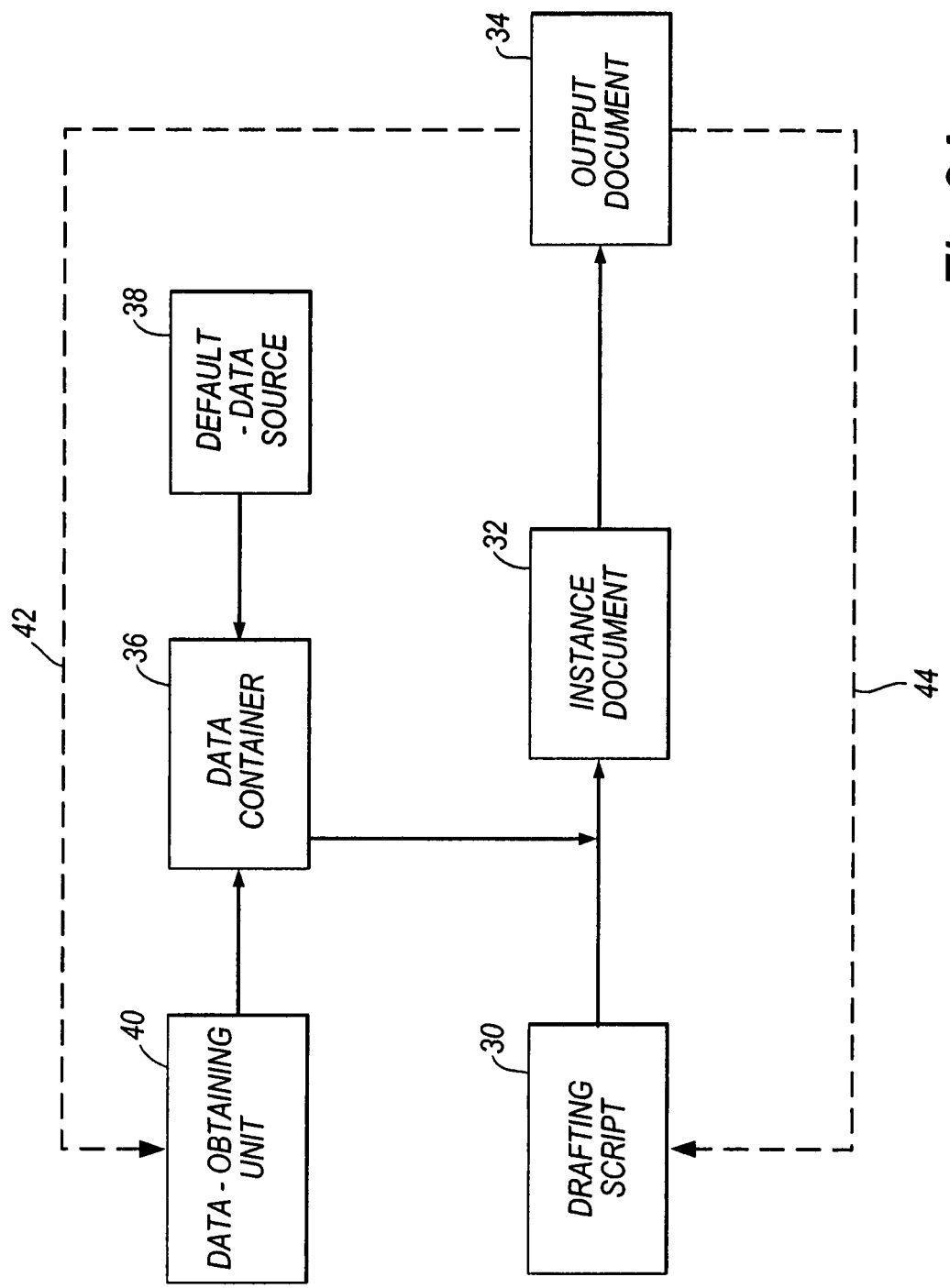
FIG. 3A is a schematic overview useful for explaining the general methodology employed by the system of FIG. 1.

FIG. 3A is a schematic overview useful for explaining the general methodology employed by the system 1. The schematic overview of FIG. 3A presents an XML drafting script 30 (as one type of script used by the system 1), an XML instance document 32, an output document 34, a data container 36, a default-data source 38, and a data-obtaining unit 40. The XML drafting script 30 could, for example, be stored in the script repository 16, and similarly the data container 36 and the default-data source 38 could, for example, be stored in the data repository 18.

The XML drafting script 30 is used to generate the XML instance document 32. The XML instance document 32 is then converted into an output document so as to be viewed by a user of the system 1. The output document may be in any format, for example in an HTML format for viewing with a web browser, or in a Microsoft Word format (e.g. WordML) for viewing with Microsoft Word. It will of course be appreciated that the system 1 may be employed to produce the output document 34 directly from the drafting script 30, thereby avoiding production of the XML instance document 32, for example if only one type of output document 34 (such as HTML) is required.

The XML drafting script 30 contains document content and logic for use in generating the instance document 32. The drafting script declares parameters for use in passing data thereto from the data container 36. That data may be used both to form document content and to evaluate the logic contained within the XML drafting script 30 during generation of the XML instance document 32.

The data stored in the data container 36 may be default data obtained from the default-data source 38. Alternatively, or additionally, the data stored in the data container 36 may be working data obtained by (or made available by) the data-obtaining unit 40 from a source other than the default-data source 38, and stored in the data container 36 for use in generating the XML instance document 32.

The data-obtaining unit 40 preferably employs an XML question-session script (not shown) to elicit the working data from a user by prompting the user to answer one or more questions during a question session. An XML question-session script is another type of script employed by the system 1, and the use of such scripts is described in greater detail below. The data-obtaining unit 40 may be employed to obtain working data from a source other than a user. In that case, it may serve as an adapter to allow data to be sourced from an external system, for example from a database. The use of the data-obtaining unit 40 as an adapter is described in greater detail below.

FIG. 3A also shows two feedback routes 42 and 44. The function of such feedback routes is explained in greater detail below, however it is to be understood that the system 1 provides a link (feedback route 42) from the output document 34 to the data-obtaining unit 40 to enable the user to amend the data stored in the data container 36, and a link (feedback route 44) from the output document 34 to the XML drafting script 30 to enable the user to amend the drafting script 30 itself. It will be appreciated that the system 1 therefore enables a user to view the output document 34 in a familiar form (e.g. as a Microsoft Word document) and to amend that document as he sees fit, such amendments being recorded by means of the feedback routes 42 and 44 such that a further generation of the XML instance document 32 and the output document 34 will produce the output document 34 in the amended form.

Although not clearly shown in FIG. 3A, it is to be understood that the XML instance document 32 may be generated from more than one XML drafting script 30, or from a single XML drafting script 30 calling a number of XML sub-drafting scripts. It is also to be understood that the data for use in generating the XML instance document 32 may be obtained from more than one data container 36, and that the data stored in those data containers 36 may have been sourced from two or more default-data sources 38, and/or obtained by two or more data-obtaining units 40. This feature of the system 1 is explained in greater detail below.

Figure 3B:
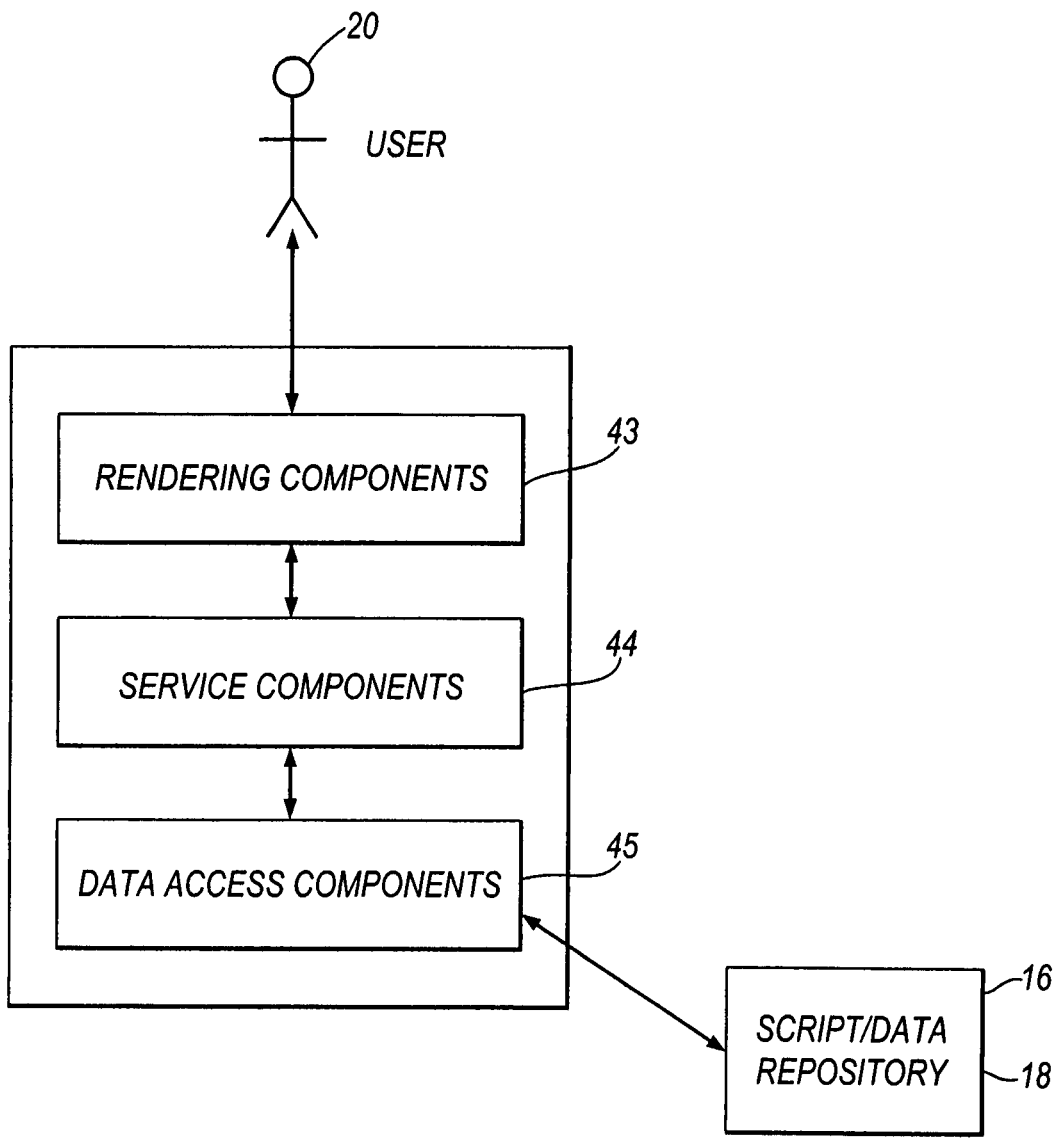
FIG. 3B is a schematic diagram to illustrate how the system of FIG. 1 is organised.

FIG. 3B is a schematic diagram to illustrate how the system 1 is organised so as to benefit from the hardware- and software-neutral nature of XML scripts. Question-session scripts and drafting scripts written in XML specify their content without being committed to any particular rendering technology. For example, questions defined by a question-session script could be rendered in HTML or by controls on Windows Forms or by any other medium which allows the expression of structured controls. Correspondingly, drafting scripts are used to generate instance documents in an XML form which may be rendered in HTML, in Word, in RTF, in PDF or in any other structured document format.

This independence from rendering technologies is represented in the way that software employed by the system 1 is organised. The software is organised into three layers; a top layer 43, a middle layer 44, and a bottom layer 45. The bottom layer 45 communicates with the script and data repositories 16, 18. The middle layer 44 implements the core services such as that of generating an instance document 32 from a drafting script 30 and a set of data from a data container 36. The top or 'front' layer 43 is responsible for rendering the results of the services provided by the middle layer 44 for presentation to a user 20. Thus, for example, this top layer 43 might render questions of a question-session script as a page of HTML controls, or might render a generated instance document 32 as a Microsoft Word output document 34, or as an HTML page.

The layers 43, 44, and 45, are organised so that lower layers are independent of higher layers. That is, the (data access) bottom layer 45 can work without the (service) middle layer 44. And, more importantly, the data-access layer 45 and the service layer 44 can work without the (rendering) top layer 43. Accordingly, the rendering layer 43 can employ different rendering components while the rest of the system (layers 44 and 45) stays the same. For example, so far as the service 44 and data-access 45 layers are concerned, the task of generating a document is exactly the same whether the document is to be rendered as an HTML page or rendered as a Microsoft Word document.

Figure 4:
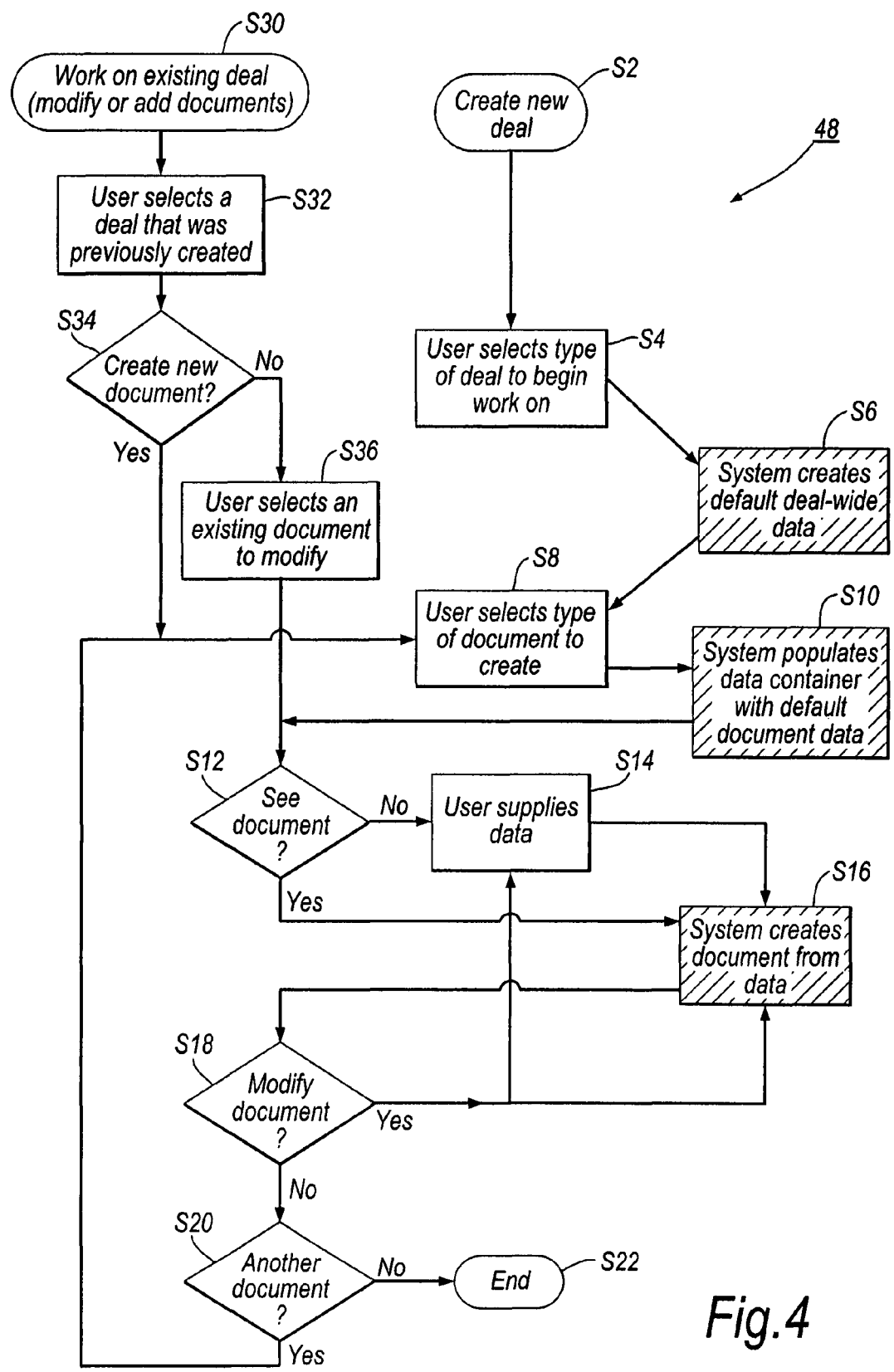
FIG. 4 is a flow diagram of a method for use by the system of FIG. 1.

FIG. 4 is a flow diagram of a method 48 for use by the system 1. The method 48 represents the interaction between a user and the system 1. The un-shaded boxes of FIG. 4 represent choices presented to the user by the system 1 and actions carried out by the user in response to those choices. The shaded boxes (steps S6, S10 and S16) represent actions carried out by the system 1 in response to the user's actions. The operation of method 48 assumes that an author has already tailored the system 1 for use by the user as discussed above.

In discussing the method 48, reference will be made to FIGS. 5 to 12, which show typical interface screens of a user interface of the system 1 during operation of the method 48.

Those interface screens are shown displayed by a web browser, however it is understood that the system 1 could use other means to interact with a user.

Figure 5:
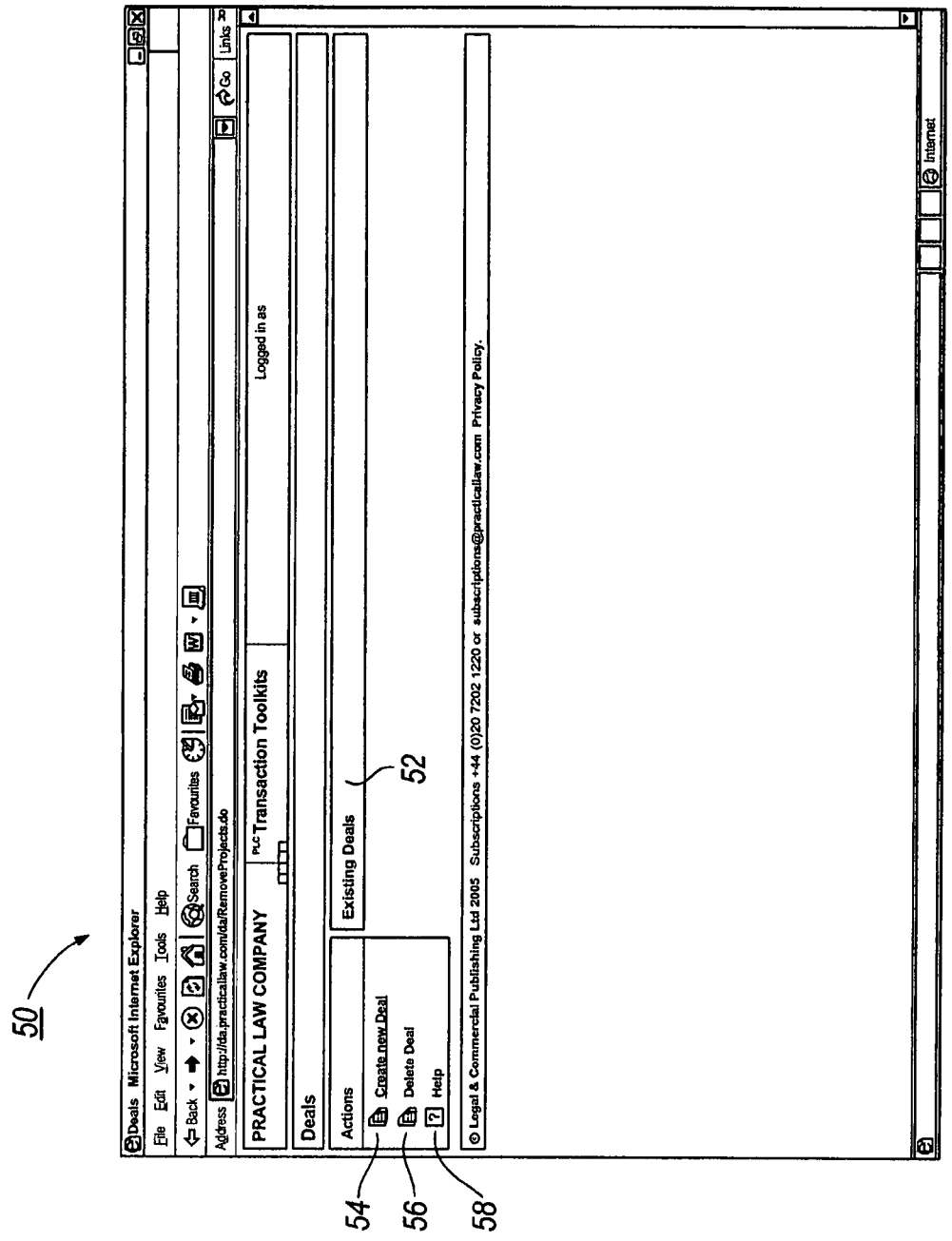

The system 1 is organised to support a deal which represents a transaction in which more than one document is required. Accordingly, a user using the system 1 for the first time will typically start at step S2 of the method 48 by creating a new deal. FIG. 5 shows an interface screen 50 which may be seen by a user using the system 1 for the first time. The interface screen 50 presents a list of existing deals 52 to the user. In this case, as the user is using the system for the first time, no such deals are listed. The interface screen 50 also allows the user to carry out a number of actions, namely to create a new deal 54, delete a deal 56, and to seek system help 58. At step S2 of the method 48, the user may thus elect to create a new deal 54.

Figure 6:
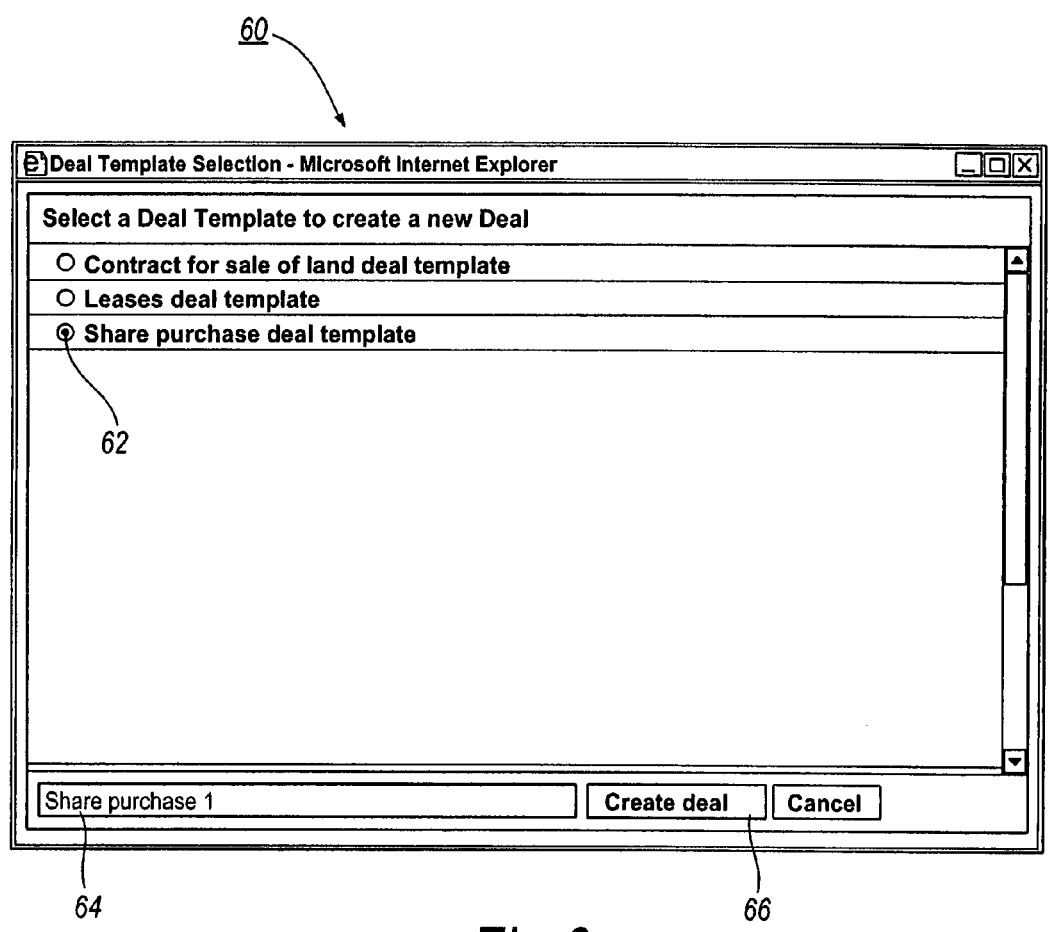

At step S4, the user may select a deal template to create a new deal. FIG. 6 shows an interface screen 60 which may be presented to the user at this stage. Interface screen 60 presents the user with three possible deal templates. In the present case, the "Share purchase deal template" has been selected 62. A field 64 at the bottom of interface screen 60 allows the user to enter a name for the deal. In the present case, the name "Share purchase 1" has been entered. A button 66 marked "Create Deal" allows the user to effect his selection.

Figure 7:
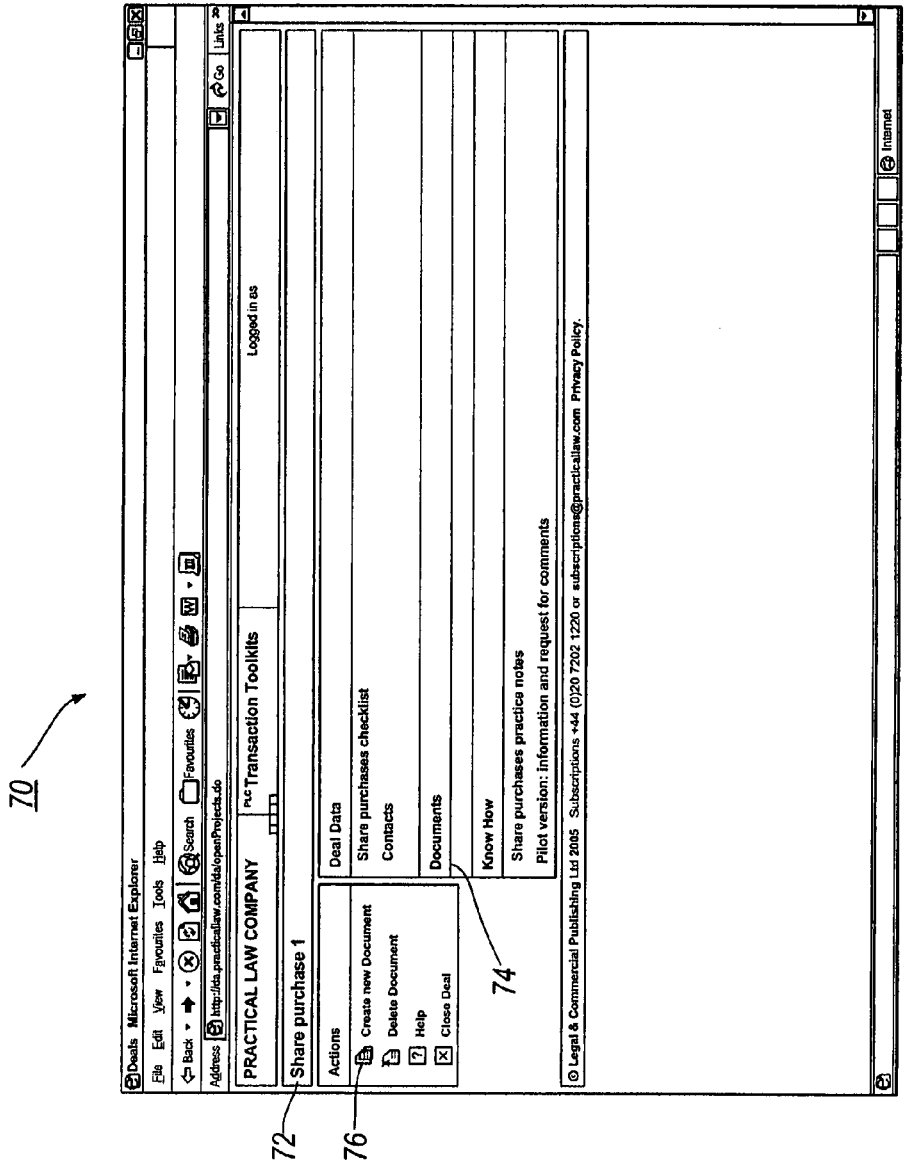

In response to the user's selection at step S4 the method 48 proceeds to step S6 at which the system 1 creates default deal-wide data, i.e. some initial default data that which will be appropriate for deals of the selected type, regardless of what documents are eventually generated. FIG. 7 shows an interface screen 70 which may be presented to the user at this stage. Interface screen 70 identifies the previously-generated deal as "Share purchase 1" at box 72, and provides a list 74 of the generated documents that are part of that deal. At this stage, no such documents have yet been generated, and as such none are listed. The interface screen 70 allows the user to carry out a number of actions of which one is to create a new document 76. In response to the user selecting the "create a new document" action 76, the method proceeds to step S8.

Figure 8:
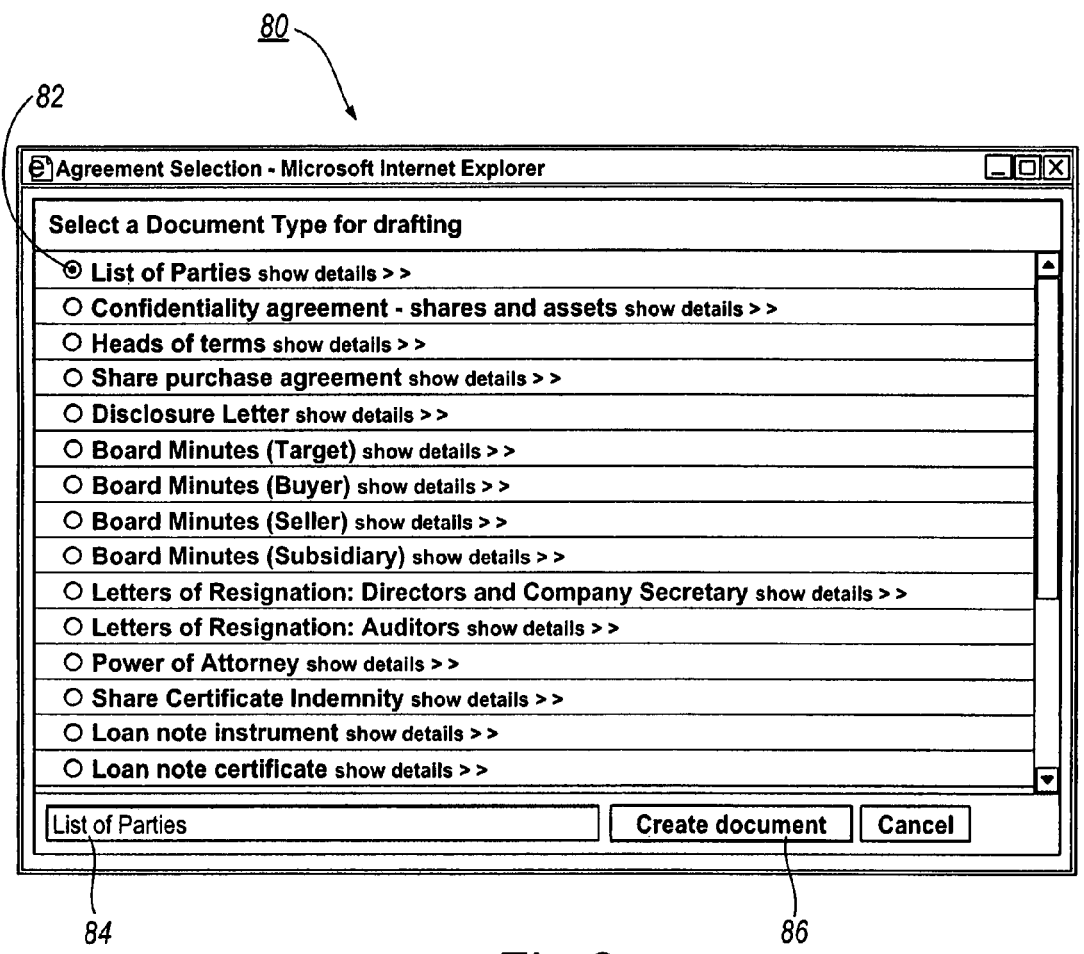

At step S8 the user is presented with a list of possible document types suitable for the selected deal. FIG. 8 shows an interface screen 80 which may be presented to the user at this stage. The interface screen 80 lists types of document that are available, and in the present case it can be seen that the "List of Parties" type has been selected 82. The interface screen 80 allows the user to enter a name for the selected document in box 84, and further allows the user to initiate the creation of a document of the selected type by clicking the "create document" button 86.

In response to the user selecting the desired type of document at step S8, the method proceeds to step S10 in which the system 1 creates a data container for the desired document, and populates that container with default data for that document, i.e. some initial default data which will be appropriate for that type of document. The method 48 then proceeds to step S12.

Figure 9:
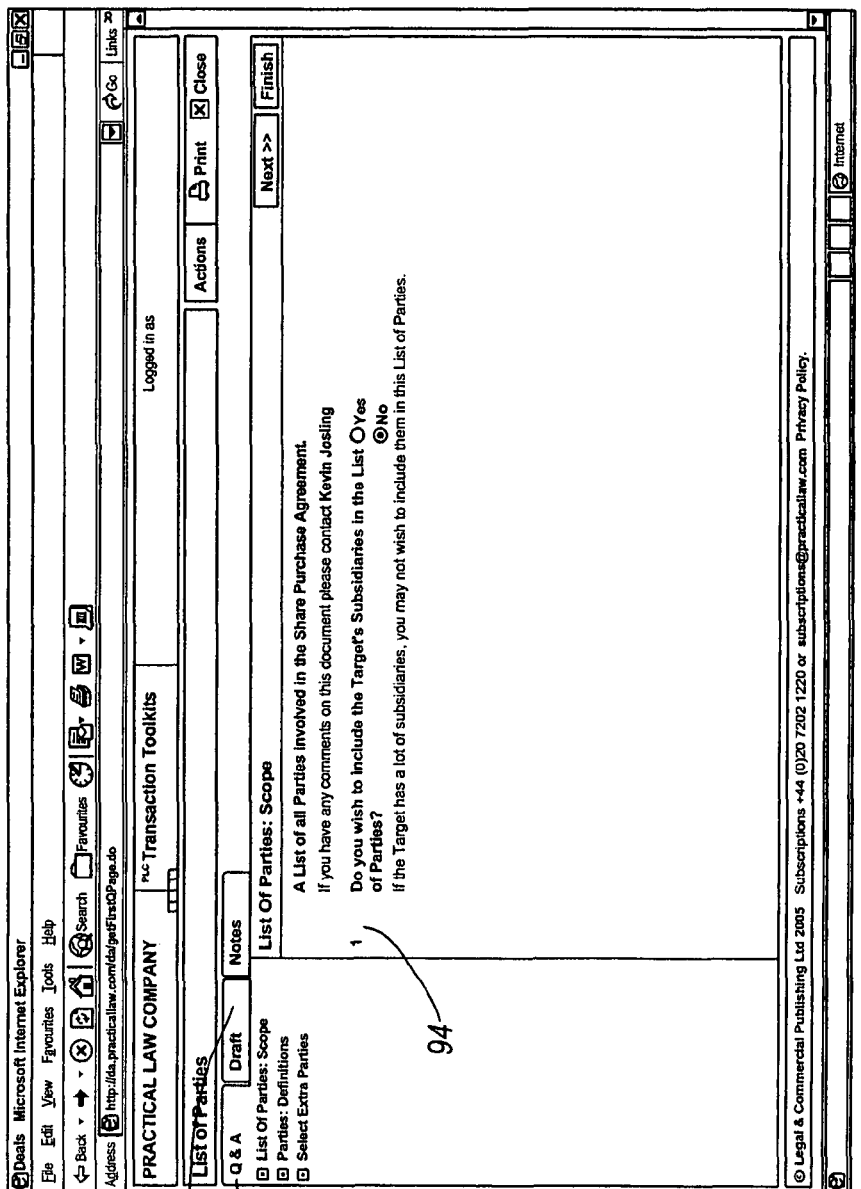

At step S12, the user is presented with a choice. FIG. 9 shows a typical interface screen 90 which would be presented to the user at this stage. The user may want either to see the document generated using the default data, or to provide some initial working data up-front. Accordingly, the interface screen 90 presents two options amongst others. The user can select the "Q & A" tab 92 (as shown) and proceed by answering a series of questions 94, or the user can select the "Draft" tab 96 (as hidden) and proceed by viewing the document as generated using the default data.

If, at step S12, the user decides that he would prefer to provide some initial data up-front, the method 48 proceeds to step S14 and the user is then typically prompted by a series of questions, which are relevant to the desired document, to provide the working data by answering those questions. The working data is then stored in a container or a set of containers for use in generating the desired document. The method then proceeds to step S16 in which the desired document is generated using the working data as provided by the user, and optionally some of the default data where the user has not answered all questions relevant to the desired document.

Figure 10:
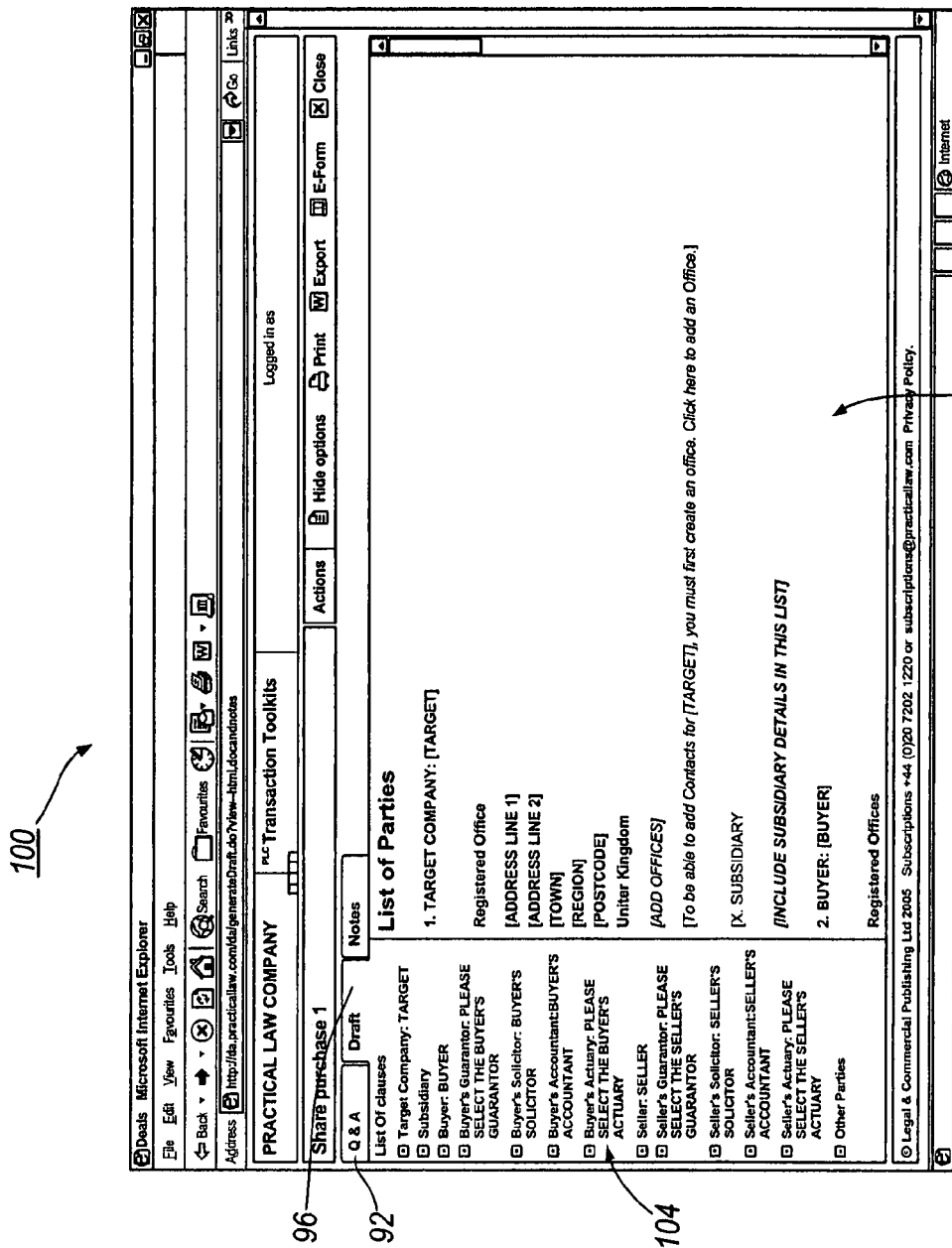

If, at step S12, the user chooses to see the document generated using the existing data, in this case using the default data without providing some initial working data up-front, the method proceeds to step S16 and the desired document is created from the default data (as no working data is yet available) and is presented to the user. FIG. 10 is a typical interface screen 100 which would be presented to the user at this stage. The interface screen 100 is similar to the interface screen 90 except that the "Draft" tab 96 has been selected and the desired document is shown in box 102. A list of clauses 104 is also shown to give the user an overview of the structure of the generated document. The method then proceeds to step S18 in which the user can choose to modify the generated document.

The generated document displayed to the user in box 102 contains devices to enable the user to modify or add to the data that is used in the generation of that document. One example of such a device is a link that takes the user to questions whose answers provide the data employed in the document's generation. If the user chooses to modify the generated document in this way, the method proceeds through steps S14 and S16 again to regenerate the document using the modified or new data. The method then returns to step S18.

The generated document displayed to the user in box 102 also contains devices to enable the user to modify or add to the document content that is not dependent on the data used in the generation of that document. That is, the system 1 allows the user to amend the drafting script itself. One example of such a device is a link that records such an amendment made by the user and effects a corresponding amendment in the appropriate drafting script. If the user chooses to modify the generated document in this way, the method proceeds to step S16 again to regenerate the document using the modified drafting script and the existing data. The method then returns to step S18.

Once the user has finished working on the generated document for the time being, the user can decide in step S20 whether he would like to add another document to the existing deal. If he decides that another such document is required, the method returns to step S8 to allow the user to select another document type (or the same type again) from a list such as that shown in FIG. 8. If, however, the user decides that no such further document is required, the method terminates at step S22.

Figure 11:
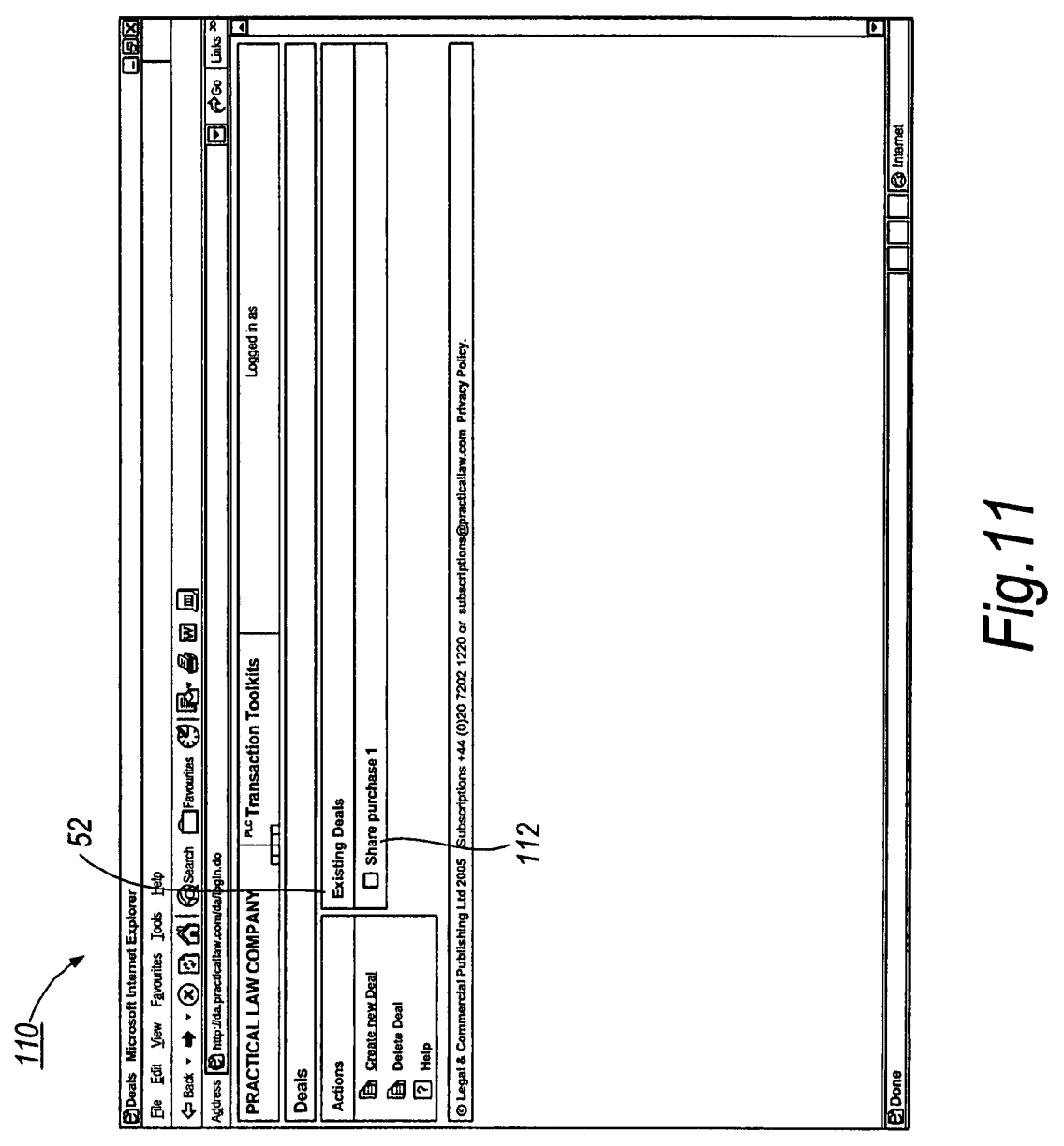

Once a deal has been created, a user may return to it and add new documents to it, or modify documents that have previously been created within it. Accordingly, method 48 allows a user to begin at step S30 and proceed to step S32. At step S32, the user can select an existing deal. FIG. 11 is a typical interface screen 110 which would be presented to the user at this stage. The interface screen 110 is similar to the interface screen 50 of FIG. 5, except that the list of existing deals 52 now lists the previously-created deal "Share purchase 1". Accordingly the user can choose that deal to be worked upon.

At step S34 the user can decide whether he would like to create a new document for the deal, or work on an existing document. In the former case, the method proceeds to step S8, and in the latter case the method proceeds to step S36.

Figure 12:
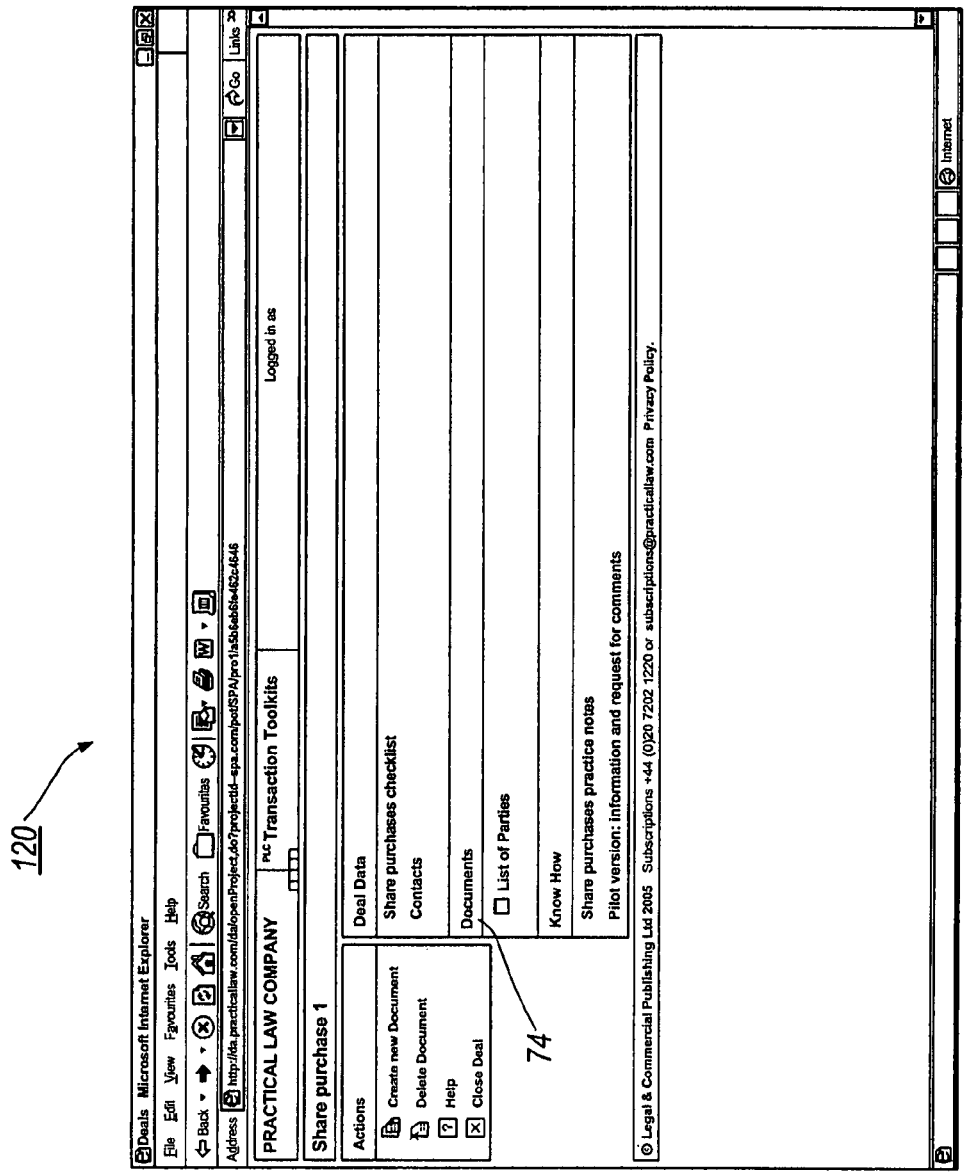

FIG. 12 is a typical interface screen 120 which would be presented to the user at step S36. The interface screen 120 is similar to the interface screen 70 of FIG. 7, except that the list 74 of the generated documents that are part of the "Share purchase 1" deal now lists the previously-generated document "List of Parties". The method then proceeds to step S12.

Data that has been entered for one document may be relevant to several other documents in the deal. The system 1 ensures that where this is the case, the data is shared so that it does not have to be entered more than once. This feature of the system 1 is explained in greater detail below.

As previously mentioned, the system 1 of FIG. 1 is adapted to be driven by scripts, particularly XML scripts that have been prepared by an author. The types of scripts employed by the system 1 can be divided into three main types, namely document-type scripts, drafting scripts, and question-session scripts. Other types of scripts are employed by the system 1, however these three types are the most important types used by the system 1.

Document-type scripts are used to associate drafting scripts with question-session scripts and to bind the data variables used by the drafting script to values of data elicited from users (or made available from other sources), or to default data. Accordingly, document-type scripts also identify a container of default data. As already mentioned, question-session scripts are employed by the data-obtaining unit 40 to elicit data from users and drafting scripts are employed to generate documents in dependence upon the elicited data and/or default data based on the methodology discussed above.

Figure 13:
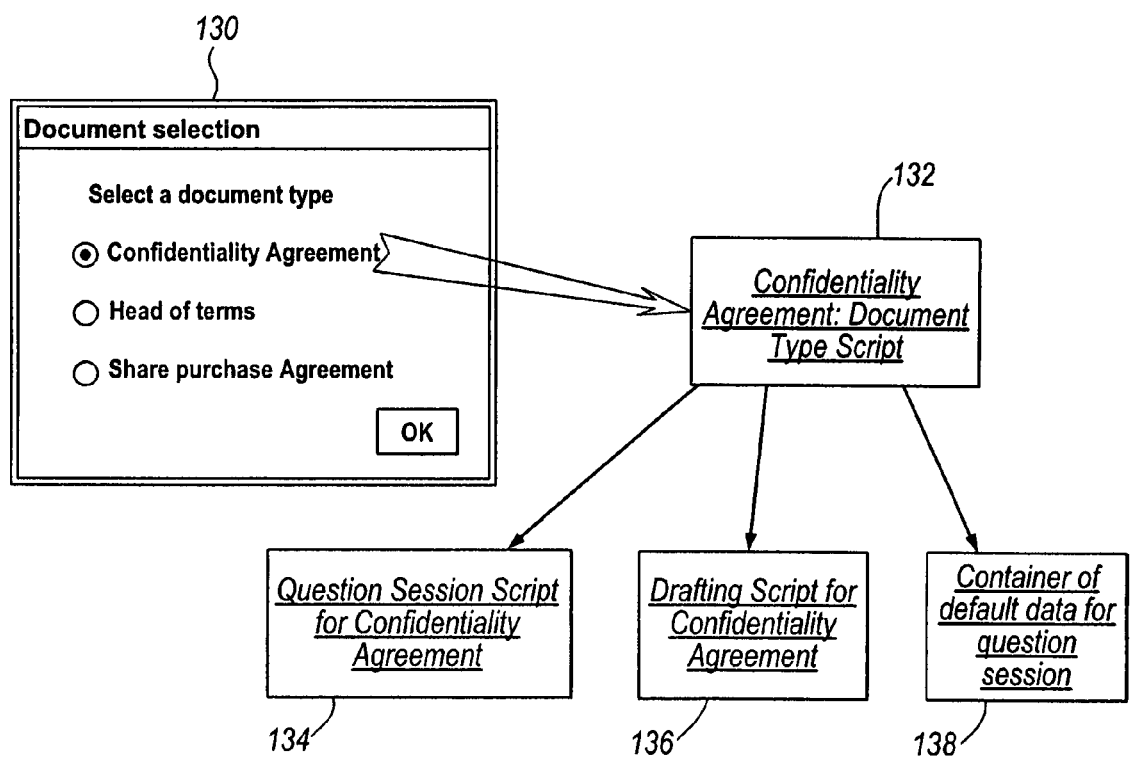
FIG. 13 is a schematic diagram illustrating the use of document-type scripts.

When a user chooses a type of document to create, for example during step S4 of the method 48, the system activates a document-type script for that type of document. Accordingly, based on the content of that document-type script, a drafting script, a question-session script, and a container of default data are identified. FIG. 13 is a schematic diagram illustrating this principle. FIG. 13 shows an interface screen 130 similar to the interface screen 60 of FIG. 6, in which a user has selected a confidentiality agreement as the desired type of document. In response to this action, the system 1 has activated a document-type script 132 for confidentiality agreements. Accordingly, a question-session script 134, a drafting script 136, and a container 138 of default data for the question session script 134 have been identified. One reason for separating the scripts into document-type, question-session, and drafting scripts is to enable the same drafting script to be used with different question-session scripts in different contexts.

In order to understand the system 1 further, it is necessary to consider the scripts that it employs in more detail.

Question-Session Scripts

As mentioned above, a question-session script is employed by the system 1 to elicit data from a user. Typically, such a question-session script is used to define questions that are put to a user so as to obtain working data therefrom. It will be appreciated that a fundamental requirement of the system 1 is to be able to handle data efficiently and accurately, and this feature of the system 1 will be considered alongside question-session scripts.

As question-session scripts need to be writable by an author (who may be a lawyer having only minimal knowledge of software design), the system 1 has been designed such that those scripts define the questions to be put to a user in a type of pseudo code that is easy enough for an author to read and interpret, but that contains enough information for the system 1 to present the questions to the user. The system 1 employs XML question-session scripts, and a DTD (Document Type Definition) has been developed for those question-session scripts. The scripts are structured, medium-neutral specifications of controls for data input. Forms containing the controls can be rendered in HTML or in other formats and media as mentioned above.

The script element 1 below defines the wording of a question about the name of a buyer. It also suggests the type of control that should be used by any rendering agent when presenting the question, in this case the suggestion is that the control should be one that allows the user to enter a line of text.

```
<question name="buyerName">
    <caption>What is the name of the buyer</caption>
    <uiHint value="inputLine"/>
    <answers>                                                    (1)
        <freeAnswer maxChars="512"/>
        <default>[Buyer]</default>
    </answers>
</question>
```

The script element 2 below defines the wording of a question about the type of the buyer. It also suggests the type of control that should be used by any rendering agent when presenting the question. In this case the suggestion is that the control should be one that allows users to make a choice between two options.

```
<question name="buyerType">
    <caption>Is the Buyer a company or a real person?</caption>
    <uiHint value="radioButtons"/>
    <answers>
        <default>person</default>                                (2)
        <option caption="Person">person</option>
        <option caption="Company">company</option>
    </answers>
</question>
```

Each time a question-session script is used to elicit data from a user, a response container is created to hold that data. That is, when a question-session script executes and the user provides input, the data provided by the user (together, normally, with some default data) is placed in a specifically-created container. These response containers are held in the data repository 18 as shown in FIG. 2.

It can already be seen that the system 1 may deal with types of data that have an inherent structure or hierarchy, as well as with pieces of data having no such structure. The examples of data types provided above in the script extracts 1 and 2 of 'buyerName' and 'buyerType' illustrate some simple types of data having a minimal inherent structure or hierarchy. The system 1 is of course not restricted to data having such simple name-value structures.

The data items or objects that make up the data held in response containers are instances of types of data. An example of such a type of data is a "Person". That is, data defining a person is of a particular type because it has a particular structure and content, e.g. first name, second name, address. Other types of data employed by the system 1 include types which correspond to legal concepts, for example, Obligations, Companies, Shares, etc.

A particular type of data is defined by the named properties that the instances of that type possess, together with the types of those properties. For example, consider the data type 'Address'. This is defined as follows:

Address
    Simple line1
    Simple line2
    Simple town
    Simple postcode

This has four properties, namely line1, line2, town, and postcode. Instances of each of those four properties are of type 'Simple'. The 'Simple' type has no properties other than a text value.

A further example of a data type is the "Person" type as mentioned above. The Person type is defined like this:

Person
    Simple firstNames
    Simple givenName
    Address address

That is, a person has the properties: firstNames, givenName and address. The firstNames and givenName properties are Simples, they just have a text value, but instances of the address property are of type Address as defined above.

Data items, or pieces of data, are instances of such data types, and it can be seen that such data types (and the instances of those types) can have a hierachical or tree structure. For example, an instance of Person data type corresponds to the following tree structure:

```
root of the tree (the instance of Person)
|
|--- firstNames: "John George"
|
|--- givenNames: "Smith"
|
|--- address
        |
        |--- line1: "1 Acacia Gardens"
        |
        |--- line2: ""
        |
        |--- town: "Someton"
        |
        |--- postcode: "ST1 1AA"
```

It can accordingly be seen that question-session scripts are employed to obtain data items which are instances of data types. The data obtained from each question-session script is stored in a corresponding container. As a result, each response container, in which data obtained by a particular question session is stored, can be considered to be the root of an object tree whose immediate children are instances of these data types such as Persons, Obligations etc. Each data container can be embodied in an XML script form, and a DTD has been developed therefor. Such scripts for the persistent form of data elicited by question-session scripts, or obtained through other means, describe instances of data types from a hierarchical data model.

In view of the structured or hierarchical form of data types, such as "Person", the system 1 employs a generic script called a group-type script for each such data type to define a set of controls to elicit instances (data items) of the data type concerned from a user. Each such set of controls is called a group type. The sets of controls are designed to have a hierarchical structure themselves, each being isomorphic with the structure of the corresponding data type. This enables the set of controls to be representative of the structure of the data that is being elicited.

The isomorphic relationship between the hierarchical structure of the data types and the hierarchical structure of the group types has a number of related benefits. Because an author of the system is provided with this information (i.e. that the isomorphic relationship should be maintained), the process of writing a group-type script for a new data type can become intuitive and systematic. That is, the job of the author is made easier than if the group type could have any structure (i.e. such as a structure possibly bearing little relationship to the structure of the data type). This isomorphic relationship allows the author to follow a logical process to write a group-type script, which process can be followed effectively for any data type regardless of its complexity.

This isomorphic relationship can also have similar benefits for the user. That is, even when group types (sets of controls) become complex, it is still possible for a user to determine the relationship between the constituent controls of the set of controls because this is represented by the hierarchical structure of that set of controls. In short, the role of the user to provide the system 1 with data is made easier than if the group type could have any structure (i.e. such as a structure possibly bearing little relationship to the structure of the data type).

The group-type scripts, written based on this isomorphism, are preferably XML scripts that are render-format neutral, re-usable, and customisable. Accordingly, they can be presented to a user using any technology (HTML, Windows Forms, etc). However, the group-type scripts define the hierarchical structure of the controls thus rendered, such that the structure of the data to be supplied can be deduced regardless of which technology is used to render the controls. Because the group-type scripts are author-written, they are also editable by such an author, for example to perform customisation, i.e. without requiring a detailed knowledge of software design.

A question-session script can reference a particular group-type script one or more times. Each time such a group-type script is referenced by a question-session script, it can (as mentioned above) be customised for the situation in which it is to be used. For example, the group type (set of generic controls) for eliciting data of the type "Person" can be customised so as to elicit data for a particular type of person, such as a buyer or a seller.

In order to further explain the use of group-type scripts, the example of the "Person" data type will be used as follows. As stated above, the "Person" data type may be considered to have the following tree or hierarchical structure:

```
Person
|
|--- Simple firstNames
|
|--- Simple givenNames
|
|--- Address address
        |
        |--- Simple line1
        |
        |--- Simple line2
        |
        |--- Simple town
        |
        |--- Simple postcode
```

The "Person" group-type script is accordingly a definition for a "Person" group type, i.e a control whose purpose is to elicit data for a "Person" type of data object (data item). That is, the result of a user interacting with the control generated based on that group-type script is the creation or modification of a data object which is an instance of this type, and whose property values (the actual data itself) have been supplied by the user. As discussed above, the group-type script is an XML script and is therefore independent of rendering technology. It is generic to that type of data (e.g. the "Person" type), customisable, and re-usable. The following script element 3 is an example of a "Person" group-type script which defines the "Person" group type (set of controls) for the "Person" data type.

```
<?xml version="1.0" encoding="utf-8"?>
<groupType btype="com.practicallaw.btypes.Person">
    <questionMember name="givenNames">
        <caption>First Name(s)</caption>
        <uiHint value="inputLine"/>
        <sizeHint value="5"/>
        <answers>
            <freeAnswer maxChars="32"/>
            <default>[Given Names]</default>
        </answers>
    </questionMember>                                                    (3)
    <questionMember name="familyName">
        <caption>Surname</caption>
        <uiHint value="inputLine"/>
        <sizeHint value="5"/>
        <answers>
            <freeAnswer maxChars="32"/>
            <default>[Family Name]</default>
        </answers>
    </questionMember>
    <groupMember name="address"
        typeid="practicallaw.com/pit/Address"/>
</groupType>
```

The script element 3 specifies that the group type that it defines is for the Person data type (the full name of the Person type is 'com.practicallaw.btypes.Person'). It then defines a series of questions, one for each property of the Person data type.

The script element 3 also contains a reference to the Address group-type script in the penultimate line. The reference is to the Address group-type script, i.e. to the group type, and not to the Address data type per se. The Address group-type script, which is not shown, will accordingly specify that the group type that it defines is for the Address data type, and it will define questions for each of an address's properties (i.e. line1, line2, town and postcode).

Accordingly, it can be seen that a group-type script may be referenced by other group-type scripts (as the example of the Person group-type script referencing the Address group-type script shows). A group-type script may also be referenced in a question-session script, creating in the question session generated based on that question-session script a particular group of questions. For example, a question session script can create a Person group of questions by including the following script element 4.

```
<group name="buyer" typeid="practicallaw.com/pit/Person"/>    (4)
```

Figure 14:
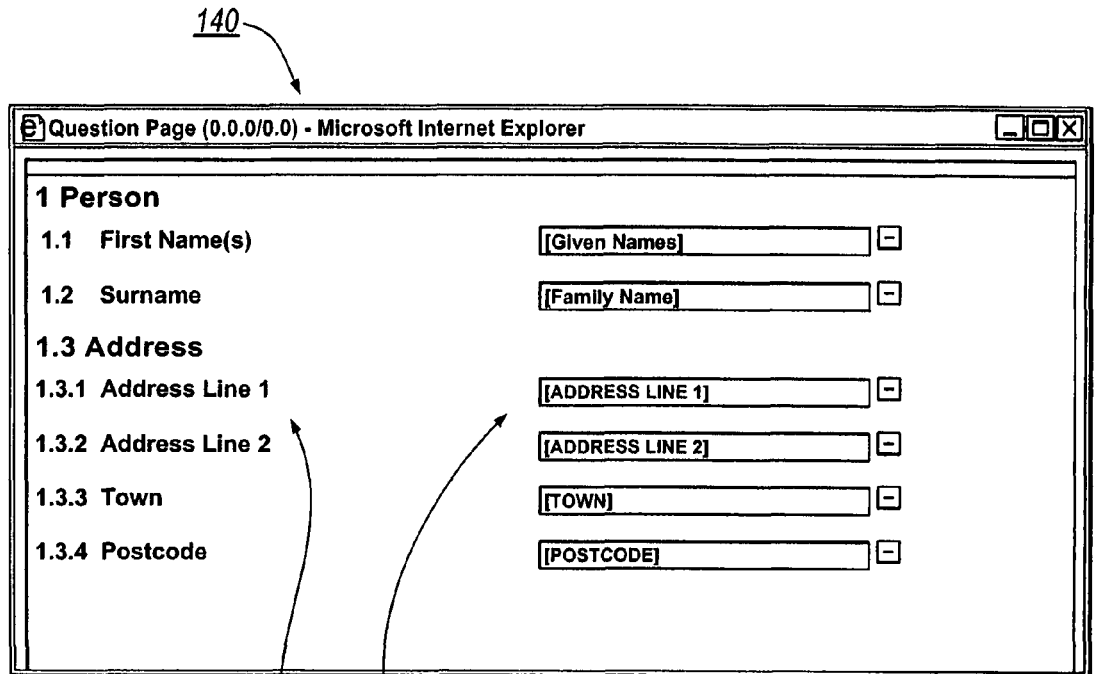
FIG. 14 shows an example of an interface screen generated by the FIG. 1 system.

The system 1, when interpreting the script element 4, will generate a group of questions based on the Person group type. FIG. 14 shows an example of an interface screen 140 which the system 1 could generate based on the script element 4. The interface screen 140 shows a group of questions rendered in HTML. It will of course be appreciated that the same group of questions could also be rendered using another technology, for example by generating a control on a Windows Form. It will also be appreciated that even within a single rendering technology, such as HTML, it is possible for the same control to be rendered in different ways.

The interface screen 140 shows a set of questions 142, or in this case a set of indications as to what data is required, and a set of input fields 144 in which the relevant data is required.

The input fields are shown displaying default data, however this default data can of course be replaced with actual working data. The hierarchy of the "Person" data object (data item) being edited is reflected in the numbering that has been used for the individual data objects that make up the "Person" data object.

At the point in a question-session script or other script where a group-type script is referenced, such as by the script element 4 above, further information can be provided so as to customise the group of questions (group type) produced from it. For example, one could suppose that an author may want to customise the script element 4 so that the generated control of FIG. 14 appears labelled with the term 'Buyer' rather than simply the term 'Person', and so that it is labelled with 'Buyer's Address' rather than with "Address". The following script element 5, as compared to the script element 4, would achieve this customisation of the group type.

```
<group name="buyer" typeid="practicallaw.com/pit/Person">
    <caption>Buyer</caption>
    <includeGroup name="address" before="NOTHING">
        <caption>Buyer's address</caption>            (5)
    </includeGroup>
    <andAll/>
</group>
```

Figure 15:
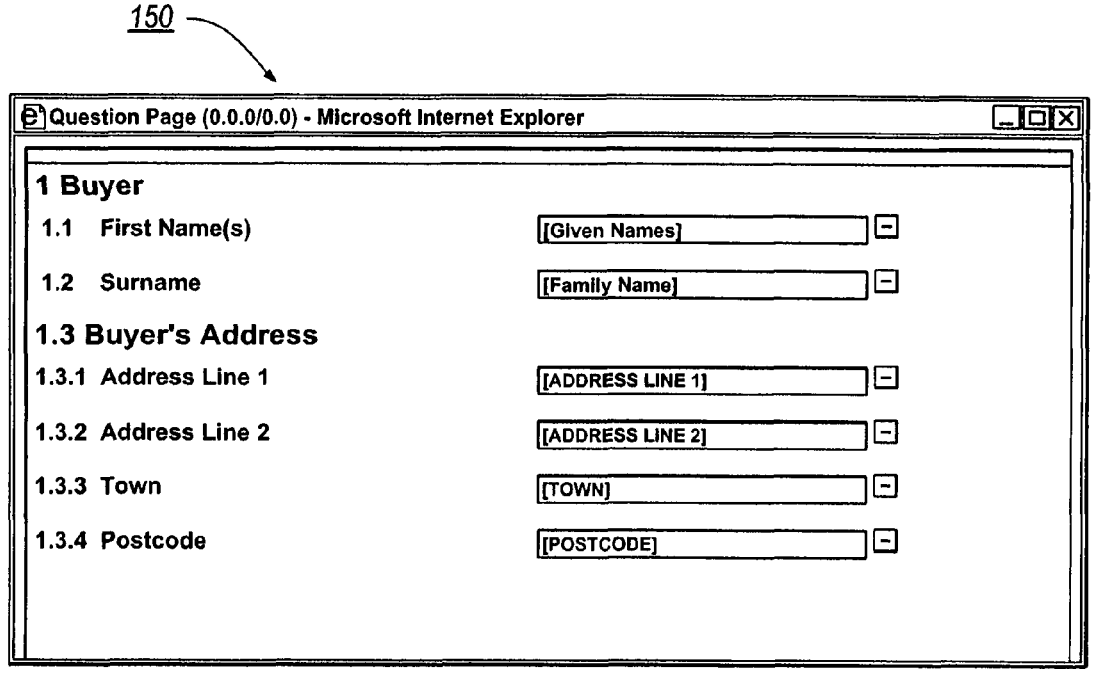
FIG. 15 shows an example of an interface screen generated by the FIG. 1 system.

The system 1, when interpreting the script element 5, will generate a group of questions based on the Person group type, but with the customisation discussed above. FIG. 15 shows an example of an interface screen 150 which the system 1 could generate based on the script element 5. The interface screen 150 shows a group of questions rendered in HTML. It will be appreciated that the interface screen 150 of FIG. 5 is identical to the interface screen 140 of FIG. 4, except that it is labelled with the term 'Buyer' rather than simply the term 'Person', and except that it is labelled with 'Buyer's Address' rather than with "Address".

It will be appreciated that each time a group-type script is referenced by a question session it could be customised in a different way, or at least it could be used to obtain a different data item. This is illustrated by the following script element 6 in which the same group-type script is referenced twice (without any customisation) with the data object obtained from the first reference being assigned to the name "buyer", and the data object obtained from the second reference (to the same set of questions) being assigned to the name "seller". That is, the same group type can be instanced in many question sessions, and, indeed may be instanced many times in the same question session.

```
<group name="buyer" typeid="practicallaw.com/pit/Person"/>     (6)
<group name="seller" typeid="practicallaw.com/pit/Person"/>
```

Figure 16:
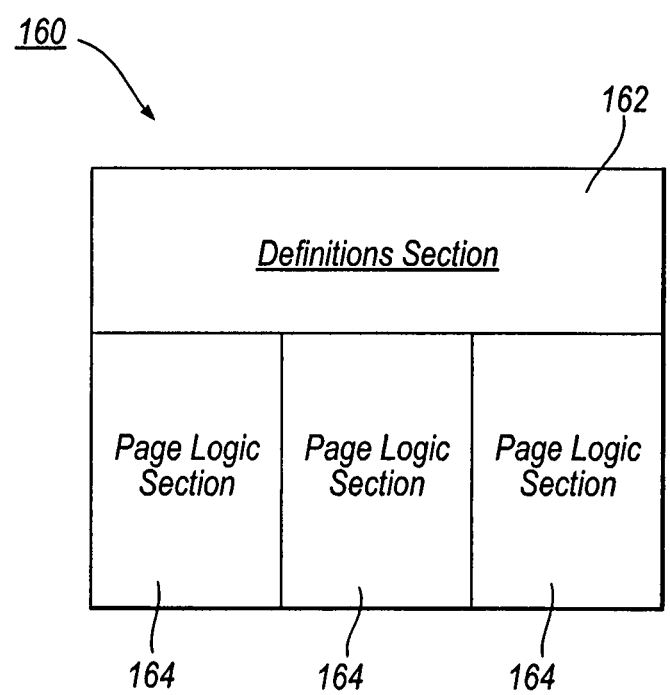
FIG. 16 is a schematic diagram of a question-session script.

A question-session script employed by the system 1 normally contains more than just a list of references to group-type scripts. It normally contains a 'definitions' section and at least one 'page logic' section. FIG. 16 is a schematic diagram of a question-session script 160. The question-session script 160 comprises a definitions section 162, and three page logic sections 164. The definitions section 162 defines user controls (for example by referencing group-type scripts as discussed above), and the page logic sections 164 each define individual pages or interface screens that will be presented to the user. Box 94 of FIG. 9 is an example of such an interface screen or page.

Each page logic section will typically list controls from the definitions section, as being the controls that should appear on its page. Those page logic sections that are for pages that are part of a series of pages will typically specify what the 'next' page will be by referring to another page logic section. It will be appreciated that the same control defined in the definitions section can appear on several pages. Whether a control appears on a particular page or what the contents of the 'next' page will be can be the subject of 'if . . . then . . . ' logic dependent on the data input by the user.

The definitions in the definitions section generally contain customised references to group-type scripts as described above. As already mentioned, this is possible because a group-type script is an independent, sharable definition of a control which can be used by several question-session scripts and which can be customised differently for each use.

Each such page logic section is a named executable block of the question-session script that is executed just before the user sees the page which it defines. The definitions section specifies the page logic section that defines 'first' page, so just before the user sees the corresponding first page, that page logic section is executed to determine which controls the user will see (and what the content is of the link to the 'next' page). Then, when the user has entered data and clicked 'next', the page logic specified as being for the next page is executed, and again what the user will see on the page is determined. Because XML is used, the various pages are independent of the technology (e.g. HTML) used to render the controls.

The structure of a question-session script can be better understood with reference to the following script elements 7, 8, and 9.

```
<firstpage name="start"/>
  <question name="deedOrAg">
    <caption> Is the document a deed or an agreement?</caption>
    <uiHint value="list"/>
    <sizeHint value="1"/>
    <answers>
      <default>deed</default>
      <option caption="Deed">deed</option>
      <option caption="Agreement">agreement</option>
    </answers>
  </question>
<group name="buyer" typeid="practicallaw.com/pit/Person">         (7)
    <caption>Buyer</caption>
    <includeGroup name="address" before="NOTHING">
      <caption>Buyer's address</caption>
    </includeGroup>
    <andAll/>
</group>
<group name="seller" typeid="practicallaw.com/pit/Person">
    <caption>Seller</caption>
    <includeGroup name="address" before="NOTHING">
      <caption>Seller's address</caption>
    </includeGroup>
    <andAll/>
</group>
<group name="witness" typeid="practicallaw.com/pit/Person">
    <caption>Witness</caption>
    <includeGroup name="address" before="NOTHING">
      <caption>Witness's address</caption>
    </includeGroup>
    <andAll/>
</group>
```

Script element 7 is an example of a definitions section of a question-session script. It can be seen that script element 7 states that the first page logic section that should be executed should be a page logic section called "start". It can also be seen that script element 7 continues to define a number of controls by referring to (and customising) group-type scripts.

```
<da:pageLogic>
  <da:controlRefs>
    <da:controlRef>"deedOrAg"</da:controlRef>       (8)
  </da:controlRefs>
  <da:setNextPage>"secondPage"</da:setNextPage>
</da:pageLogic>
```

Script element 8 is an example of the page logic section called 'start', and accordingly it would be the first-executed page logic section by a question-session script containing the script element 7. Script element 8 states that the next page logic section that should be executed should be a page logic section called "secondPage".

```
<da:pageLogic>
  <da:controlRefs>
    <da:controlRef>"buyer"</da:controlRef>
    <da:controlRef>"seller"</da:controlRef>
    <da:choice>
      <da:if>d("deedOrAg").equals("deed")</da:if>    (9)
      <da:select>
        <da:controlRef>"witness"</da:controlRef>
      </da:select>
    </da:choice>
  </da:controlRefs>
  <da:setNextPage></da:setNextPage>
</da:pageLogic>
```

Script element 9 is an example of the page logic section called 'secondPage'. Accordingly, it would be the page logic section executed after the script element 8. It can be seen by the inclusion of the "if . . . then . . . " logic at lines 5 to 10 of the script element 9 that the "witness" group of questions will only be displayed on this page if the answer to the question displayed based on the script element 8 is "deed".

It can be seen that the script element 9 does not state a next page, i.e. the penultimate line reads "<da:setNextPage></da:setNextPage>" with nothing between the two tags. Accordingly, the page generated based on the script element 9 is the last page in the sequence of pages.

In some instances, an author will come across a situation in which no data type exists within the system 1 for a particular case in point. The set of data types used in the system 1 constitutes its data model. This data model may change but must change slowly and in a very controlled way. The reason for this is that drafting scripts, question-session scripts and group-type scripts are all dependent on the data model, or on particular sub-sets of the model. Accordingly, making a change to the data model may involve changing many scripts.

In contrast, the data model is generally not dependent on scripts. Accordingly, in general it is not possible for authors to modify the data model. However, when working on scripts in a particular domain, for example in a particular area of the law, which is relatively uncharted (i.e. for which not many scripts have yet been developed), it is desirable that authors be able to experiment with different ways of organising the data types for that domain. However, it is also desirable that this experimentation does not require authors to learn complex new techniques; ideally such experimentation should be possible using skills that authors already possess.

Against this background, the system 1 has been designed to enable authors to design and use trial structured data types before they become accepted data types. Authors are able to generate such trial data types without having to work on any elements other than the controls which render and elicit property values for those trial data types. In other words, the script editors can simply draft a script similar to a group-type script to produce complex controls, and these complex controls contain enough information for complex data types to be inferred from them. When the authors are satisfied with their design, the trial data type may be formally committed to the store of data types as an accepted data type. However, before the trial data type is formally committed, the authors may employ that trial data type in their question session scripts and drafting scripts.

Such trial data types are termed 'Protobos' (prototype business objects). A Protobo can be defined by nothing other than a reference to a group-type script, and so the group-type script determines the properties of the trial data type.

For example, suppose that an author is creating scripts for a financial domain, and realises that data is needed about interest defaults. He can create a Protobo for this data type called 'InterestDefault'. As mentioned above, this Protobo can simply specify a group type (i.e a group-type script). The script element 10 below is an example of a group-type script for this Protobo.

```
<?xml version="1.0" encoding="utf-8"?>
<groupType btype="com.practicallaw.btypes.financial.InterestDefault">
    <questionMember name="includeLateProvision">
        <caption>Include a provision providing for interest on late
        payments?</caption>
        <uiHint value="list"/>
        <sizeHint value="1"/>
        <answers>
            <default>true</default>
            <option caption="Include">true</option>
            <option caption="Do not include">false</option>
        </answers>
    </questionMember>
    <questionMember name="percentage">
        <caption>The rate of interest on late payments</caption>
        <uiHint value="inputLine"/>
        <sizeHint value="1"/>
        <answers>
            <freeAnswer maxChars="10"/>
            <default>4%</default>
        </answers>
    <questionMember>
    <groupMember name="bankAddress"
    typeid="practicallaw.com/pit/Address" >
        <caption>Address of bank</caption>
    </groupMember>
</groupType>
```
(10)

The Protobo based on the script element 10 will have the properties corresponding to the members of the group type that it defines, i.e. "includeLateProvision" and "percentage" will be "Simple" properties, and "bankaddress" will be a property of type "Address". It is to be noted that the script element 10 identifies the Protobo ("com.practicallaw.btypes-.financial.InterestDefault") that uses the script element 10 itself to define its own properties. This apparent circularity is benign, and indeed is useful because it enables the Protobo eventually to be replaced by an accepted data type without having to amend the group-type script.

It is desirable for an author of a question-session script to be able to allow a user to create data that represents a number of objects, where the number of objects is not known by the author in advance of the user's input. For example, the number of parties involved in a deal depends on the details of the user's deal and cannot be known by the author in advance of the user providing those details.

It is also desirable for users only to have to enter data once for a deal, even if that data needs to be referred to in a variety of contexts by the documents in that particular deal. Therefore, it is desirable that the user should be able to assign a particular role to a data object that has already been created.

For example, the same company may be acting as attorney for two different parties to a deal, and it would be inconvenient to have to enter the details about the attorney twice. Also for example, the same person may be acting as a buyer with respect to one agreement and acting as a seller with respect to another. Again, the user will not want to have to enter the details for that person more than once.

Against this background, the system 1 has been adapted to handle three special types of data, which can be referred to as 'arrays' (for representing collections of data items whose size is only known at runtime), 'references' (for where a single data object can be used for a number of different roles), and 'sets' (which are, effectively, a collection of references whose size is not known until runtime). Further, the system has been designed to employ generic controls which can be employed by authors of question-sessions scripts to elicit such data types. For arrays, there is a generic 'array-creator' control. For references, there is a generic 'reference-chooser' control. For sets there is a generic 'set-chooser' control. These controls are generic enough to be used in all circumstances in which the corresponding data-types are required, they can be customised for particular question-session usages, and they are simple enough to handle such that non-technical question-session authors can design question sessions (i.e. draft question-session scripts) which contain them.

An author can specify, in a question-session script, that a question session should contain an array-creator control if there is a need to allow a user to create a collection of similar entities, and the user (i.e. not the author) determines the number of entities that will be created. It will be appreciated that an author can also specify, in a group-type script, that an array-creator control should be generated based thereon (this is of course applicable to any type of control). An array-creator control might be useful, for example, to create data about the participants in a deal. In this case, the author might use the script element 11 below.

```
<array name="participants" >
    <caption>List of deal participants</caption>
    <designation>participants</designation>
    <itemName>participant</itemName>
    <groupCell typeid="practicallaw.com/pit/Person" />
</array>
```
(11)

As can be seen from the script element 11, the array-creator control to be generated is called 'participants'. The use of this control, during a user's question session, will create an array data object in the response container for that question session. The name of that array data object is also 'participants'. It is to be noted that the script element 11 contains a reference to a sub-element, in this case to a group-type script. It is further to be noted that the group-type script referenced by the script element 11 is the "Person" group-type script. The effect of this reference is to ensure that each array element is created using that group-type script, so that in this case the array is an array of Persons.

The script element 11 shows that the control for eliciting the array data type can be customised. In the case of the script element 11, this has been done by supplying a 'designation' which is the name of the collection as a whole, and an 'item name' which is used to label individual members of the array. The group type (specified by the reference to the group-type script in the script element 11) used to edit members of the array may be customised for the context using the techniques already described above.

Figure 17A:
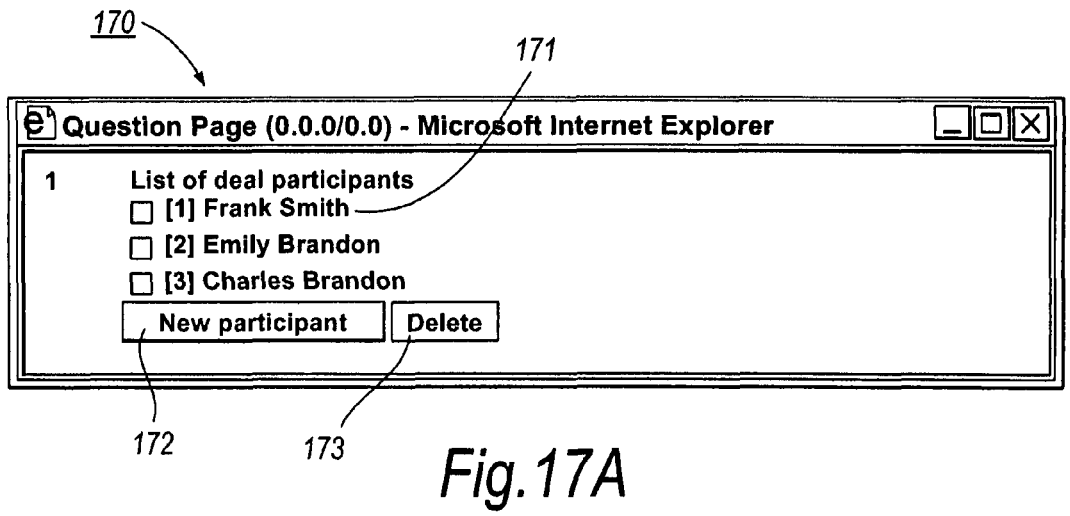
FIGS. 17A and 17B show interface screens for explaining array-creator controls.

FIG. 17A shows an example of an interface screen 170 which the system 1 could generate based on the script element 11. The array-creator control shown on the interface screen 170 shows that there are already three members of the array. For example, the first member 171 is shown as being "Frank Smith". The array-control comprises a button 172 labelled "New participant" for enabling further members to be added to the array, and a button 173 labelled "Delete" for enabling existing members to be deleted from the array.

Each member of the array generated from the script element 11 is a data object of the "Person" data type and accordingly although only the name of each member is shown on the interface screen 170, it is to be understood that other data (e.g. the address) for each member may have already been entered by a user.

Figure 17B:
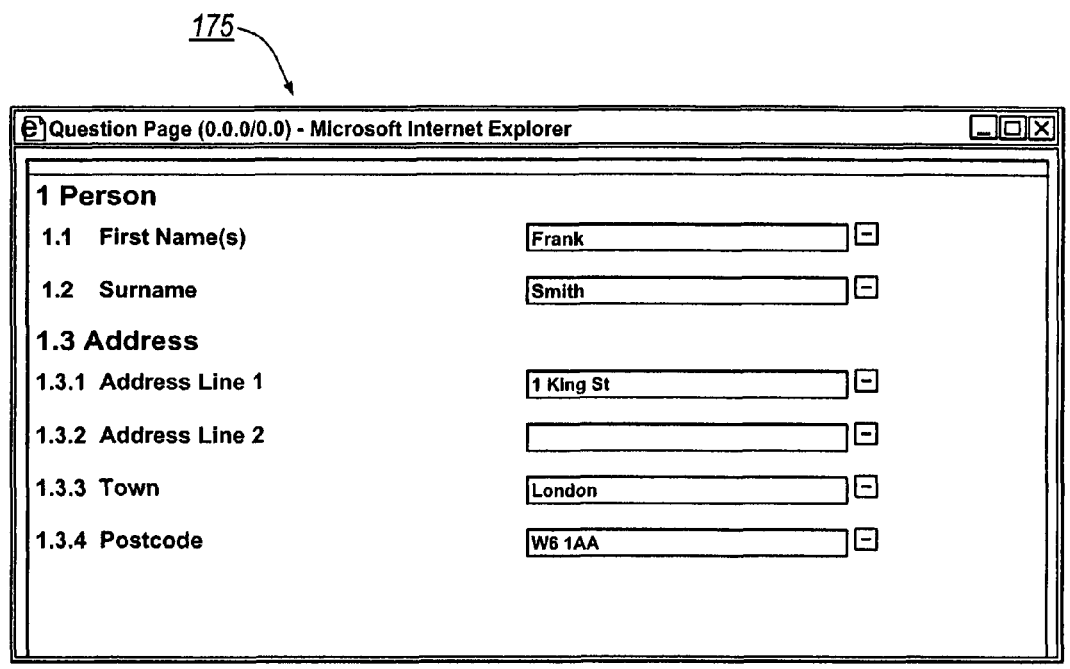

FIG. 17B shows an example of an interface screen 175 which the system could generate in response to the user clicking a link from the listed name 171 ('Frank Smith'). It can be seen that the link has generated the group of questions defined by the corresponding Person group type, and shows the data corresponding to Frank Smith. It will be appreciated that clicking the 'New participant' button 172 will also take the user to questions defined by the Person group-type script, but in this case showing the default answers.

An author can specify in a question-session script that a corresponding question session should contain a reference control if there is a need to allow a user to assign a particular role to a data object that is a member of a collection of objects (such as an array or set). Continuing the example discussed above, such a control could enable a user to select, from the list of deal participants, one of those participants as being 'the buyer'. In this case, the author might use the script element 12 below.

```
<reference name="buyer">
    <caption>Buyer</caption>                           (12)
    <referenceArray>participants</referenceArray>
</reference>
```

The 'reference' element defined by the script element 12 contains a sub-element which specifies a named array, in this case an array called 'participants', which may, for the sake of example, be considered to be the array of Persons defined by the script element 11 above. It can be seen that the reference-chooser control defined by the script element 12 is called 'buyer'. The employment of this control during a user's question session will assign a selected deal participant to the role of 'buyer'.

From the perspective of drafting scripts (which are discussed in greater detail below) the reference-chooser control will generate a data item named 'buyer', and from that perspective the situation will be indistinguishable from that in which a completely new Person object was created and provided with that name.

Figure 18A:
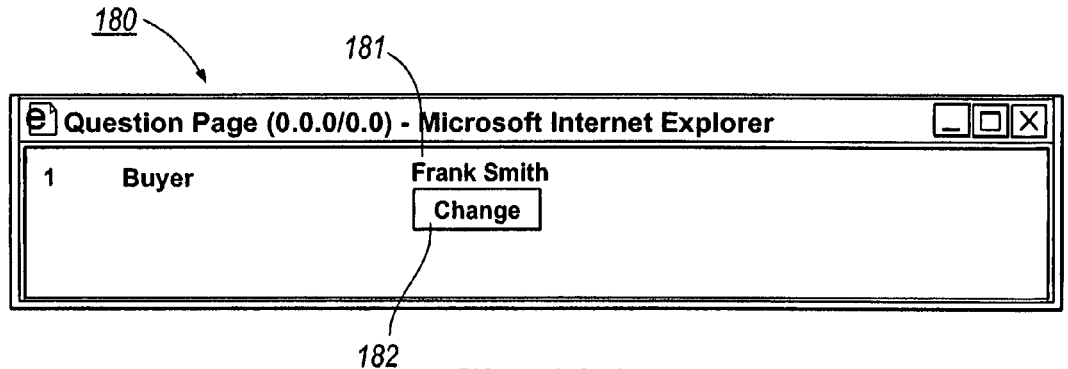
FIGS. 18A and 18B show interface screens for explaining reference-chooser controls.

FIG. 18A shows an example of an interface screen 180 which the system 1 could generate based on the script element 12. The reference-chooser control generated on the interface screen 180 shows that the first-named member "Frank Smith" of the array shown in FIG. 17A has been chosen 181 to be the "buyer". The reference-chooser control comprises a button 182 labelled "Change" for enabling a different member of the array of participants to be chosen instead of "Frank Smith".

Figure 18B:
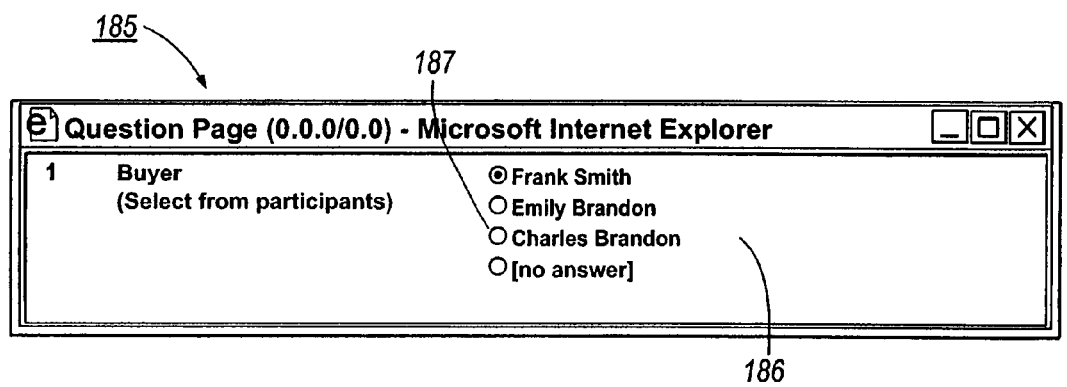

FIG. 18B shows an example of an interface screen 185 which the system 1 could generate in response to the user clicking the "Change" button 182. It can be seen that this has brought up a control 186 listing the members of the array of participants. It is to be noted that the control shown employs radio buttons 187, such that only one member of the participants array can be chosen (or such that the user can select that no answer is to be provided at present).

It will be appreciated that particular members of an array will be used in a variety of situations. For example, in the generation of a particular document for a deal, one of the persons in the array may be identified by a reference as a party to that document. It is valuable for a user to be able to link back to the array-creator control which defined the properties of an array member from wherever that array member is used. For example, it is advantageous to be able to link back from a generated document to which a person is a signatory, to the definition of the properties of that person. The reason that the link is advantageous is that it enables a user to modify properties of the array member, or to add new information (for example to modify or add information about a person).

However, the particular control that was used to create that array member is normally only identified by the position in the array of the member it was used create. Unfortunately, if members are removed from the array, or new members are inserted in the array this position may change. Accordingly, the system 1 orders members in an array by their position in the sequence of additions to that array. This number does not change even if other members are added or removed from the array. Accordingly, the system 1 indexes arrays by this ordinal number—the 'add ordinal'—rather than the more conventional 'position' ordinal so as to ensure that the correct member of an array will be edited.

The data structure produced by a set-chooser control is in some respects similar to that produced by an array-creator control and in other respects similar to that produced by a reference-chooser control. It is similar to the data structure produced by an array-creator control in that, from the perspective of a drafting script (or certain other controls), a set can be regarded as a collection of objects which can be iterated over as discussed above. However, a set employed by the system 1 is not a collection of actual objects, as an array is, but is instead a collection of references to objects.

Such a set-chooser control could be useful when, for example, an author wishes to enable a user to select, from a list of deal participants, a selection of those participants as being 'sellers' in a particular transaction. In that case, the author might use the script element 13 below.

```
<answerSet name="sellers">
    <caption>Sellers</caption>
    <designation>Sellers</designation>                 (13)
    <itemName>Seller</itemName>
    <answerSetArray>participants</answerSetArray>
</answerSet>
```

The 'answerSet' element defined by the script element 13 contains a sub-element which specifies a named array, in this case the array called 'participants' defined by the script element 11. The set-chooser control defined by the script element 13 is called 'sellers', and the employment of this control during a user's question session will assign a number of selected deal participants to the role of 'sellers'.

From the perspective of drafting scripts (which are discussed in greater detail below) the set-chooser control will generate a collection named 'sellers', and from that perspective the situation will be indistinguishable from that in which a completely new array of Persons was created with that name.

Figure 19A:
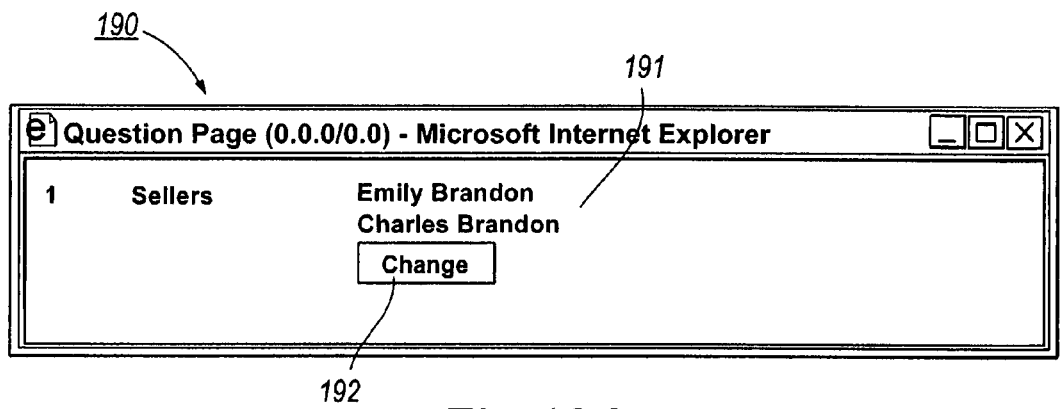
FIGS. 19A and 19B show interface screens for explaining set-chooser controls.

FIG. 19A shows an example of an interface screen 190 which the system 1 could generate based on the script element 13. The set-chooser control generated on the interface screen 190 shows that the second- and third-named members "Emily Brandon" and "Charles Brandon", respectively, of the array shown in FIG. 17A have been chosen 191 to be the "sellers". The set-chooser control comprises a button 192 labelled "Change" for enabling a different selection of members of the array of participants made than the current one.

Figure 19B:
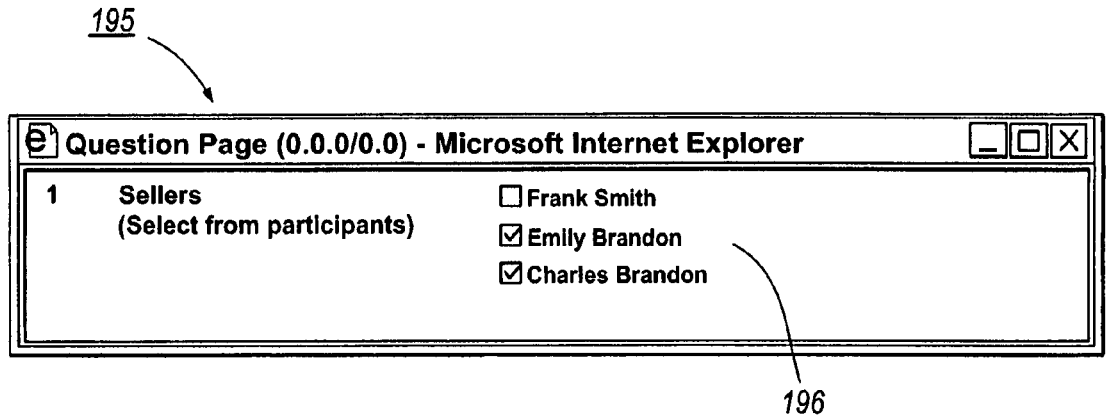

FIG. 19B shows an example of an interface screen 195 which the system 1 could generate in response to the user clicking the "Change" button 192. It can be seen that this has brought up a control 196 listing the members of the array of participants. It is to be noted that the control shown employs check boxes 197, such that more than one member of the participants array can be chosen.

Document-Type Scripts

One key feature of the system 1 is that users do not have to enter the same data twice when generating documents in a deal. Data that is pertinent to a particular document has to be entered only once. If the user returns to that document, the data entered will have been stored. Further, data that is pertinent to several documents, for example to documents of a deal, only has to be entered once and the documents share the data; that is, the same data is utilised in generating all the documents to which it is relevant. Accordingly, changes to data must affect all of the documents which share that data. So, for example, a change to a party's address should be picked up by any document which lists that address.

Data which is shared between several documents in a deal is called 'deal-wide data'. Deal-wide data often (though not always) comprises collections of data items stored in arrays (as discussed above). An array of the names and details of all the parties to a transaction is an example of such deal-wide data. Other examples include details of properties whose ownership is being transferred, details of subsidiary companies which are being sold along with a parent company, and details of leased units, amongst others. An example of deal-wide data that is not in data held in an array is a reference to a target company (e.g. a company being purchased) in a share purchase transaction (though the company data itself, rather than its identification as the target through a reference, would normally be held in a shared array of other parties).

One example of data that would not normally be treated as deal-wide data is data determining whether a particular document is to be signed as an agreement or as a deed. Data such as this, which is pertinent to a particular document only, is called 'document-specific data'.

It is desirable for users to be able to select documents to include in a particular deal freely. It is further desirable that no predetermined restrictions should be placed on a selection made by such a user. This is because which documents are required in a particular deal is typically dependent on circumstances peculiar to that deal, and it is not possible to predict in advance just what those circumstances will be. Therefore if a document-type is available in one type of deal, it is desirable to make it available in every type of deal.

It is also desirable to allow users to create documents outside the context of a deal, even if documents of that type may also be created within a deal. That is, users sometimes wish to create documents in a 'one-off' ad-hoc mode. If a document-type is available in any type of deal, it is desirable to also make it available in a stand-alone mode.

Accordingly, in the case where documents are being created within the context of a deal, the system 1 ensures that any new documents in the deal use the right data items. That is, data-variables used in drafting-scripts for new documents are bound to the correct data objects in the existing deal-data. The system 1 can, for example, bind a variable 'soldCompany', declared in a drafting script to represent a company being sold in a deal, to deal-wide data elicited by a question-session script and referred to as 'target'.

The methodology employed by the system 1 to bind variables or parameters declared in a drafting script to the correct data will be explained with reference to document-type scripts. A problem that is solved by this methodology is that different documents use different kinds of deal-wide data, so when a document is created and the data elicited for that document, there may be no deal-wide data generated yet which is of the right sort. Accordingly, the system creates that data when it is required, and makes it available to any subsequent drafting script that requires that same data. The methodology employed by the system 1 also enables the binding to work even if a document is being created outside the context of a deal.

Document-type scripts, as mentioned above, are authored scripts which associate together question-session scripts, drafting scripts, and default-data containers (which may also be scripts). In the explanation and examples that now follow, it will be shown that a document-type script may specify and use a number of 'shared' document-type scripts (and thereby a number of 'shared' question-session scripts), and a number of data containers. Through this setup, it will be appreciated that the document-type script can enable correct data binding to be achieved. It will also be appreciated that underlying this functionality is a system by which virtual object repositories (containers) are created from which data objects are locatable using a systematic object naming convention. The contents of those repositories (containers) are assembled on-demand.

A key aspect of the data-binding capability of the system 1 is based on an understanding of how drafting scripts are interpreted by the system 1. Drafting scripts are discussed in greater detail below, however for the benefit of the present explanation it is to be understood that drafting scripts are essentially program functions that declare parameters (for the purpose of receiving data) and generate a document as their output. From this perspective, the data-binding capability of the system 1 is centred on assigning the right data values to the parameters of the drafting scripts.

The function of document-type scripts in the system 1 will be considered by reference to an example document-type script. The script element 14 below is an example of such a document-type script.

```
<da:documentType xmlns:da="http://practicallaw.com/plc/
da">
    <da:local idref="practicallaw.com/qs/qsess_script1" >
        <da:defaultData idref="practicallaw.com/qs/
        qsess_script1_defaults" >
    </da:local>
    <da:shared idref="practicallaw.com/dot/doctype2" />
    <da:shared idref="practicallaw.com/dot/doctype3" />
    <da:forDraftScript idref="practicallaw.com/tp/
    draft_script1">
        <da:setParam name="signType">
            d("signAs")
        </da:setParam>                                    (14)
        <da:setParam name="soldCompany">
            d("practicallaw.com/qs/qsess_script2/target")
        </da:setParam>
        <da:setParam name="retailUnit">
            d("shopDetails")
        </da:setParam>
    </da:forDraftScript>
</da:documentType>
```

As has been described, a document-type script associates together a question-session script, a drafting script and a set of default data. A 'da:local' tag is used to specify the question-session script, the 'da:defaultData' tag is used to specify the default data, and the 'da:forDraftScript' tag is used to specify the drafting script. A document-type script may also identify other document-types as providing deal-wide data, and it does that with the 'da:shared' tag.

In the script element 14, it can be seen that the document-type script sets the parameters of the drafting script 'draft_script1'. One parameter used in draft_script1 is 'signType' which may be considered to determine whether the document generated from the drafting script 'draft_script1' is to be executed as an agreement or a deed. The value of this parameter is drawn from the question-session script 'qsess_script1' which is the question-session script associated directly with the present document-type script of the script element 14, and is known as its local question-session script. This data is document-specific. Note that the parameter called 'signType' in the drafting script 'draft_script1' is set to the answer elicited by a control called 'signAs' in the question-session script 'qsess_script1'.

A second parameter used in the drafting script 'draft_script1' is 'soldCompany'. This parameter is being set to a value drawn from the data elicited from question-session scripts specified in the document-type script 'doctype2', a document-type script that has been declared here as shared. Although not shown, it may be assumed for the sake of example that the document-type script 'doctype2' specifies the question-session script 'qsesss_script2' as its local question-session script. Thus, the question-session script 'qsess_script2' is available to the present document-type script of the script element 14. The element in the present document-type script which sets the value of 'soldCompany' refers to the data obtained from the control called 'target' in the question-session script 'qsess_script2'.

The third parameter used in the drafting script 'draft_script1' is 'retailUnit'. This parameter is set to the value of 'shopDetails' in the question-session script 'qsess_script1'. Although this looks very similar to the document-specific data 'signType', the data in this case could be shared, and this possibility will now be explained.

In the script element 14, the question-session script 'qsess_script1' is the question-session script that is the primary source of data for the document-type script of the script element 14, i.e. 'qsess_script1' is its 'local' question-session script. Amongst the data items that the question-session script 'qsess_script1' is responsible for producing is one called 'shopDetails'. The kind of scenario which this example is intended to illustrate is where a deal involves a number of shops, but where the document that is to be produced is only concerned with an individual shop. For example, such a document might describe the leasing arrangements for a given shop. In other words, this example considers that 'shopDetails' is a reference to an object in an array, and the array which contains that object is an array of descriptions of shops. Thus, in the present example, the corresponding control defined by the question-session script 'qsess_script1' is a reference chooser, and when the user activates the present document-type script of the script element 14, one of the questions that he or she is asked involves selecting the shop which will be described in the document being created.

Continuing the present example, the details of all the various shops involved in the deal are part of the shared deal-wide data. Accordingly, the element in the question-session script 'qsess_script1' which defines the reference chooser will refer to this shared data. An example of that element is shown below as script element 15, which may be considered to be part of the question-session script 'qsess_script1'.

```
<reference name="shopDetails">
    <caption>The store</caption>
    <referenceArray>                                            (15)
        practicallaw.com/qs/qsess_script3/shopDetailsArray")
    </referenceArray>
</reference>
```

It is to be noted, from a study of the script element 15, that the array 'shopDetailsArray' from whose members the reference-chooser of the script element 15 will allow the user to select is not defined in the question-session script 'qsess_script1'. In this case, it is defined in question-session script 'qsess_script3'.

Thus from the perspective of a document-type script which uses the question-session script 'qsess_script1' as its 'local' question-session script (such as the document-type script of the script element 14), the question-session script 'qsess_script3' is responsible for shared, deal-wide data. This is the reason that the document-type script of the script element 14 specifies the document-type script 'doc_type3' as shared data. This example of course assumes that the document-type script 'doc_type3' specifies the question-session script 'qsess_script3' as its 'local' question-session script. Accordingly, it will be appreciated that the document-type script of the script element 14 specifies the document-type script 'doc_type3' as shared data because its local question-session script 'qsess_script1' uses data drawn from the question-session script 'qsess_script3'.

It will be noted that the document-type scripts of the system 1, as exemplified by the script element 14, specify another document type-script (e.g. doc-type3) in order to specify shared data, rather than another question-session script. There are two reasons for this formulation of document-type scripts.

Firstly, as explained above, question-session scripts define the controls used to create and modify data. However, in order to define a usable container of data, default data values are also to be provided, and the default data values are dependent on the type of document being created. These default data values are associated with question-session scripts in document-type scripts.

Secondly, it is almost always convenient to have a drafting script associated with a container of data, because the drafting script can be used to generate a document to view the data in that container. In most cases, that document will, in fact, be a document which is a necessary part of the deal concerned. However, even if the document is not strictly required as part of the user's output, it will nonetheless normally provide a useful descriptive report of the data in the corresponding container. For example, even if there were strictly no need for a document specifically listing all the details of all the various shops involved in the above example deal (and any other information elicited by the question-session script 'qsess_script3'), it would almost certainly be quite useful to have this listing.

The example described with respect to the script element 14 above has demonstrated that a document-type script of the system 1 typically declares a 'local' question-session script (in the example above, this is 'qsess_script1'), a document-type script for any question-session script to which it itself refers using a structured object locator (in the example above, this is illustrated by the 'target' reference), and a document-type script for any question-session to which its local question-session script refers (in the example above, this is illustrated by its reference to 'doctype3'). However, any of the declared document-type scripts may themselves declare other document-type scripts sources of shared data. Any particular document may thus be associated with a complex web of shared data.

As demonstrated by the script element 14, document-type scripts achieve the required binding of data to parameters in drafting scripts by specifying cross-references between various data containers. The underlying mechanism which enables cross-references between data containers is a virtual data repository. In order to support this functionality, the system 1 employs a sub-system to enable access to objects stored in a set of response containers, where each container is the product of a different question session. This sub-system is known as the 'object manager'.

The fundamental function of the object manager in the system 1 is to return data objects given an object locator (obloc), which may be a structured object locator. Some oblocs are simple, and an example of such a simple obloc is the element 'signType' in the script element 14. Other oblocs are qualified by the name of a question session. An example of this type of obloc is the element 'practicallaw.com/qs/qsess_script2/target' in the script element 14. Qualified oblocs are known as 'remote oblocs'. The simple, or unqualified, oblocs are known as 'local' oblocs.

When a user starts or returns to a deal, for example following step S2 or S30 of the method 48 of FIG. 4, an object manager is initiated. Such an object manager operates on the basis of one active document, which has a corresponding drafting script and a corresponding local question-session script defined in the document's document-type script. There is also a local response container, containing the data which is produced or edited from the local question-session script. Local oblocs return objects in the local response container.

As well as the local response container, the object manager also makes available a number of remote response containers. Objects in these containers are accessible only using remote oblocs. A more complete description of oblocs is provided below.

Containers are added to the virtual data repository on-demand and are not duplicated. That is, response containers are made available to an object manager just when the process of creating a deal is made aware of their necessity. So, for example, when a user chooses a new document to create and in effect selects a chosen document-type script to be executed, the containers corresponding to all of its shared document-type scripts are created, as are containers corresponding to what its shared document-type scripts declare as shared, and so forth for the entire web of document-type scripts thus associated with the chosen document-type script. However, if, during this process, it is found that a container for responses to a particular question-session script already exists, that response container it is not created. Question-session response containers are not duplicated.

Accordingly, if a document-type script newly chosen in a deal states that it requires a certain kind of question-session response to be stored in a response container, and another document-type script has already created a response of that kind, the newly chosen document-type script will use the data that already exists. For example, if one document-type script declares its use of a shared list of parties, then when a document of that type is created, a list of parties will be generated. Then, when another document-type script is chosen which also declares its use of a shared list of parties, that other document-type script will use the list of parties that already exists.

It can accordingly be appreciated that the system 1 can employ the various scripts, in particular document-type scripts, and an object manager so as to enable data to be shared to prevent users having to enter or modify the same data more than once. Further, the system 1 enables users to freely add documents of any type to their on-going deals, and to create documents outside of those deals. In cases where, for example, the structure and content of a particular document depends on the shared data, document-specific data may be generated from the shared data. Further, the various scripts can instruct the system 1 to elicit information from the user that determines the details of the generated document-specific data, and what information is so elicited can be controlled, for example, by the shared data. In short, this functionality ensures that the rules in drafting scripts (and in some other scripts) that drive the generation of documents are evaluated by using the correct pieces of data, and that those pieces of data have only had to be entered once.

The two key aspects to this facility of the system 1 are, firstly, that drafting scripts are driven by parameters, and, secondly, that there is a mechanism by which from any document-type script, the identifiers of all the shared data containers used by that document-type script can be determined. When a user adds a new document to a deal, the system 1 knows from the corresponding document-type script which types of data container the document needs. Such containers are held in a 'virtual repository' created specifically for the deal. For any type of container needed, the system will find it in the virtual repository if such a container already exists there, or it will add it to the repository if it doesn't yet exist. Meanwhile, the document-type script binds parameters of its declared drafting script to named data items, the names identifying the container and the desired object within the container. In many cases, exactly which of a collection of data items a user requires a document to employ is under the control of the user via a reference-chooser control or a set-chooser control, where items are picked for a particular document from a deal-wide array of data items. Finally, the case of an ad-hoc, stand-alone document is treated simply as one where there is no existing deal data when the document type is activated, so the virtual repository is empty and all the deal-wide data containers have to be created.

Creating a document, then, can be considered to consist of the following steps:

1. When working on a deal, a user chooses a type of document to be generated, and this action activates a corresponding document-type script. (In the stand-alone case, the 'deal' being worked on is an 'empty' deal.) That document-type script may specify a web of shared document-type scripts.
2. If necessary, the system creates containers of data in a virtual repository for the prevailing deal.
3. The user enters data into containers via question sessions.
4. The user requests a generated document.
5. The system locates data objects via the object manager interface to the virtual repository, and sets the values of drafting script parameters to those objects based on the binding specified in the activated document-type script.
6. The system executes the rules of the drafting scripts to produce the generated document.

As mentioned above, the fundamental function of the object manager in the system 1 is to return data objects given an object locator (obloc). Accordingly, authored scripts use these 'oblocs', which are structured identifiers, to express relationships between data objects.

In the following explanation of oblocs, reference is made to the script element 14 above. That script element uses the following three oblocs in the content of the da:setParam elements.

> 1. signAs
> 2. practicallaw.com/qs/qsess_script2/target
> 3. shopDetails

These three oblocs are being used to set drafting-script parameters to data items produced by question sessions. In particular, the oblocs 'signAs' and 'shopDetails' are being used to obtain the values of answers obtained from a question session generated by the local question-session script 'qsess_script1' identified by the da:local element of the script element 14, and to set certain parameters in the drafting script 'draft_script1' to those values. In contrast, the second obloc 'practicallaw.com/qs/qsess_script2/target' is being used to obtain the value of an answer in a question session generated by the question-session script 'qsess_script2' specified by one of the shared document-type scripts, namely 'doctype2', and to set a parameter to that value.

The second obloc referring to the 'target' is prefixed with a 'container id'; in this case the container id identifies the container of responses for the question-session script 'qssess_script2'.

Although not shown by the above three examples, oblocs can use a 'dot' notation in order to reference objects in the object tree (the idea of data objects having a tree structure is described above). For instance, suppose that the shopDetails object has a property 'address'. Suppose also that the type of that property is 'Address', and that a property of 'Address' is 'postcode'. In that case, an obloc for referring to the postcode of the address of a shop might be as follows.

shopdetails.address.postcode

This obloc could be used in a document-type script to set a parameter to the corresponding postcode data value. It will of course be appreciated that this dot notation can also be used in oblocs which are prefixed by container ids. So, for instance, the obloc below could be used to refer to the registered name of the target company, where the target company is specified in the shared question-session script given by the container id.

> practicallaw.com/qs/qsess_script2/target.registeredName

A 'dot notation path' is a sequence of one or more property names, and where there's more than one such property name, each such name is separated by a dot ('.'). Accordingly, oblocs are defined as either a dot notation path (i.e. a 'local' obloc) or a dot notation path prefixed by a container-id (i.e. a 'remote' obloc). It will be appreciated that oblocs can be more complex than either of these types, for example they may contain special characters that indicate a relative path from one object to another. Such complex types of oblocs are not described herein, however it is to be appreciated that the present invention extends to such complex obloc types.

As mentioned above, oblocs are interpreted in the system 1 by an 'object manager'. That is, the function of an object manager is to return a data object, given an obloc. An object manager provides a common interface to a number of data containers.

It has already been explained that, at any time, one of the containers accessible by an object manager is the 'local' container, and local oblocs will be interpreted as referring to objects in that container. Other containers made available by the object manager will require a container-id in order to be selected. It has also already been explained that the container in which question-session data is stored can be considered to be the root of an object tree whose immediate children are instances of data types such as Persons, Obligations, etc. An object manager can delegate the resolution of dot notation paths to a response container, and the container will return the object located by the path (if any exists). In general, a container in the context of the system 1 is any software object which will allow this functionality to be performed. That is, in general, a container is any software object which can be considered the root of an object tree whose immediate children are instances of defined data types, and to which an object manager can delegate dot notation path resolution.

The practical consequence of this general definition of a container is that a very wide range of data storage technologies can be made available to the system as containers. The technique employed by the system 1 for making such a technology available is to employ a piece of software called a Container Adapter. From the perspective of an object manager, a Container Adapter implements all the functions that it expects from a container, however the Container Adapter will implement these functions by using the technology which it is making available for use by the system 1. For example, one type of Container Adapter obtains objects from a relational database, thus enabling the system 1 to generate documents which are based on data drawn directly from that database.

Figure 20:
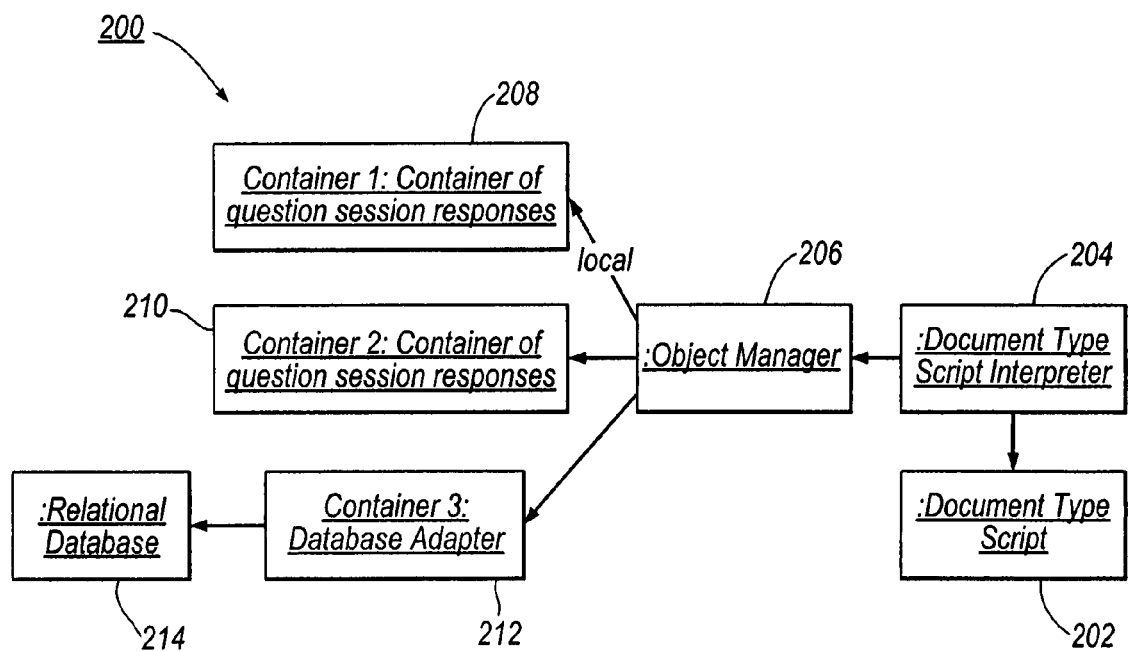
FIG. 20 is a schematic diagram for illustrating the function of an object manager, and the role of a container adapter.

FIG. 20 is a schematic diagram 200 for illustrating the function of an object manager, and the role of a container adapter. The schematic diagram 200 presents a document-type script 202, a document-type-script interpreter 204, an object manager 206, a first container 208, a second container 210, a third container 212, and a relational database 214.

When a user starts or returns to a deal, the user elects either to generate a new type of document, or to work on an existing document. In either case, the corresponding document-type script 202 is activated, and is interpreted by the document-type-script interpreter 204. Accordingly, an object manager 206 for that user session is created and initialised. Further, the 'da:local' element of the document-type script 202 tells the object manager 206 to set up a container as the 'local' container, in this case the first container 208. Then the rules described above are used to register other containers with the object manager in dependence upon the document-type script 202, in this case the second container 210 and the third container 212. Those other containers thus registered are those specified by the 'da:shared' elements in the document-type script 202.

In the case exemplified by FIG. 20, the first container 208 and the second container 210 are question session containers. The first container 208 is available by using local oblocs, and the second container 210 is available by using remote oblocs. The third container 212 is a Container Adapter for the relational database 214, and so the document-type script 202 is able to set drafting script parameters to data drawn from that database.

Drafting Scripts

As explained above, a drafting script is a parameterised function whose immediate product is an XML document or a part of an XML document. The XML represents document data in a way which is neutral between different rendering styles and media.

The script element 16 below is a first example of part of a drafting script, and represents a paragraph that expresses the value of a data item. That is, the value of the data item bound to the parameter "buyerName" by a corresponding document-type script will appear in the paragraph of the generated XML document.

```
<para>
    <da:ex>p("buyerName")</da:ex> shall pay all present
    and future stamp, documentary and other          (16)
    like duties and taxes (if any) to which this
    agreement may be subject or may give rise.
</para>
```

The script element 17 below is a second example of part of a drafting script. Similarly to the script element 16, this element also contains a data item expression, but in additon it chooses different document content depending on the tested value of the data item. This is effected by the 'da:if' tags.

```
<da:choice>
    <da:if>p("buyerType").is("person")</da:if>
    <da:select>Signed by <da:ex>p("buyerName")
    </da:ex></da:select>                               (17)
    <da:if>p("buyerType").is("company")</da:if>
    <da:select>Signed by <da:ex>p("buyerDirector")</
    da:ex>for and on behalf of
    <da:ex>p("buyerName")</da:ex></da:select>
</da:choice>
```

The system 1 has been designed with complex documents in mind, for example legal documents. Different legal documents often contain similar clauses. Changes in the law or changes in accepted phrasing often require changes to every document which contains a particular kind of clause or variant of that clause. Accordingly, the system 1 has been designed to employ re-usable script modules to build up whole documents. That is, each module is used to generate a particular kind of clause, and a draft document is made up of the result of each unit generating its particular part.

Drafting scripts which create complete documents are called 'document' drafting scripts, and those which create parts of documents are 'clause' drafting scripts. A document drafting script delegates to clause drafting scripts to create its parts. In fact, it may even delegate to itself, thus supporting recursive algorithms. Correspondingly, a clause drafting script may delegate to sub-clause drafting scripts. The generation of a draft document can thus involve a 'delegation graph', with the document script delegating to clause scripts, and the clause scripts delegating to sub-clause scripts, and so on to any arbitrary depth.

For a drafting script to delegate to another drafting script, it must provide an identifier of the script and set its parameters. It sets the parameters of the script to which it delegates from the values of its own the parameters.

A document drafting script which creates a complete document—that is, a script at the root of the delegation tree—is referenced directly by a document-type script. The document-type script, as described above, associates drafting scripts with question-session scripts and identifies the applicable default data. The document-type script is also responsible for setting the values of the parameters of the document drafting script that it references. This, accordingly, is the overall mechanism by which data is input into the drafting script delegation tree in order to produce the final output document.

By way of example, the script element 16 above could be used in a simple drafting script such as the following drafting script of script element 18.

```
<da:draftScript.xmlns:da="http://practicallaw.com/plc/da">
    <da:paramDecls>
        <da:paramDecl name="buyerName"           (18)
        type="com.practicallaw.ls.obj.Simple" />
    </da:paramDecls>
        <para>
            <da:ex>p("buyerName")</da:ex>
            shall pay all present and future stamp, documentary
            and other like duties and taxes (if any) to which
            this agreement may be subject or may give rise.
        </para>
<da:draftScript>
```

The 'da:paramDecls' element of the script element 18 contains a number of 'da:paramDecl' elements. Each 'da:paramDecl' element declares a parameter to the function defined by the drafting script of the script element 18. In this case, there is a single parameter, called 'buyerName', whose type is 'Simple'.

Elements which pertain to the dynamic, generative aspect of the drafting script are prefixed by 'da' (they are in the 'da' namespace). Elements which may appear in the generated XML draft document (an instance document) have no such prefix. That is, drafting scripts use an XML mark-up that contains a mixture of tags which describe the logical structure of the document, together with tags (prefixed by 'da') which provide the rules to determine how the content of such a document depends on transaction data. In contrast, XML draft documents (produced from drafting scripts) are valid against a predetermined DTD which describes only a part of the mark-up for drafting scripts. A document which conforms to this DTD is a document which contains tags to describe its logical structure. These tags can represent, particularly in the case of legal documents,:

The logical representation of the various constituents of a legal document (parties, recitals, operative, execution, schedule, appendices).

Representation the various nested levels of an individual clause

Cross-referencing between different parts of a legal agreement.

Structured representation of defined terms and their definitions

A logical representation of the document coversheet

A logical connection between the agreement parties and document execution

Drafting scripts are identified by a unique resource identifier. In this case, for the purposes of the example, it is assumed that the drafting script of the script element 18 is identified by the resource identifier:

practicallaw.com/tp/sample_dscript_1

Accordingly, other drafting scripts can use the drafting script of the script element 18 by using this a 'da:include' element and the above identifier. This is illustrated in the following script element 19, which may be assumed to be called 'sample_dscript_2',

```
<da:draftScript xmlns:da="http://practicallaw.com/plc/da">
    <da:paramDecls>
        <da:paramDecl name="buyer"
        type="com.practicallaw.btypes.UKCompany" />
    </da:paramDecls>
    <clause>
        <title>Costs</title>                         (19)
        <para>
            Unless otherwise specified, all costs in connection
            with the negotiation, preparation,
            execution and performance of this document,
```

-continued

```
            and any documents referred to in
                it shall be borne by the party that incurred the costs.
        </para>
        <da:include idref="practicallaw.com/tp/sample_dscript_1 ">
            <da:withParam name="buyerName" >p("buyer.-
            registeredName")</da:withParam>
        </da:include>
    <clause>
</da:draftScript>
```

It is to be noted that the parameter 'buyer' declared in the "including script" (script element 19) is of a "UKCompany" type. However, the parameter 'buyerName' declared in the "included script" (script element 18) is of a Simple type. The 'da:withParam' element of the script element 19 binds the value of the registeredName property of the UKCompany to the buyerName parameter.

The including script ('sample_dscript_2') may itself be included in one or more other drafting scripts or it may be specified directly by a document-type script. In the present example, the drafting script 'sample_dscript_2' is the top-level document drafting script (albeit a rather unrealistically short one).

If the drafting script 'sample_dscript_2' was a document drafting script, the document-type script directly referencing it could be the script element 20 below.

```
<da:documentType xmlns:da="http://practicallaw.com/plc/
da">
    <da:local idref="practicallaw.com/qs/sample_qscript" >
        <da:defaultData idref="practicallaw.com/qs/
        sample_qscript_defaults" >                              (20)
    </da:local>
    <da:forDraftScript idref="practicallaw.com/tp/
    sample_dscript_2">
        <da:setParam name="buyer">d("purchaser")</
        da:setParam>
    </da:forDraftScript>
</da:documentType>
```

In considering the script element 20, the following features should be noted. The 'da:local' element specifies a question-session script via an identifier. That particular question-session script would normally refer to at least a group type (i.e. generate a control) which elicits data for a "UKCompany" domain (data) type. The 'da:defaultData' element specifies a container of data which supplies the defaults for the objects which can be edited via the specified question-session script. The 'da:forDraftScript' element specifies the sample document script 'sample_dscript_2' via its identifier. The 'da:setParam' element sets the value of 'sample_dscript_2's parameter called 'buyer'. The content of the 'da:setParam' element is a reference to a data item which, when the document-type script of the script element 20 is activated, will contain the company data elicited by the question-session script (and whose default properties are supplied by the default container). The name 'purchaser' in this example is the name of the group (control) generated based on the question-session script and is also here used as the identifier (ob-loc) of the object for which the group is responsible. For the sake of simplicity, the script element 20 does not include any shared data.

Figure 21:
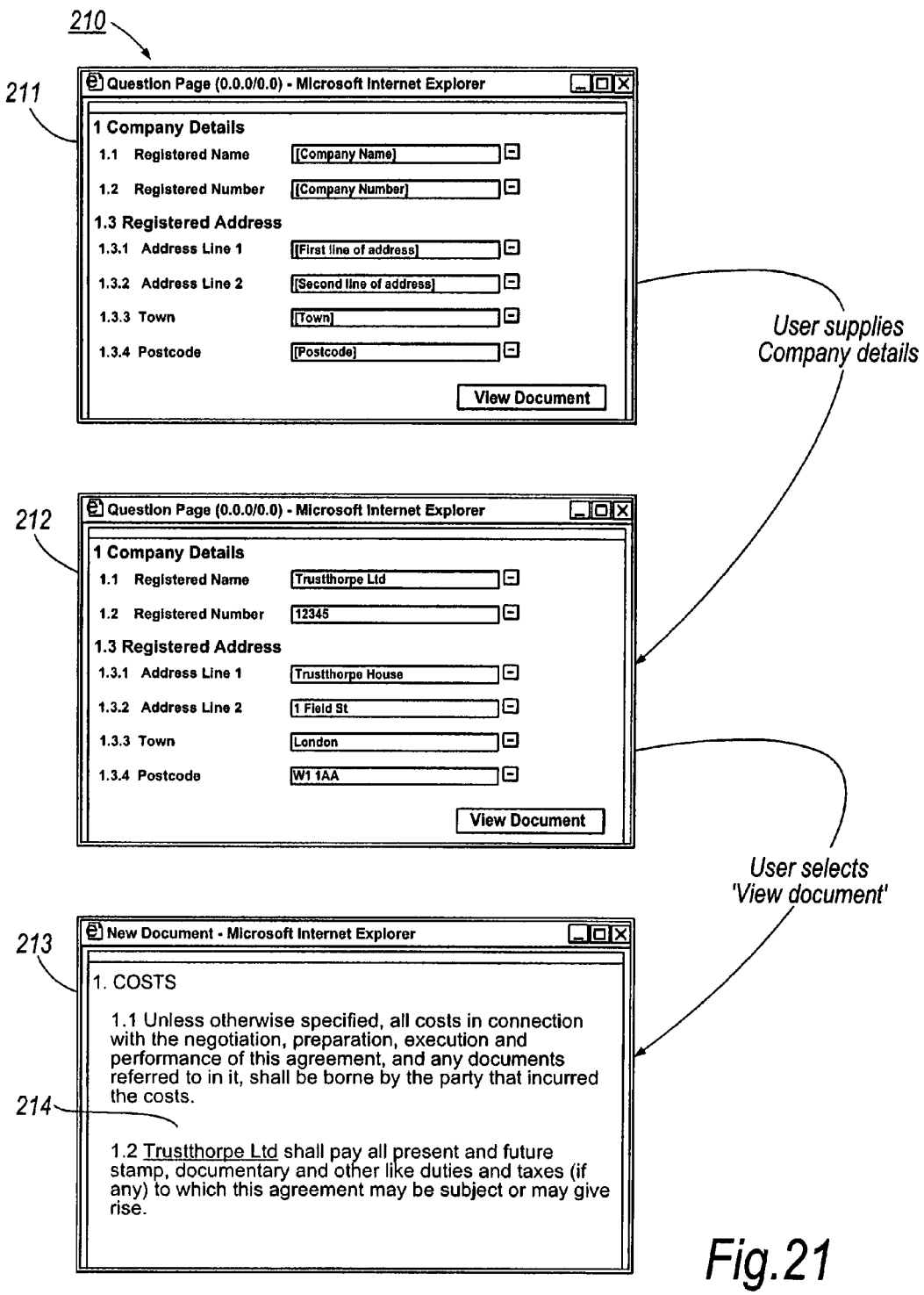
FIGS. 21 and 22 are schematic flow diagrams to illustrate how a user might interact with the system of FIG. 1.

FIG. 21 is a schematic flow diagram 210 to illustrate how a user might interact with the system 1. The flow diagram 210 presents interface screens 211, 212 and 213.

In the scenario depicted in FIG. 21, the user is first presented with interface screen 211, which comprises a control to allow the user to enter company data. The control of the interface screen 211 displays default data, and the user can replace this data with actual data, thereby producing interface screen 212. The user then proceeds to interface screen 213 by electing to view the document. It is to be ntoed that the entered company name "Trustthorpe Ltd" appears in the generated document as a hypertext link 214. This enables the user to link back from the generated document to the relevant portion of the question session, i.e. to the interface screen 212.

The link 214 accordingly allows the user to modify the data after having seen the document. Indeed, the user could have elected to view the document without having supplied any data, in which case the default data "Company Name" would have appeared in the generated document as the link 214. Clicking on the link in that case would have taken the user to interface screen 211 to allow the user to enter the company details.

As illustrated in FIG. 21, users require links to editing controls for any piece of data used in the generation of the document. This includes document-specific and deal-wide data. As well as providing these links, the system 1 also allows users to be made aware of the effects on the generated document that changes to the data will make, even before the changes are actually made. This facility of the system 1 will now be explained in detail.

Many kinds of user (lawyers in particular) prefer to start with a first rough draft of a document and then refine it. In other words such users tend to want to see a version of the document that they are working on at a very early stage in the process, even before they've entered any data. Accordingly, the system 1 is capable of showing a first draft of a document generated using a default set of data. The user may then allow the user to navigate via links, such as link 214 of FIG. 21, back to controls which enable him to change that data. The document can then be re-generated and if necessary the data can be re-edited in an iterative view-document/change-data/generate-document cycle.

It is desirable for a user to know, when working in this way, just how a change to a piece of data will affect the generated document. For example, it would be unsatisfactory for a user, in the case that a certain clause ought to be present in the generated document, to have to track down the question which pertains to the inclusion of the clause and further to have to work out the answer which will make it appear.

Against this background, the system 1 allows a user to view the rules (or some of the rules) that the system uses to create the document. The rules may be shown alongside or embedded in the rendered generated document. Thus, the user can see exactly what the effects will be of changes to the data that he or she makes.

The system 1 allows the generated draft document to be shown in a mode which supplies information about how the draft would appear were the data values different. The author of the drafting script controls what appears in this mode. The system 1 thus allows authors to decide just which rules are shown alongside or embedded in the rendered generated document, since in many cases displaying all of the rules would generate an overwhelmingly complex document. The user can choose to view the generated draft in this mode, or in a 'final version' mode, from which this information is removed.

The draft also contains links to data-edit controls enabling the user to modify the default values and add new information. The links can connect either to edit controls defined in a question session or to data input controls defined in an external application.

The following extract from a generated confidentiality agreement illustrates some of these concepts.

3.2 Before the Buyer discloses any information under this clause, the Buyer shall [use his or her [best] OR [reasonable] endeavours to]:

(a) inform the Seller of the full circumstances of the disclosure and the information that will be disclosed;

[(x) give the Seller a copy of a legal opinion indicating that disclosure is necessary;]

The hypertext links from 'the Buyer' and 'the Seller' are to questions about which term to use for these roles (for instance, alternatives might be 'Purchaser' and 'Vendor'). The square brackets are 'optionality links'. The text between the brackets is optional; that is, there are parameters to the drafting script whose values control whether the text is present or absent. The optionality links navigate to questions that supply those values. Some square brackets surround black text and some surround greyed text. The colour of the text indicates whether it is 'present' or 'absent' given the current parameter values. The black optional text is 'present' given the current parameter values, and the grey text is 'absent' given those values. More precisely, for the black optional text, the values of the parameters which control its presence are such that the text will appear in the final version of the generated document. For greyed optional text, the values of its controlling parameters are such that the text will not appear. Accordingly, when the user chooses to view or print the final version of the generated document, the 'absent' text is effectively removed.

In the above extract, a greyed 'OR' is inserted between the two options 'best' or 'reasonable' This occurs automatically where two options are alternatives to one another. Options can be nested within other options. For example a version of this document favouring the seller would take out entirely the section 'use his or her . . . endeavours to'.

It is to be appreciated that although this description of the system 1 refers to the values of parameters as driving the presence or absence of text, not all parameters are simple. As explained above, many are instances of complex business types which have named properties, and those properties themselves may be instances of complex business types. For example, the wording produced by a particular drafting script having a parameter that is a company (whose type is "Company") may depend on a property of the company defined within the Company type. For example, the wording may depend on the country of residence of the company secretary, where the company secretary is a sub-property (whose type is Person) of the company, and the country of residence is a sub-property of the secretary. In order to avoid having always to qualify the expression 'value of a parameter' with 'or one of its properties, or properties of its properties . . . '; the expression should be understood in a broad sense, when a value of a parameter is said to be referenced, or expressed, or tested, it should be understood as meaning a value of any property in its property tree as explained previously. This example is illustrated by the following dot notation for the country of residence of the secretary of the company, which effectively says "access the countryOfResidence property of the Person object that is the 'secretary' property of the company parameter".

company.secretary.countryOfResidence

The following script element 21 is an example of a drafting script that would produce the above extract from a generated confidentiality agreement. The various devices which it illustrates are described thereafter.

```
<da:draftScript xmlns:da="http://practicallaw.com/plc/da">
  <da:paramDecls>
    <da:paramDecl name="forceDisclEndeavours" type="com.practicallaw.btype.general.StriveLevel"/>
    <da:paramDecl name="forceDisclLegalOpinion" type="com.practicallaw.btype.general.Boolean"/>
    <da:paramDecl name="discloser" type="com.practicallaw.ls.obj.Simple"/>
    <da:paramDecl name="receiver" type="com.practicallaw.ls.obj.Simple"/>
  </da:paramDecls>
  <clause>
    <para>Before <da:ex>p("receiver")</da:ex> discloses any information under this clause,
<da:ex>p("receiver")</da:ex> shall (to the extent permitted by law)
      <da:options>
        <da:if prov='p("forceDisclEndeavours")'>p("forceDisclEndeavours").is("best") ||
p("forceDisclEndeavours").is("reasonable")</da:if>
        <da:option>
          use his or her
          <da:options>
            <da:if prov='p("forceDisclEndeavours")'>p("forceDisclEndeavours").is("best")</da:if>
            <da:option>best</da:option>
            <da:if prov='p("forceDisclEndeavours")'>p("forceDisclEndeavours").is("reasonable")</da:if>
            <da:option>reasonable</da:option>
          </da:options>
          endeavours to
        </da:option>
      </da:options>
    </para>
    <clause>
      <para>inform <da:ex>p("discloser")</da:ex>of the full circumstances of the disclosure and the information that
will be disclosed</para>
    </clause>
    <da:options>
      <da:if prov='p("forceDisclLegalOpinion")'>p("forceDisclLegalOpinion").is("true")</da:if>
      <da:option>
        <clause>
          <para>give <da:ex>p("discloser")</da:ex> a copy of a legal opinion indicating that disclosure is
necessary</para>
        </clause>
      </da:option>
```

(21)

```
        </da:options>
      </clause>
</da:draftScript>
```

The 'da:ex' tag is the device used in drafting scripts to express the value of a parameter in the generated document and to create a link to a control by which a user sets or modifies this value. As explained above, a parameter will have been set from a container (using an obloc). A container of answers to a question session is one type of container, but there can be other types. In the general case, any system which is able to resolve dot notation paths is able to act as a container in this sense.

Container Adapters were described above to explain how data could be accessed from an external source such as a database. It is therefore to be appreciated that a Container Adapter should be able to resolve dot notation paths, and that the objects it returns are instances of data types (Persons, Obligations, etc). Further, from the perspective of a drafting script, there is no difference between receiving a parameter which has been obtained from one kind of container rather than from another.

As suggested above, a da:ex tag does not merely express the value of a parameter, it also creates a link to enable a user to modify that data. Therefore, any parameter value must contain information which will enable the creation of such a link. Thus any parameter contains, as well as its value, a piece of data called a 'provenance'. A provenance is a URL (Universal Resource Locator) which will be rendered so as to allow a user to navigate to a control to modify the value of the data.

The 'da:if' tag is the device used in drafting scripts to enable the conditional insertion of text. The content of a da:if tag can be an expression from a programming language such as Java which evaluates to true or false, and it will normally be an expression which tests the value of a parameter. By way of example, reference is made to the script element 17 provided above. That script element illustrates a choice of different document content depending on the tested value of a parameter. The script element 17 will accordingly output one form of words if the buyer is a person and another form of words if the buyer is a company. That is, the content of the da:select whose da:if is false will simply not be generated, and it will not appear in any guise in the generated document.

Optionality, i.e. showing the user the effect of other data values, uses da:if tags in a slightly different way. In order to illustrate these differences, the following script element 22 is provided. The script element 22 is an extract of the script element 21 provided above.

```
      <da:options>
          <da:if prov='p("forceDisclEndeavours")'>
          p("forceDisclEndeavours").is("best")</da:if>
          <da:option>best</da:option>                              (22)
          <da:if prov='p("forceDisclEndeavours")'>
          p("forceDisclEndeavours").is("reasonable")</da:if>
          <da:option>reasonable</da:option>
      </da:options>
```

The da:options element is like a da:choice element in that it selects between two alternatives based on the value of a parameter. However the da:options tag signals to the system 1 that both alternatives need to be generated, and both appear in the generated document, except one is marked as 'present' and the other marked as 'absent'.

The format of the generated document is a medium-neutral XML document as discussed above. The step of actually rendering the generated document occurs after this medium-neutral representation has been created. This concept is discussed above with reference to FIG. 3A. The difference between the mode of presentation which shows both 'absent' and 'present' text and that which shows just 'present' text—the final version mode—is a difference in rendering. That is, in the final version mode text marked as absent is removed (and in the other mode, that text may be rendered greyed out, as above).

The "prov" attribute of the da:if element in the script element 22 associates a provenance with the option for the purpose of generating a link to effect a change to the relevant data object. In both cases, the provenance specified is for the very parameter whose value is being tested in the da:if content. This is typical, but not essential. For instance if the object being tested is a property of an instance of a business type, it can sometimes be a good idea to link back to the control for the complete object, rather than just to the property which is being tested.

In the case of generating legal documents, one or more execution clauses are normally required to allow the parties the document to sign it. As previously mentioned, the form of an execution clause in a legal document depends on the kind of document being signed and on the nature of parties which are signing it. For example, different forms are required if a party is a company, or if a director to a company is a company, or if a party is represented by an attorney (and whether the attorney is a company or a real person also makes a difference).

The logic determining the form of an execution clause is intricate and depends on information which is shared between different documents in a deal (for example information about the parties to the document) and also on information which is specific to the document (for example whether the document is being signed as an agreement or a deed). Furthermore, some of the information which is specific to the document depends on information which is shared between documents. For example the question of whether a party is signing by the use of its seal or not only makes sense if the party is a company and not if the party is a real person.

Information which is specific to the document needs to be elicited from the user in the context of the generation of the document. Thus, which information of this sort needs to be elicited from the user, is dependent upon information which is not document-specific.

In view of the complexity of the logic required to produce an execution clause, the system 1 employs a parameterised re-usable module to hold that logic. That module can be an XML script that can be referenced in a drafting script. Accordingly, an author can in effect reference this relatively complex script when he is writing a new drafting script, i.e. he does not have to write that complex script himself. Accordingly, the drafting script used to generate an execution clause of a document may be an XML script of the re-usable kind described above.

Users of the system 1 generally employ the system to generate initial drafts of documents, and may typically wish to continue to revise and modify those documents, sometimes quite substantially, before they are considered working first drafts.

It is desirable for revisions and modifications to draft documents to be done on the automated manifestation of these documents, within the system. This maintains the ability for the document to respond to changes in data held in the system even as it is further modified by the user in substantial ways.

One way that draft documents generated from executing the drafting scripts (based on the data collected from question sessions) can be modified is by changing the values of the collected data, and regenerating the draft document from the new data. This type of modification has been described already above, and is a manifestation of the feedback route 42 of FIG. 3A. This type of modification is however a very restricted class of modification, and does not allow, for example, the free editing of data-independent text within the document.

One way to achieve the flexibility in editing actual text within a draft document is to export it into a word processing format such as MS Word, and then to edit the resulting word processing file. However, this disconnects the draft from the document automation system, such that a regeneration of the draft document from the system 1 results in an un-amended version of the draft document.

In general, in existing document automation systems, it is impossible to allow users to freely edit the results of a document generation, and then preserve these user modifications along with changes in the data used to generate the document by applying the automation. Users of such existing systems are faced with the Hobson's choice of either losing the automation and data centralisation of those systems, or losing the ability to freely modify the draft document. In contrast, the system 1 has been designed to allow users to amend both data and document content without losing the automation afforded by that system.

The system 1 is operable to generate unique instances of modifiable drafting scripts for each document created in the system, and to allow textual modifications made by users in the created document to be preserved and recreated specifically for that document.

In general, as described above, a document drafting script is the designated root of a delegation graph, which contains clause and sub-clause drafting scripts to any arbitrary degree of depth. The system 1 generates an instance of a drafting script and each sub-drafting script, based on the original authored drafting script. That is, these instance drafting scripts are generated for each node of the delegation graph, forming a unique modifiable instance of that delegation graph which is permanently associated with a particular document.

At the time of their creation, these drafting script instances are identical to the original authored drafting scripts, except that they are further marked-up automatically by the system 1 with unique element id's for each fragment of text or mark-up present therein, and further, references delegating execution to sub-drafting scripts are automatically replaced with references to the newly created unique sub-drafting script instances associated with the particular document.

It has already been explained that the product of a drafting script, when executed, is a representation of a draft document in XML. It has also already been explained that this product is further transformed into a rendition of the document draft in a form suitable for an application running on the user's computer, such as a web browser or a word processor. The final document draft seen by the user is therefore normally at least two distinct transformations removed from the drafting script instance used to generate it. The first transformation is from the drafting script instance to the XML document produced by executing that drafting script (and it's graph of delegations). The second transformation is from that XML document into an output format such as HTML for web-browsers or Microsoft Word format for viewing in the Microsoft Word word-processor.

In the system 1, the unique element id's for each fragment of text and mark-up in the source drafting script instance are maintained, without change, in analogous elements (such as ranges of text, or paragraphing tags) in the final rendered draft delivered to the user's computer. The system 1 further employs custom automations to the application (e.g. to the word processor, or the web browser) running on the user's computer to cause the application to communicate changes in document content as the user makes them, element by element, based on the unique element id's to the system 1. This is made possible by referencing these changes by the unique, in-variant element id of the element that has been changed as a result of the user's modification. The system 1 is then adapted to make identical changes to the uniquely identified source element in the appropriate drafting script instance, which is in turn associated with the particular document the user is working on. When the document is regenerated by the system by executing the drafting script instances associated with that document, the user's textual modifications are recreated exactly as they were made in the original application (e.g. word-processor or web-browser).

In order to consider the use of element id's further, reference is made to the the drafting script examples provided as script elements 18 ('sample_dscript_1') and 19 ('sample_dscript_2') above. The second of those drafting scripts is identified by the URI 'practicallaw.com/tp/sample_dscript_2' and delegates to the first of those drafting scripts by the URI 'practicallaw.com/tp/sample_dscript_1'.

In order to allow a user to create a document using a document-type script that references the drafting script 'sample_dscript_2', and to allow the user to benefit from the system of drafting script instances described above, the system 1 is adapted to create specific amendable drafting script instances with new unique identifiers. Such drafting script instances that could be created by the system 1 in this situation are provided below as script elements 23 and 24. Script element 23 corresponds to script element 19, and script element 24 corresponds to script element 18.

```
practicallaw.com/tp/sample_dscript_2/tpx/t1:
<da:draftScriptInstance xmlns:da="http://practicallaw.com/plc/da">
    <da:paramDecls>
        <da:paramDecl name="buyer" type="com.practicallaw.btypes.UKCompany" />
    </da:paramDecls>
    <clause elemid="a3891" tpid="practicallaw.com/tp/sample_dscript_2/tpx/t1 ">
        <title elemid="a3892" tpid="practicallaw.com/tp/sample_dscript_2/tpx/t1">Costs</title>
        <para elemid="a3893" tpid="practicallaw.com/tp/sample_dscript_2/tpx/t1">
```

-continued

```
    Unless otherwise specified, all costs in connection with the negotiation, preparation,                    (23)
    execution and performance of this document, and any documents referred to in
        it shall be borne by the party that incurred the costs.
        </para>
        <da:include elemid="a3894" tpid="practicallaw.com/tp/sample_dscript_2/tpx/t1"
idref="practicallaw.com/tp/sample_dscript_1/tpx/s2 ">
            <da:withParam name="buyerName" >p("buyer.registeredName")</da:withParam>
        </da:include>
    </clause>
    </da:draftScriptInstance>
practicallaw.com/tp/sample_dscript_1/tpx/s2:
<da:draftScriptInstance xmlns:da="http://practicallaw.com/plc/da">
    <da:paramDecls>
        <da:paramDecl name="buyerName" type="com.practicallaw.ls.obj.Simple" />                               (24)
    </da:paramDecls>
        <para elemid="b2001" tpid="practicallaw.com/tp/sample_dscript_1/tpx/s2>
            <da:ex elemid="b2002"
tpid="practicallaw.com/tp/sample_dscript_1/tpx/s2>p("buyerName")</da:ex> shall pay all present and
future stamp, documentary and
            other like duties and taxes (if any) to which this agreement ay be subject or may give
            rise.
        </para>
<da:draftScriptInstance>
```

The new drafting script instances of the script elements 23 and 24 are identical to the original drafting scripts of the script elements 19 and 18, respectively, except for the insertion of unique element-id's, e.g. "a3891", for each amendable fragment, and the modification of delegation calls through da:include elements. In addition to the element-id's it will be appreciated that each amendable fragment also comprises a script-instance id, as identified by "tpid" in the scripts elements 23 and 24. These script-instance id's identify the script instance which the amendable fragment is part of. It will be appreciated that the use of both the element-id's and the script-instance id's may simplify or speed up the searching process for a particular amendable fragment, and will also reduce the burden on the system 1 to generate element-id's that are unique amongst all script instances. However, it will be appreciated that the script elements 23 and 24 could be employed without the script-instance id's, if the element-id's are unique amongst element id's employed by the system.

The da:include element in the new drafting script instance (script element 23) created from sample_dscript_2 has been modified to refer to the new drafting script instance (script element 24) created for sample_dscript_1.

On the first, and each subsequent regeneration of a draft document for this particular document instance, it is these new drafting script instances that will be executed to generate the draft document from the data supplied as parameters, rather than the original drafting scripts. Further, the draft document content delivered to the user's computer will contain the element-id's which originate in the drafting script instances, although these will be invisible to the user.

Figure 22:
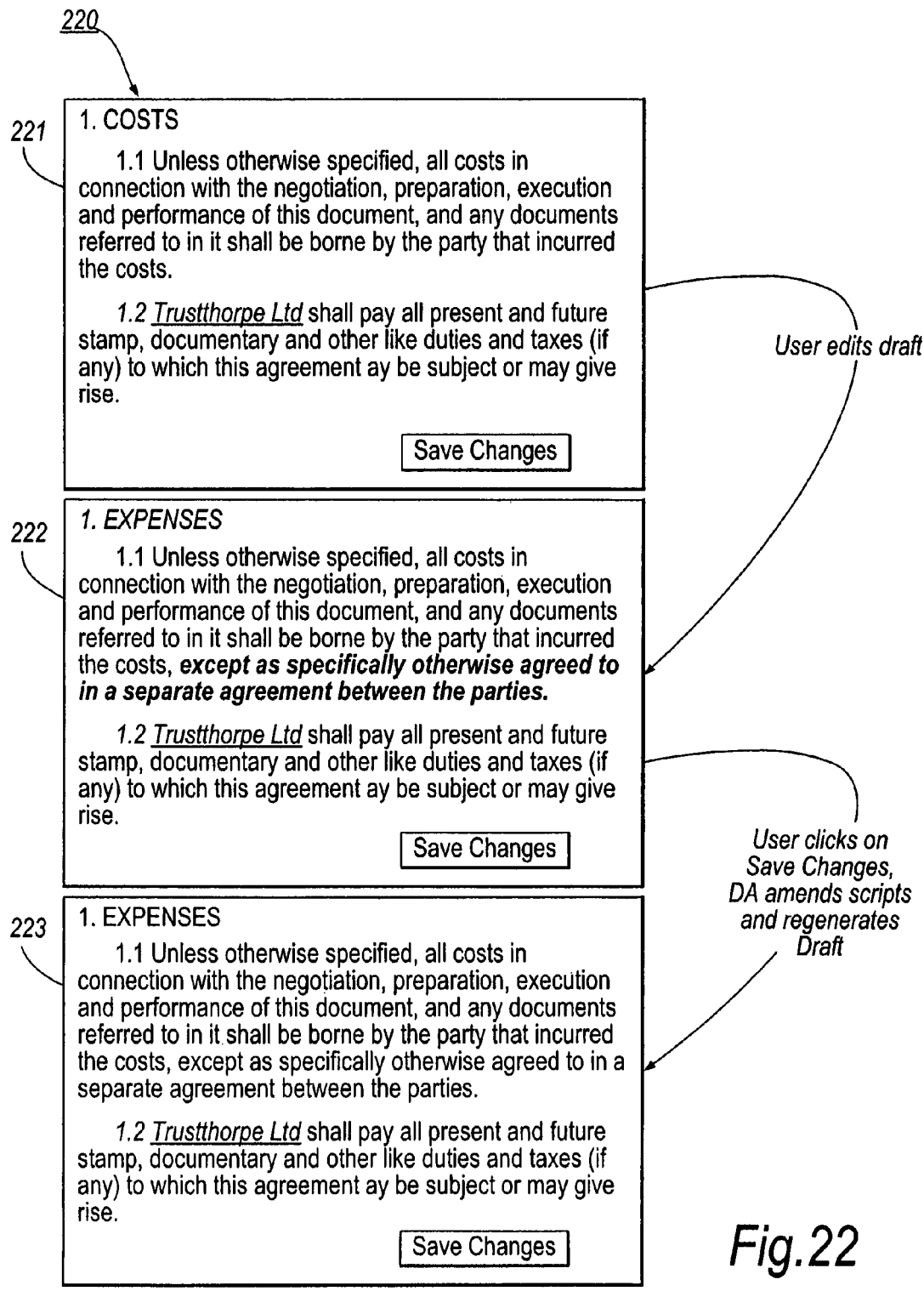

FIG. 22 is a schematic flow diagram 220 to illustrate how a user might interact with the system 1. The flow diagram 220 presents interface screens 221, 222 and 223.

In this scenario depicted in FIG. 22, the user is first presented with interface screen 221, which comprises a generated draft document. The user then chooses to edit the generated draft document to the form shown in interface 222, and then saves these changes, thereby producing interface screen 223.

In this example, the user's modifications to the draft document affect two distinct elements in the underlying drafting script instances, specifically, these are elements a3892 and a3893, and both are contained within the drafting script instance 'practicallaw.com/tp/sample_dscript_2/tpx/t1' provided above as script element 23.

When the user clicks the 'Save Changes' button, custom extensions to the editing software used on the user's computer will perform the following operations. These operations assume that the custom extensions to the user's editing software are not part of the system 1, however the system 1 could of course comprise those extensions.

1. Examine the draft document content for changes, and identify that the elements a3892 and a3893 have been modified.
2. Construct a message to transmit to the system 1, typically to the system server 2 of the system 1, which specifies each element that has been modified, by providing an element-id and a drafting script instance id for each modified element. The message will also include the new (modified) content, or other indications of the amendments made, to be inserted for each modified element.
3. Transmit the message to the system 1, which will make the corresponding amendments to the underlying drafting script instances.
4. Refresh the view of the document draft by requesting regeneration of the document draft by executing the amended drafting script instances. This step is not strictly necessary, but is useful so that other changes to data parameters that affect data-dependent aspects of the draft document may also be manifested in the draft document.

The drafting scripts of the script elements 23 and 24 would now be amended by the system 1 as shown in the script elements 25 and 26, respectively, below.

```
practicallaw.com/tp/sample_dscript_2/tpx/t1:
<da:draftScriptInstance xmlns:da="http://practicallaw.com/plc/da">
    <da:paramDecls>
```

```
    <da:paramDecl name="buyer" type="com.practicallaw.btypes.UKCompany" />                    (25)
  </da:paramDecls>
  <clause elemid="a3891" tpid="practicallaw.com/tp/sample_dscript_2/tpx/t1 ">
        <title elemid="a3892" tpid="practicallaw.com/tp/sample_dscript_2/tpx/t1">Expenses</title>
    <para elemid="a3893" tpid="practicallaw.com/tp/sample_dscript_2/tpx/t1">
      Unless otherwise specified, all costs in connection with the negotiation, preparation,
          execution and performance of this document, and any documents referred to in it shall be
borne by the party that incurred the costs, except as specifically otherwise agreed to in
a separate agreement between the parties.
    </para>
    <da:include elemid="a3894" tpid="practicallaw.com/tp/sample_dscript_2/tpx/t1"
idref="practicallaw.com/tp/sample_dscript_1/tpx/s2 ">
        <da:withParam name="buyerName" >p("buyer.registeredName")</da:withParam>
    </da:include>
  </clause>
</da:draftScriptInstance>
practicallaw.com/tp/sample_dscript_1/tpx/s2:
<da:draftScriptInstance xmlns:da="http://practicallaw.com/plc/da">
  <da:paramDecls>
    <da:paramDecl name="buyerName" type="com.practicallaw.ls.obj.Simple" />                  (26)
  <da:paramDecls>
        <para elemid="b2001" tpid="practicallaw.com/tp/sample_dscript_1/tpx/s2>
            <da:ex elemid="b2002"
tpid="practicallaw.com/tp/sample_dscript_1/tpx/s2>p("buyerName")</da:ex> shall pay all present and
future stamp, documentary and
          other like duties and taxes (if any) to which this agreement may be subject or may give rise.
        </para>
<da:draftScriptInstance>
```

Accordingly, it can be seen that the user's amendment to the text portions of the generated draft document have been preserved in the drafting script instances. That is, the content of the elements a3892 and a3893 in the drafting script instance 'practicallaw.com/tp/sample_dscript_2/tpx/t1' has now changed. There are no changes to drafting script instance 'practicallaw.com/tp/sample_dscript_1/tpx/s2' as there were no modifications to any fragments that originated in that script. This functionality is a manifestation of the feedback path 44 of FIG. 3A.

It will be appreciated that amendments to portions of such a generated draft document may require not only amendments to textual content or other such content in the corresponding drafting script instance(s), but may also require amendments to logic or other rules expressed therein. For example, if a user deletes a paragraph from such a generated draft document, the drafting script instance concerned could be amended by deleting the logic, as well as the textual content, corresponding to that paragraph from that drafting script instance. If, however, a user adds a new paragraph to such a generated draft document, the drafting script instance could be amended by adding the necessary logic, rule, or markup element for a new paragraph, as well as the new textual content, to that drafting script instance. Accordingly, it will be appreciated that embodiments of the present invention may amend both logic/rules and document content expressed within a drafting script instance.

As explained above, these modifications to the drafting script instances will only affect regenerations of this particular document instance. No other documents created from the same document type will be affected by these changes, and nor will other existing document instances that were previously created from this document type. It will be appreciated that the element id's could be assigned to any level of detail within a drafting script, for example on a per-word or per-letter basis.

It will be appreciated that users generally work on documents for a deal over a period of time that could be many months long. While users work on a deal over many months, it is important that scripts that are used for those documents continue to function correctly. However, at the same time, an author (for example an operator of the system 1) may want to update, edit or publish new scripts to the system.

The system 1 has accordingly been adapted to allow updates to scripts, while at the same time ensuring that existing user documents and deals remain unaffected. This is achieved by partitioning authored scripts into versioned containers that can be run simultaneously under one instance of the system 1. Documents created by users under a particular versioned container, can remain locked to this container for their lifetime regardless of subsequent releases of new editions of the scripts. Such new editions are released to new versioned containers. In this way, the dependencies of user-created documents on scripts can be locked to a particular version, such that those documents remain undisturbed by updates for the lifetime of those documents.

It will also be appreciated that as more and more users create documents using the system 1, the same authored resources (scripts etc.) will be used more and more frequently. The process of reading authored resources from their underlying persistent storage and then parsing them into in-memory objects is computationally intensive. It is therefore important to maintain an in-memory cache of commonly used resources, in order to provide responsiveness and good performance under conditions of high load. A problem, however, is that an in-memory cache requires allocation of large amounts of memory for storage. It is important to be able to control the capacity of the cache in such a way that its memory use is controlled. With resources that can be highly heterogeneous in size (ranging from a few bytes to several hundred kilobytes) this is difficult to achieve by a simple number cap on the items in the cache.

The system 1 accordingly allows complex in-memory resource objects to apply an estimated size algorithm that determines a size bucket for that resource to be cached in. The cache maintains several buckets of different size category resources, and assigns resources to buckets based on this algorithm. This allows the cache to be maintained within tolerable limits of a certain level of memory use measured in bytes, without losing the ability to cache many smaller items while restricting larger items. It also allows the cache to provide good performance and scalability, as the expensive operations to get actual exact sizes for complex in-memory objects are not required.

It will also be appreciated that the system 1 may be used to produce documents for a variety of different organisations, for example for a variety of different law firms.

Most organisations, for example law firms, expect their documents to be in Microsoft Word format, and each generally have a particular preference about the styling of those Word documents. Styling includes minor rendering matters such as fonts and sizes and also more substantial properties such as the wording of some clauses, forms of punctuation, case and layout of titles and headings, and the location of certain clauses in the document. It is known that the process of rendering a Word document uses XSLT style-sheets. Accordingly, the system 1 holds the rules which determine these properties in a configuration style-sheet in script form, such that a number of different organisation's styles can be managed and maintained by managing and maintaining these configuration scripts. It will be appreciated that differences in rendering requirements from one organisation to another are not limited to Microsoft Word documents, and accordingly that the system 1 is adapted to render other types of output documents differently depending on the organisation concerned.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a server (or other communication equipment) embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

The present invention is applicable to different types of distributed communication network and does not necessarily need to be implemented over the Internet 4. For example, the present invention may be implemented within a private network such as an intranet.

It will be appreciated that, although the embodiments described above have been implemented in software, the present invention may be implemented in hardware.

It will be appreciated that the claims of the present application have been formulated in view of US practice, and accordingly that the dependent claims do not refer to more than one preceding claim. However, it is to be understood that the applicant envisages all available combinations.

The invention claimed is:

1. An electronic-document generation system comprising hardware and/or one or more processors configured to function as:
    (a) a generation unit operable to employ a content source comprising document content and a logic source comprising logic to automatically generate a target document by evaluating said logic in dependence upon user-elicited data, the user-elicited data being data elicited from a user of said system;
    (b) a user interface operable to cause the target document or another electronic document generated therefrom to be displayed to the user, said user interface being further operable to permit the user to make amendments to the displayed document including a change to said user-elicited data and an amendment other than a change to said user-elicited data, the displayed document being the target document or said other electronic document generated therefrom, said user interface being operable to permit the user to make said amendment other than a change to said user-elicited data directly to the displayed document, whereby said amendment other than a change to said user-elicited data is also made to said target document or said other electronic document generated therefrom; and
    (c) a source-amending unit operable, when such an amendment other than a change to said user-elicited data is made directly to the displayed document by the user, to automatically effect an equivalent amendment to a corresponding portion of the content source and/or the logic source,
    wherein the generation unit of the system further comprises:
        an interpreter which, during generation of said target document, interprets at least one instruction of a predetermined type, the at least one instruction referring to said user-elicited data and identifying a content item for use in generating said target document;
        a first includer which, for the at least one instruction, includes the identified content item or content derived therefrom in a portion of said target document even when a value of the data that the instruction refers to indicates that the content item or the content derived therefrom is to be excluded from the target document;
        an assigner which assigns a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to; and
        a second includer which, for said portion of the target document, includes additional information in said target document indicative of whether the portion concerned has been assigned said first status or said second status.

2. The electronic-document generation system according to claim 1, wherein:
    said content source and/or said logic source comprise at least one portion identified by a portion identifier, the or each said portion being responsible for the generation of a corresponding portion of said target document;
    the generation unit is operable, for the or each said portion of the target document, to include the corresponding portion identifier or a portion identifier derived therefrom in said target document;
    the user interface is operable to:
        permit the user to make an amendment other than a change to said user-elicited data to a portion of the displayed document corresponding to the or one of the portions of the target document; and
        communicate to said source-amending unit the portion identifier included in the target document that corresponds to the amended portion of the displayed document, or a portion identifier derived therefrom, and information about the amendment made; and
    the source-amending unit is operable to employ the communicated portion identifier and the communicated information to effect an equivalent amendment to the portion of the content source and/or the logic source corresponding to the communicated portion identifier.

3. The electronic-document generation system according to claim 2, wherein the or each portion identifier is unique amongst any other such identifiers within said sources.

4. The electronic-document generation system according to claim 2, wherein said sources are expressed in a markup language, and wherein the or each portion identifier is an element identifier identifying an element of the source concerned.

5. The electronic-document generation system according to claim 1, wherein:
said sources are associated with a source identifier distinguishing them from other such sources employable by the generation unit;
the generation unit is operable to include the source identifier, or an identifier derived therefrom, in said target document;
the user interface is operable, following such an amendment, to communicate to said source-amending unit the source identifier included in the target document; and
the source-amending unit is operable to employ the communicated source identifier to effect an equivalent amendment to the content source and/or the logic source corresponding to the communicated source identifier.

6. The electronic-document generation system according to claim 1, wherein said logic source and said content source are included within a drafting script.

7. The electronic-document generation system according to claim 6, wherein said drafting script is defined in a markup language.

8. The electronic-document generation system according to claim 7, wherein said markup language is XML.

9. The electronic-document generation system according to claim 1, wherein said hardware and/or one or more processors are configured to function as:
a data-accessing unit which employs a predetermined definition of a composite data type to access a composite data item being an instance of said composite data type from a data source; and
a generation unit which employs a drafting script written in a markup language to generate a said target document by evaluating logic in dependence upon said accessed composite data item.

10. The electronic-document generation system according to claim 9, wherein:
said predetermined definition comprises an expression definition for use in expressing said data item in said target document;
said logic specifies that said data item should be expressed in said target document; and
said generation unit is operable to employ said expression definition during generation of said target document to express said data item in the target document.

11. The electronic-document generation system according to claim 1, wherein said hardware and/or one or more processors are configured to function as:
(a) a configuration unit which accesses a predetermined document-specific script for generating a said target document and which, based on information contained within the predetermined document-specific script:
(i) identifies a default-data container comprising default data for said target document;
(ii) generates a working-data container and populates that container with said default data;
(iii) identifies a data-obtaining unit operable to obtain working data for said target document from a data source other than said default-data container, and stores the obtained working data in the working-data container;
(iv) identifies a drafting script comprising document content and logic for generation of said target document, said drafting script declaring parameters for applying data to said drafting script; and
(v) binds parameters of said drafting script to data items stored in said working-data container; and
(b) a generation unit which employs said drafting script to generate said target document by applying data stored in said working-data container to said drafting script based on said binding and by evaluating said logic in dependence upon said applied data.

12. The electronic-document generation system according to claim 11, wherein said data comprises at least one composite data item, the or each said composite data item being an instance of a respective composite data type.

13. The electronic-document generation system of claim 1, wherein:
the system further comprises an in-memory cache; and
the system is configured to maintain buckets of different size category sources in the in-memory cache and to store commonly used sources in corresponding buckets according to their size, thereby to allow the in-memory cache to be maintained within limits of a certain level of memory use without losing the ability to cache many smaller sources while restricting larger sources.

14. The electronic-document generation system of claim 1, wherein:
the user-elicited data is separate from the content and logic sources; and
the generation causes at least a part of said user-elicited data to be expressed in the target document as text.

15. The electronic-document generation system of claim 1, wherein:
said displayed document as amended by the user is a current displayed document, and wherein said equivalent amendment is such that a future such displayed document produced from the amended content and/or logic source and said user-elicited data would be substantially identical to said current displayed document.

16. An electronic-document generation system comprising hardware and/or one or more processors configured to function as:
(a) a generation unit operable to employ a drafting script to automatically generate a target document by evaluating logic expressed within said drafting script in dependence upon user-elicited data stored in a data source, the user-elicited data being data elicited from a user of said system;
(b) a user interface operable to cause the target document or another electronic document generated therefrom to be displayed to the user, said user interface being further operable to permit the user to make amendments to the displayed document including a change to said user-elicited data and an amendment other than a change to said user-elicited data, the displayed document being the target document or said other electronic document generated therefrom, said user interface being operable to permit the user to make said amendment other than a change to said user-elicited data directly to the displayed document, whereby said amendment other than a change to said user-elicited data is also made to said target document or said other electronic document generated therefrom; and (c) a drafting-script amending unit operable, when such an amendment other than a change to said user-elicited data is directly made to the displayed document by the user, to automatically effect an equivalent amendment to a corresponding portion of the drafting script, wherein the generation unit of the system further comprises:

an interpreter which, during generation of said target document, interprets at least one instruction of a predetermined type, the at least one instruction referring to said user-elicited data and identifying a content item for use in generating said target document;

a first includer which, for the at least one instruction, includes the identified content item or content derived therefrom in a portion of said target document even when a value of the data that the instruction refers to indicates that the content item or the content derived therefrom is to be excluded from the target document;

an assigner which assigns a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to; and a second includer which, for said portion of the target document, includes additional information in said target document indicative of whether the portion concerned has been assigned said first status or said second status.

17. A computer-implemented method for use in an electronic-document generation system, the method comprising:

(a) employing a content source comprising document content and a logic source comprising logic to automatically generate a target document by evaluating said logic in dependence upon user-elicited data, the user-elicited data being data elicited from a user of said system;

(b) displaying the target document, or another electronic document generated therefrom, to the user;

(c) permitting the user to make amendments to the displayed document including a change to said user-elicited data and an amendment other than a change to said user-elicited data, the displayed document being the target document or said other electronic document generated therefrom, and permitting the user to make said amendment other than a change to said user-elicited data directly to the displayed document, whereby said amendment other than a change to said user-elicited data is also made to said target document or said other electronic document generated therefrom; and (d) when such an amendment other than a change to said user-elicited data is made directly to the displayed document by the user, automatically effecting an equivalent amendment to a corresponding portion of the content source and/or the logic source, wherein the method further comprises:

during generation of said target document, interpreting at least one instruction of a predetermined type, the at least one instruction referring to said user-elicited data and identifying a content item for use in generating said target document;

for the at least one instruction, including the identified content item or content derived therefrom in a portion of said target document even when a value of the data that the instruction refers to indicates that the content item or the content derived therefrom is to be excluded from the target document;

assigning a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to; and for said portion of the target document, including additional information in said target document indicative of whether the portion concerned has been assigned said first status or said second status.

18. The computer-implemented method according to claim 17, the method further comprising:

generating a further target document;

employing the content source and the logic source, in their form following said equivalent amendment, to generate the further target document.

19. The computer-implemented method according to claim 17, being for generating said target document, the method comprising:

employing a predetermined definition of a composite data type to access a composite data item being an instance of said composite data type from a data source; and employing a drafting script written in a markup language to generate the target document by evaluating logic in dependence upon said accessed composite data item.

20. The computer-implemented method according to claim 17, being for generating said target document, the method further comprising:

(a) accessing a predetermined document-specific script for generating the target document and, based on information contained within the predetermined document-specific script:

(i) identifying a default-data container comprising default data for said target document;

(ii) generating a working-data container and populating that container with said default data;

(iii) identifying a data-obtaining unit operable to obtain working data for said target document from a data source other than said default-data container, and storing the obtained working data in the working-data container;

(iv) identifying a drafting script comprising document content and logic for generation of said target document, said drafting script declaring parameters for applying data to said drafting script; and (v) binding parameters of said drafting script to data items stored in said working-data container; and (b) employing said drafting script to generate said target document by applying data stored in said working-data container to said drafting script based on said binding and by evaluating said logic in dependence upon said applied data.

21. A target document generation program product, embodied in a non-transitory computer-readable storage medium of a computer, operable to cause the computer to perform operations, comprising:

(a) employing a content source comprising document content and a logic source comprising logic to automatically generate a target document by evaluating said logic in dependence upon user-elicited data, the user-elicited data being data elicited from a user of said system;

(b) displaying the target document, or another electronic document generated therefrom, to the user;

(c) permitting the user to make amendments to the displayed document including a change to said user-elicited data and an amendment other than a change to said user-elicited data, the displayed document being the target document or said other electronic document generated therefrom, and permitting the user to make said amendment other than a change to said user-elicited data directly to the displayed document, whereby said amendment other than a change to said user-elicited data is also made to said target document or said other electronic document generated therefrom; and (d) when such an amendment other than a change to said user-elicited data is made directly to the displayed document by the user, automatically effecting an equivalent amendment to a corresponding portion of the content source and/or the logic source, wherein the target document generation program product further comprises:

during generation of said target document, interpreting at least one instruction of a predetermined type, the at least one instruction referring to said user-elicited data and identifying a content item for use in generating said target document;

for the at least one instruction, including the identified content item or content derived therefrom in a portion of said target document even when a value of the data that the instruction refers to indicates that the content item or the content derived therefrom is to be excluded from the target document;

assigning a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to; and for said portion of the target document, including additional information in said target document indicative of whether the portion concerned has been assigned said first status or said second status; and for generating a further target document, the target document generation program product further comprises employing the content source and the logic source, in their form following said equivalent amendment, to generate the further target document.

22. A computer-implemented method for use in an electronic-document generation system, the method comprising:

(a) employing a drafting script to automatically generate a target document by evaluating logic expressed within said drafting script in dependence upon user-elicited data stored in a data source, the user-elicited data being data elicited from a user of said system;

(b) displaying to the user the target document or another electronic document generated therefrom;

(c) permitting the user to make amendments to the displayed document including a change to said user-elicited data and an amendment other than a change to said user-elicited data, the displayed document being the target document or said other electronic document generated therefrom, and permitting the user to make said amendment other than a change to said user-elicited data directly to the displayed document, whereby said amendment other than a change to said user-elicited data is also made to said target document or said other electronic document generated therefrom; and (d) when such an amendment other than a change to said user-elicited data is made directly to the displayed document by the user, automatically effecting an equivalent amendment to a corresponding portion of the drafting script, wherein the method further comprises:

during generation of said target document, interpreting at least one instruction of a predetermined type, the at least one instruction referring to said user-elicited data and identifying a content item for use in generating said target document;

for the at least one instruction, including the identified content item or content derived therefrom in a portion of said target document even when a value of the data that the instruction refers to indicates that the content item or the content derived therefrom is to be excluded from the target document;

assigning a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to; and for said portion of the target document, including additional information in said target document indicative of whether the portion concerned has been assigned said first status or said second status.

23. A non-transitory computer-readable storage medium storing a computer program which, when executed on a computer of an electronic-document generation system, causes the system to carry out the computer-implemented method of claim 17.

24. A non-transitory computer-readable storage medium storing a computer program which, when executed on a computer of an electronic-document generation system, causes the system to carry out a computer-implemented method, the method comprising:

(a) employing a content source comprising document content and a logic source comprising logic to automatically generate a target document by evaluating said logic in dependence upon user-elicited data, the user-elicited data being data elicited from a user of said system;

(b) displaying the target document, or another electronic document generated therefrom, to the user;

(c) permitting the user to make amendments to the displayed document including a change to said user-elicited data and an amendment other than a change to said user-elicited data, the displayed document being the target document or said other electronic document generated therefrom, and permitting the user to make said amendment other than a change to said user-elicited data directly to the displayed document, whereby said amendment other than a change to said user-elicited data is also made to said target document or said other electronic document generated therefrom; and (d) when such an amendment other than a change to said user-elicited data is made directly to the displayed document by the user, automatically effecting an equivalent amendment to a corresponding portion of the content source and/or the logic source wherein the method further comprises:

during generation of said target document, interpreting at least one instruction of a predetermined type, the at least one instruction referring to said user-elicited data and identifying a content item for use in generating said target document;

for the at least one instruction, including the identified content item or content derived therefrom in a portion of said target document even when a value of the data that the instruction refers to indicates that the content item or the content derived therefrom is to be excluded from the target document;

assigning a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to;

for said portion of the target document, including additional information in said target document indicative of whether the portion concerned has been assigned said first status or said second status; and for generating a further target document, the method further comprises employing the content source and the logic source, in their form following said equivalent amendment, to generate the further target document.

25. A non-transitory computer-readable storage medium storing a computer program which, when executed on a computer of an electronic-document generation system, causes the system to carry out the computer-implemented method of claim 22.

26. A non-transitory computer-readable storage medium storing a computer program which, when executed on a computer of an electronic-document generation system, causes the system to carry out a computer-implemented method, the method comprising:

(a) employing a content source comprising document content and a logic source comprising logic to automatically generate a target document by evaluating said logic in dependence upon user-elicited data, the user-elicited data being data elicited from a user of said system;

(b) displaying the target document, or another electronic document generated therefrom, to the user;

(c) permitting the user to make amendments to the displayed document including a change to said user-elicited data and an amendment other than a change to said user-elicited data, the displayed document being the target document or said other electronic document generated therefrom, and permitting the user to make said amendment other than a change to said user-elicited data directly to the displayed document, whereby said amendment other than a change to said user-elicited data is also made to said target document or said other electronic document generated therefrom; and (d) when such an amendment other than a change to said user-elicited data is made directly to the displayed document by the user, automatically effecting an equivalent amendment to a corresponding portion of the content source and/or the logic source wherein the method further comprises:

during generation of said target document, interpreting at least one instruction of a predetermined type, the at least one instruction referring to said user-elicited data and identifying a content item for use in generating said target document;

for the at least one instruction, including the identified content item or content derived therefrom in a portion of said target document even when a value of the data that the instruction refers to indicates that the content item or the content derived therefrom is to be excluded from the target document;

assigning a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to;

for said portion of the target document, including additional information in said target document indicative of whether the portion concerned has been assigned said first status or said second status;

employing a predetermined definition of a composite data type to access a composite data item being an instance of said composite data type from a data source; and employing a drafting script written in a markup language to generate the target document by evaluating logic in dependence upon said accessed composite data item.

27. A non-transitory computer-readable storage medium storing a computer program which, when executed on a computer of an electronic-document generation system, causes the system to carry out a computer-implemented method, the method comprising:

(a) employing a content source comprising document content and a logic source comprising logic to automatically generate a target document by evaluating said logic in dependence upon user-elicited data, the user-elicited data being data elicited from a user of said system;

(b) displaying the target document, or another electronic document generated therefrom, to the user;

(c) permitting the user to make amendments to the displayed document including a change to said user-elicited data and an amendment other than a change to said user-elicited data, the displayed document being the target document or said other electronic document generated therefrom, and permitting the user to make said amendment other than a change to said user-elicited data directly to the displayed document, whereby said amendment other than a change to said user-elicited data is also made to said target document or said other electronic document generated therefrom; and (d) when such an amendment other than a change to said user-elicited data is made directly to the displayed document by the user, automatically effecting an equivalent amendment to a corresponding portion of the content source and/or the logic source, wherein the method further comprises:

during generation of said target document, interpreting at least one instruction of a predetermined type, the at least one instruction referring to said user-elicited data and identifying a content item for use in generating said target document;

for the at least one instruction, including the identified content item or content derived therefrom in a portion of said target document even when a value of the data that the instruction refers to indicates that the content item or the content derived therefrom is to be excluded from the target document;

assigning a first status, indicating that the content item concerned or the content derived therefrom is to be included in the target document, or a second status, indicating that the content item concerned or the content derived therefrom is to be excluded from the target document, to said portion of the target document in dependence upon the data that the instruction concerned refers to; and for said portion of the target document, including additional information in said target document indicative of whether the portion concerned has been assigned said first status or said second status, the method further comprising:
(e) accessing a predetermined document-specific script for generating the target document and, based on information contained within the predetermined document-specific script:
   (i) identifying a default-data container comprising default data for said target document;
   (ii) generating a working-data container and populating that container with said default data;
   (iii) identifying a data-obtaining unit operable to obtain working data for said target document from a data source other than said default-data container, and storing the obtained working data in the working-data container;
   (iv) identifying a drafting script comprising document content and logic for generation of said target document, said drafting script declaring parameters for applying data to said drafting script; and
   (v) binding parameters of said drafting script to data items stored in said working-data container; and
(f) employing said drafting script to generate said target document by applying data stored in said working-data container to said drafting script based on said binding and by evaluating said logic in dependence upon said applied data.

* * * * *